(12) United States Patent
Beadle et al.

(10) Patent No.: US 6,931,362 B2
(45) Date of Patent: Aug. 16, 2005

(54) SYSTEM AND METHOD FOR HYBRID MINIMUM MEAN SQUARED ERROR MATRIX-PENCIL SEPARATION WEIGHTS FOR BLIND SOURCE SEPARATION

(75) Inventors: Edward Ray Beadle, Melbourne, FL (US); Richard Hugh Anderson, Melbourne, FL (US); John Fitzgerald Dishman, Palm Bay, FL (US); Paul David Anderson, Melbourne, FL (US); Gayle Patrick Martin, Merritt Island, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 10/713,107

(22) Filed: Nov. 17, 2003

(65) Prior Publication Data

US 2004/0204922 A1 Oct. 14, 2004

Related U.S. Application Data

(60) Provisional application No. 60/458,038, filed on Mar. 28, 2003.

(51) Int. Cl.[7] .............................................. G06F 15/00
(52) U.S. Cl. ...................................... 702/190; 702/189
(58) Field of Search .................... 340/310.03; 367/901; 381/94.1; 455/63.1, 226.1, 501; 702/127, 179, 189, 190, 191, 194, 196

(56) References Cited

U.S. PATENT DOCUMENTS

| | | | | |
|---|---|---|---|---|
| 4,607,305 A | * | 8/1986 | Milo | 360/121 |
| 5,640,419 A | * | 6/1997 | Janusas | 375/239 |
| 5,848,160 A | * | 12/1998 | Cai et al. | 380/44 |
| 5,959,966 A | * | 9/1999 | Torkkola | 370/203 |
| 6,185,309 B1 | * | 2/2001 | Attias | 381/94.1 |
| 6,208,295 B1 | * | 3/2001 | Dogan et al. | 342/378 |
| 6,252,962 B1 | * | 6/2001 | Sagey | 380/274 |
| 6,426,977 B1 | * | 7/2002 | Lee et al. | 375/259 |
| 6,711,528 B2 | * | 3/2004 | Dishman et al. | 702/189 |
| 6,845,164 B2 | * | 1/2005 | Gustafsson | 381/94.1 |

OTHER PUBLICATIONS

Abed–Meraim, K., Y. Xiang, J.H. Manton, and Y. Hua, "Blind Source Separation Using Second–Order Cyclostationary Statistics," IEEE Transactions on Signal Processing; vol. 49, No. 4; Apr. 2001; pp. 694–701.*

(Continued)

*Primary Examiner*—Michael Nghiem
*Assistant Examiner*—Douglas N. Washburn
(74) *Attorney, Agent, or Firm*—Duane Morris LLP

(57) ABSTRACT

A technique for blind source separation ("BSS") of statistically independent signals with low signal-to-noise plus interference ratios under a narrowband assumption utilizing cumulants in conjunction with spectral estimation of the signal subspace to perform the blind separation is disclosed. The BSS technique utilizes a higher-order statistical method, specifically fourth-order cumulants, with the generalized eigen analysis of a matrix-pencil to blindly separate a linear mixture of unknown, statistically independent, stationary narrowband signals at a low signal-to-noise plus interference ratio having the capability to separate signals in spatially and/or temporally correlated Gaussian noise. The disclosed BSS technique separates low-SNR co-channel sources for observations using an arbitrary un-calibrated sensor array. The disclosed BSS technique forms a separation matrix with hybrid matrix-pencil adaptive array weights that minimize the mean squared errors due to both interference emitters and Gaussian noise. The hybrid weights maximize the signal-to interference-plus noise ratio.

28 Claims, 12 Drawing Sheets

OTHER PUBLICATIONS

Belouchrani, A., K. Abed–Meraim, J.F. Cardoso, and E. Moulines, "Blind Source Separation Techniques Using Second–Order Statistics," IEEE Transactions on Signal Processing; vol. 45, No. 2; Feb. 1997; pp. 434–444.*

Biglieri, E., J. Proakis, and S. Shamai, "Fading Channels: Information–Theoretic and Communications Aspects," IEEE Transactions on Information Theory; vol. 44, No. 6; Oct. 1998; pp. 2619–2691.*

Cardoso, J.F. , "Blind Signal Separation: Statistical Principles," Proceedings of the IEEE; vol. 9, No. 10, Oct. 1998; pp. 2009–2025.*

Cardoso, J.F. and B. Hvam Laheld, "Equivariant Adaptive Source Separation," IEEE Transactions on Signal Processing; vol. 44, No. 12; Dec. 1996; pp. 3017–3030.*

Castedo, L. and A.R. Figueiras–Vidal, "An Adaptive Beamforming Technique Based on Cyclostationary Signal Properties," IEEE Transactions on Signal Processing; vol. 43, No. 7; Jul. 1995, pp. 1637–1650.*

Chang C., Z. Ding, S.F. Yau, and F.H.Y. Chan, "A Matrix–Pencil Approach to Blind Separation of Non–White Sources in White Noise," IEEE Transactions on Signal Processing; vol. 48, issue 3; Mar. 2000; pp. 2485–2488.*

Choi, S. and A. Cichocki, "Blind Separation of Non–stationary and Temporally Correlated Sources from Noisy Mixtures," Neural Networks for Signal Processing X, 2000. Proceedings of the 2000 IEEE Signal Processing Society Workshop, vol. 1, Dec. 2000, pp.*

Ding, Z. and T. Nguyen, "Stationary Points of Kurtosis Maximization Algorithm for Blind Signal Separation and Antenna Beamforming"; IEEE Transactions on Signal Processing; vol. 48, No. 6; Jun. 2000; pp. 1587–1596.*

Dishman, J.F., "Blind Source Separation Using a Spatial Fourth–Order Cumulant MatrixPencil"; Ph.D. Dissertation, College of Engineering, Florida Atlantic University, Boca Raton; Dec. 2001; pp 1–200.*

Dogan, M.C. and J.M. Mendel, "Applications of Cumulants to Array Processing—Part I: Aperture Extension and Array Calibration"; IEEE Transactions on Signal Processing; vol. 43, No. 5; May 1995; pp. 1200–1216.*

Gabriel, W.F., "Adaptive Processing Array Systems"; Proceedings of the IEEE; vol. 80, No. 1; Jan. 1992; pp. 152–162.*

Godard, D.N., "Self–recovering Equalization and Carrier Tracking in Two–dimensional Data Communication Systems"; IEEE Transactions on Communications; vol. COMM28; Nov. 1980; pp. 1867–1875.*

Kohno, R., "Spatial and Temporal Communication Theory Using Adaptive Antenna Array"; IEEE Personal Communication; vol. 5, No. 1; Feb. 1998; pp. 28–35.*

Krim, H. and M. Viberg, "Two Decades of Array Signal Processing Research"; IEEE Signal Processing Magazine; Jul. 1996; pp. 67–94.*

Nikias, C.L. and J.M. Mendel, "Signal Processing with Higher–Order Spectra"; IEEE Signal Processing Magazine; vol. 10, No. 3; Jul. 1993; pp. 10–37.*

Roy, R., A. Paulraj, T. Kailath, "Direction–of Arrival Estimation by Subspace Rotation Methods"; Proc. ICASSP86; Apr. 1986; pp. 2495–2498.*

Schmidt, R.O., "Multiple Emitter Location and Signal Parameter Estimation"; IEEE Transactions on Antennas and Propagation; vol. AP–34, No. 3; Mar. 1986; pp. 276–280.*

Tong, L., G. Xu, and T. Kailath, "Blind Identification and Equalization Based on SecondOrder Statistics: A Time–Domain Approach," IEEE Transactions on Information Theory, vol. 40, No. 2, Mar. 1994, pp. 340–349.*

Van Veen, B.D. and K.M. Buckley, "Beamforming: A Versatile Approach to Spatial Filtering"; IEEE ASSP Magazine; Apr. 1988; pp. 4–24.*

Chen, Y; Lin, Y; "Fourth–Order Cumulant Matrices for DOA Estimation"; IEE Proceedings Radar, Sonar and Navigation; vol. 141, issue 3; Jun. 1994; pp 144–148.*

Liang, J; Ding, Z ;"A Simple Cumulant Based Approach for Multiuser Channel Identification"; IEEE International Symposium on Circuits and Systems 2002; vol. 3; May 2002; pp 659–662.*

Liang, J; Ding, Z ;"Higher Order Statistical Approach for Channel Estimation Using Matrix Pencils"; IEEE International Conference on Communications 2002; vol. 1; Apr. 28–May 2, 2002; pp 11–15.*

Anderson, P; Ingram, M; "The Performance of the Least Mean Squares Algorithm Combined with Spatial Smoothing"; IEEE Transactions on Signal Processing; vol. 45, issue 4; Apr. 1997; pp 1005–1012.*

* cited by examiner

US 6,931,362 B2

SYSTEM AND METHOD FOR HYBRID MINIMUM MEAN SQUARED ERROR MATRIX-PENCIL SEPARATION WEIGHTS FOR BLIND SOURCE SEPARATION

CROSS-REFERENCE TO RELATED APPLICATION

The present application is related to and co-pending with commonly-assigned U.S. patent application Ser. No. 10/360,631 entitled "Blind Source Separation Utilizing A Spatial Fourth Order Cumulant Matrix Pencil", filed on 10 Feb, 2003, the disclosure of which is hereby incorporated herein by reference.

The present application is related to and co-pending with commonly-assigned U.S. patent application Ser. No. 10/400,486 entitled "Method And System For Waveform Independent Covert Communications", filed on 28 Mar. 2003, the disclosure of which is hereby incorporated herein by reference.

The present application is co-pending with and claims benefit of U.S. Provisional Patent Application Ser. No. 60/458,038 entitled "Cooperative SIGINT for Covert Communication and Location Provisional", filed on 28 Mar. 2003, the entirety of which is hereby incorporated herein by reference.

GOVERNMENT LICENSE RIGHTS

The U.S. government has a paid-up license in this invention and the right in limited circumstances to require the patent owner to license others on reasonable terms as provided for by the terms of Contract No. NRO000-02-C-0389 awarded by the National Reconnaissance Office.

BACKGROUND

The present invention is generally related to separating individual source signals from a mixture of source signals, and more specifically related to blind source separation.

A classic problem in signal processing, often referred to as blind source separation ("BSS"), involves recovering individual source signals from a composite signal comprising a mixture of those individual signals. An example is the familiar "cocktail party" effect, wherein a person at a party is able to separate a single voice from the combination of all voices in the room. The separation is referred to as "blind" because it is often performed with limited information about the signals and the sources of the signals.

Blind source separation is particularly applicable to cellular and personal wireless communications technologies, wherein many frequency bands have become cluttered with numerous electromagnetic emitters, often co-existing in the same spectrum. The problem of co-channel emitters is expected to only worsen in years to come with the development of low power, unlicensed wireless technologies such as Bluetooth® and other personal area networks. These developments have resulted in the use of multiple sensors and array signal processing techniques to perform spectral monitoring. Such techniques enable the exploitation of spatial information to separate co-channel emitters for detection, classification, and identification. Additionally, many signals designed for a low probability of detection (LPD) or low probability of intercept (LPI) may use ambient background electromagnetic radiation and known co-channel emitters as a means of concealment. Constructing single sensor receiver systems with the required sensitivity to such emitters is generally prohibitive. Thus, many applications utilize BSS and sensor arrays.

As described in "Blind Source Separation Utilizing A Spatial Fourth Order Cumulant Matrix Pencil" referenced above, a first order matrix pencil BSS method using a smoothed spatial fourth-order cumulant matrix definition was developed to avoid impractical restrictions on the sensor array characteristics and/or noise environment. The approach therein described exploits the fact that the fourth-order cumulants are insensitive to either spatial or temporal correlation in Gaussian sensor noise since the higher-order cumulants of Gaussian random processes are zero. The method advantageously does not sacrifice any degrees of freedom to estimate a Gaussian noise subspace, making it capable of using all the degrees of freedom for separating as many sources as there are sensors in the array. In order to estimate the adaptive complex sensor weights for separating the multiple sources, a spatial fourth-order cummulant matrix pair is formed for two different sets of time lags between the observations from the different sensors.

A general eigenvalue decomposition of the smoothed Spatial Fourth Order Cumulant Matrix ("SFOCM") pencil is used to find the adaptive separation weight vectors. Since the generalized eigenvectors are orthogonal to all but one of the steering vectors, the adaptive weights are formed from normalized eigenvectors. These weights maintain gain on a particular source while minimizing the output power due to the other intervening sources. However, the normalized eigenvector weights do not reduce the output power due to additive Gaussian noise at the sensors. Accordingly, an improved blind source separation technique is desired.

Thus embodiments of the disclosed subject matter are extensions and counter parts to the SFOCMP approach, which minimize the output power of the interferers and the output power of the Gaussian sensor noise.

In one embodiment of the present invention, a method for separating a plurality of signals provided by a respective plurality of sources and received by an array comprising a plurality of elements, includes generating a separation matrix as a function of time differences between receipt of the plurality of signals by the plurality of elements, a spatial fourth order cumulant matrix pencil or a pair of $2^{nd}$ order correlation matrices, a spatial correlation matrix and steering vectors of said plurality of signals. The method also includes multiplying the separation matrix by a matrix representation of the plurality of signals.

In another embodiment of the present invention, a system for separating a plurality of signals provided by a respective plurality of sources includes a receiver for receiving the plurality of signals and for providing received signals. The system also includes a signal processor for receiving the received signals, generating a separation matrix, and multiplying the separation matrix by a matrix representation of the received signals. The separation matrix is a function of time differences between receipt of the plurality of signals by the receiver, a function of a spatial fourth order cumulant matrix pencil or a pair of $2^{nd}$ order correlation matrices, a spatial correlation matrix and steering vectors of said plurality of signals.

DETAILED DESCRIPTION

Figure 1:
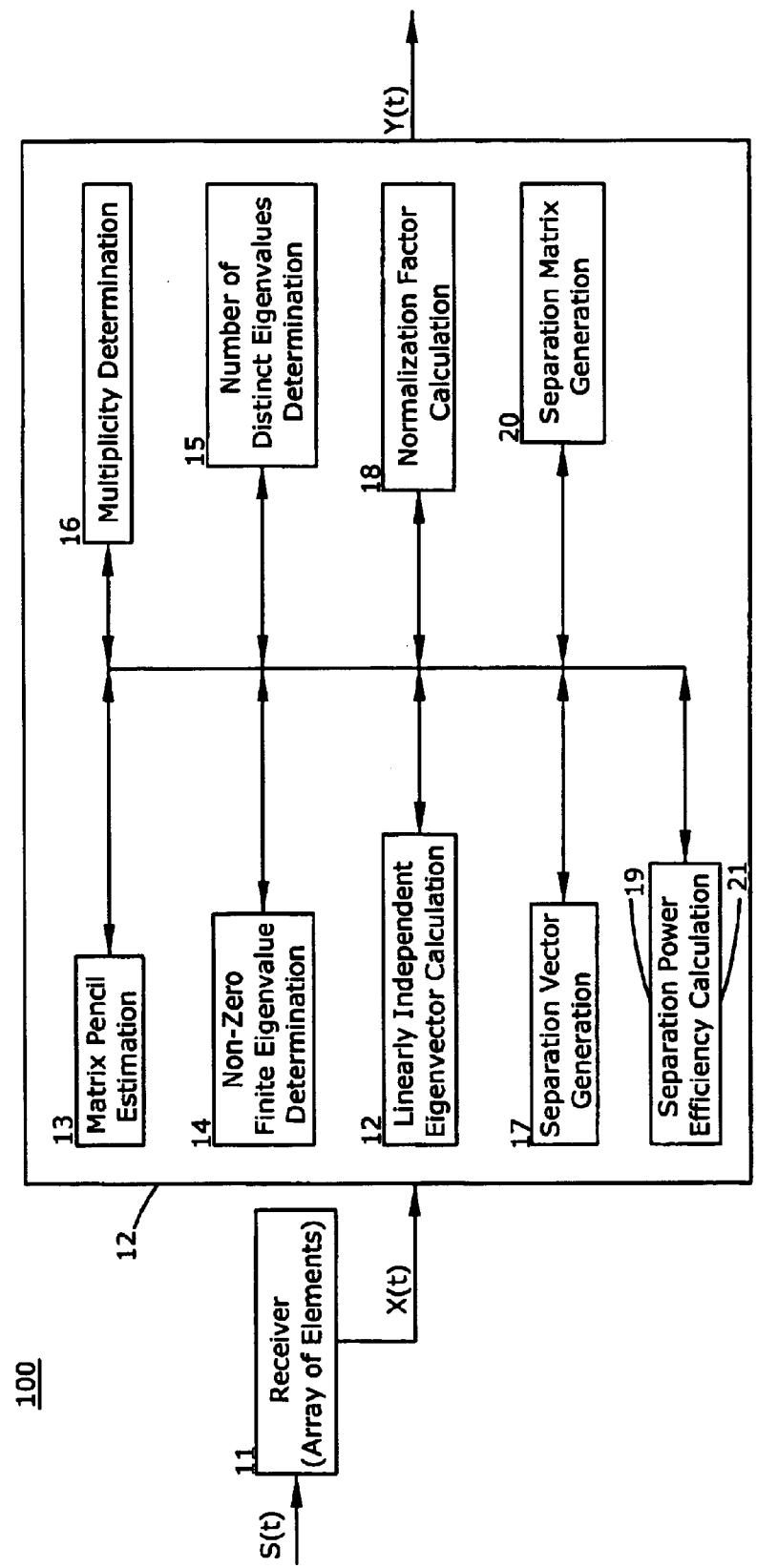
FIG. 1 is a functional block diagram of a system for performing blind source separation utilizing a spatial fourth order cumulant matrix pencil in accordance with an embodiment of the present invention.

A technique for performing blind source separation (BSS) in accordance with the present invention utilizes cumulants in conjunction with spectral estimation of the signal subspace to perform the blind separation of statistically independent signals with low signal-to-noise ratios under a narrowband assumption. This BSS technique makes use of the generalized eigen analysis of a matrix-pencil defined on two similar spatial fourth-order cumulant matrices. The herein described BSS technique utilizes a higher-order statistical method, specifically fourth-order cumulants, with the generalized eigen analysis of a matrix-pencil to blindly separate a linear mixture of unknown, statistically independent, stationary narrowband signals at a low signal-to-noise ratio having the capability to separate signals in spatially and/or temporally correlated Gaussian noise. This BSS technique provides a method to blindly separate signals in situations where no second-order technique has been found to perform the blind separation, for example, at a low signal-to-noise ratio when the number of sources equals the number of sensors.

To describe this BSS technique, a definition of a spatial fourth-order cumulant matrix suited to blind source separation with non-equal gain and/or directional sensors and a definition of a spatial fourth-order cumulant matrix-pencil using temporal information are provided. The herein description also utilizes the concept of separation power efficiency (SPE) as a measure of the BSS technique's performance, and applies the concept of wide sense equivalence between matrix-pencils to the field of matrix algebra.

As an overview, the BSS technique described herein utilizes cumulants in conjunction with a spectral estimation technique of the signal subspace to perform blind source separation in the presence of spatially and/or temporally correlated noise at low signal-to-noise ratios. Prior to deriving a separation algorithm based on cumulants, a narrowband array model is developed, all assumptions are stated, four performance measures are defined, and the relevant cumulant properties that allow for the spatial mixing matrix information to be extracted from a spatial cumulant matrix are presented. A novel spatial cumulant matrix definition is then developed and its' relevant matrix properties are derived in order to determine which mathematical methods are valid for extracting the spatial information about the mixing matrix. Additionally, two alternative definitions for the spatial fourth-order cumulant matrix are described and relevant properties are derived. Furthermore, the definitions, properties, and use of a generalized eigen analysis of a matrix-pencil defined on two similar spatial fourth-order cumulant matrices are explored and their applicability to solving the blind source separation problem is investigated. A process is described for performing the blind source separation based on the signal subspace technique using matrix-pencils. In the process the concept of wide sense equivalence between matrix-pencils is developed and then used to show that the generalized eigenvalues of a matrix-pencil defined on two similar spatial fourth-order cumulant matrices are equal to the ratio of fourth-order cumulant of each source at a set of time lags (0, 0, 0) to the fourth-order cumulant at the set of lags, $(\tau_1, \tau_2, \tau_3)$. Thus the concept of a normalized fourth-order auto-cumulant function is introduced. To further aid in understanding this BSS technique, notation used herein is presented below.

M≡Number of Sources
N≡Number of Sensors
$P_j$≡Normalized Power of the $j^{th}$ source signal
$m_j(t)$≡Continuous Time Unit Power Modulated Signal from the $j^{th}$ source
$s_j(t)$≡Continuous Time Signal from the $j^{th}$ source=$\sqrt{P_j}m_j(t)$
$r_j(t)$≡Delayed version of $s_j(t)$
$x_i(t)$≡Continuous Time Signal from the $i^{th}$ sensor.
x(t)≡The vector of sensor outputs.
$h_{ij}(t)$≡Continuous Time Impulse Response of the channel between the $j^{th}$ source and the $i^{th}$ sensor
$n_i(t)$≡Additive Noise Process at the $i^{th}$ sensor.
$\sigma_i^2$≡Variance of the Noise Process at the $i^{th}$ sensor.
$\tau_{ij}$≡Propogation Delay from the $j^{th}$ source to the $i^{th}$ sensor $\Delta\tau_{l,k,j}$ ≡ "Differential Time Delay". The difference in propogation delay from the output of the $j^{th}$ source to the $k^{th}$ sensor output and from the output of the $j^{th}$ source to the $l^{th}$ sensor output.
= $\tau_{lj} - \tau_{kj}$ $\bar{\tau}_j$="Reference Time Delay" from the $j^{th}$ source to some arbitrary array reference point in the vicinity of the array. Nominally this can be the average propogation delay to all N sensors from the $j^{th}$ source.
$\Delta\tau_{ij}$="Relative Time Delay". The difference in propagation time from the $j^{th}$ source to the $i^{th}$ sensor and the array refence point.

τ=Time Difference in Correlation of Stationary Processes $v_{ij}$=Complex Weight for the $j^{th}$ source at the $i^{th}$ sensor for the Narrow Band Model. The ij element of the "Mixing Matrix". The $i^{th}$ element of the $j^{th}$ steering vector.

$v_j$=The $j^{th}$ "Steering Vector" for the Narrow Band Model.

V=The Narrow Band Model "Mixing Matrix".

$w_{ij}$=Complex Weight for the $j^{th}$ source at the $i^{th}$ sensor for the Narrow Band Case. The ij element of the "Separating Matrix". The $i^{th}$ element of the $j^{th}$ sensor weight vector.

$\hat{w}_{j,hyb}$=The hybrid MMSE weight vector estimate for the $j^{th}$ source.

W=The "Separation Matrix".

$\alpha_{ij}$=Real valued gain(attenuation) of the channel from the $i^{th}$ source output to the $j^{th}$ sensor output.

$BW_{NEq}[\ ]$=Noise Equivalent Bandwidth $BW_{ij}^{COH}$=Coherence bandwidth of the Channel between the $j^{th}$ source and the $i^{th}$ sensor.

$y_j(t)$=The $j^{th}$ output from the separation process. It is a noisy estimate of the of the $j^{th}$ delayed source signal, $r_j(t)$.

y(t)=The vector of output signals from the separation process.

$\rho_j$=The $j^{th}$ signal loss term. Element of the "loss" matrix.

$S_j$=The separation process output signal power of the $j^{th}$ source signal.

$I_j$=The residual interference power in the $j^{th}$ separation process output.

$N_j$=The noise power in the $j^{th}$ separation process output.

$\zeta_j$=The "Interference-to-Signal Ratio" for the $j^{th}$ separation process output.

$ISR_{avg}$=The "Average Interference-to-Signal Ratio".

$ISR_{max}$=The "Maximum Interference-to-Signal Ratio".

$\xi_j$=The "Power Efficiency" of a blind source separation algorithm for the $j^{th}$ source.

$\xi_{avg}$=The "Average Power Efficiency" of a blind source separation algorithm.

$\xi_{min}$=The "Minimum Power Efficiency" of a blind source separation algorithm.

$C_x^4(\tau_1, \tau_2, \tau_3)$=N×N "Spatial Fourth-Order Cumulant Matrix 1" with delay lags $\tau_1, \tau_2, \tau_3$.

$C_x^{4'}(\tau_1, \tau_2, \tau_3)$=N×N "Spatial Fourth-Order Cumulant Matrix 2" with delay lags $\tau_1, \tau_2, \tau_3$.

$C_x^{4''}(\tau_1, \tau_2, \tau_3)$=N×N "Spatial Fourth-Order Cumulant Matrix 3" with delay lags $\tau_1, \tau_2, \tau_3$.

Cum[ ]=Cumulant Operator.

$c_{rj}^4(\tau_1, \tau_2, \tau_3)$=The fourth-order cumulant of the $j^{th}$ source signal with delay lags $\tau_1, \tau_2, \tau_3$. Also referred to as the fourth-order auto-cumulant.

$\tilde{V}$=The "Modified Mixing Matrix". Defined as the Hadamard Product $V \odot V \odot V$.

$\bar{c}_{rj}^4(\tau_1, \tau_2, \tau_3)$=The normalized fourth-order cumulant of the $j^{th}$ source signal with delay lags $\tau_1, \tau_2, \tau_3$. Also referred to as the normalized fourth-order auto-cumulant.

$C_r^4(\tau_1, \tau_2, \tau_3)$=M×M Diagonal "Fourth-Order Signal Cumulant Matrix" with delay lags $\tau_1, \tau_2, \tau_3$.

C( )="Column Space" of a matrix.

$N_r($ )=The "Rigth Null Space" of a matrix.

$N_l($ )=The "Left Null Space" of a matrix.

$I_N$=N×N Identity Matrix.

tr( )=The "Trace" of a matrix.

sp( )=The "Span" of a sub-space.

ρ( )=The "Rank" of a matrix.

$\vec{\tau}$ =Vector notation for the set of delay lags, $\{\tau_1, \tau_2, \tau_3\}$.

$P_x(\lambda, \vec{\tau})$=The "Spatial Fourth-Order Cumulant Matrix-Pencil" using a pair of Spatial Fourth-Order Cumulant Matrix 1's.

$P'_x(\lambda, \vec{\tau})$=The "Spatial Fourth-Order Cumulant Matrix-Pencil" using a pair of Spatial Fourth-Order Cumulant Matrix 2's.

$P''_x(\lambda, \vec{\tau})$=The "Spatial Fourth-Order Cumulant Matrix-Pencil" using a pair of Spatial Fourth-Order Cumulant Matrix 3's.

$P_r(\lambda, \vec{\tau})$=The "Fourth-Order Signal Cumulant Matrix-Pencil" using a pair of Diagonal Fourth-Order Signal Cumulant Matrices.

$\hat{R}_x$=The estimated zero-lag spatial correlation matrix.

$\hat{K}_j$=The interference-plus-noise correlation matrix estimate for the $j^{th}$ source.

λ(A, B)=The "Spectrum" of the pencil defined on the matrices A and B. The set of generalized eigenvalues.

$\hat{\lambda}$(A, B)=The "Finite Spectrum" of the pencil defined on the matrices A and B. The set of non-zero finite generalized eigenvalues.

$\lambda_j$=The "$j^{th}$ Eigenvalue" of the pencil defined on a pair of spatial fouth-order cumulant matrices. There are M such eigenvalues, counting multiplicities. $\lambda_j$ takes on one of the K values of $\mu_k$.

$\mu_k$=The "$k^{th}$ Distinct Eigenvalue" of the pencil defined on a pair of spatial fouth-order cumulant matrices. There are K such values that the set of $\lambda_j$'s takes on.

$g_k$=The set of indeices, $\{j\}$, where $\lambda_j = \mu_k$.

$\hat{e}_j$=The N×1 "$j^{th}$ Eigenvector" of the pencil defined on a pair of spatial fouth-order cumulant matrices associated with the eigenvalue $\lambda_j$.

$\epsilon_j = \hat{e}_j^H v_j$.

$\gamma_j$ ≡ The "Normalization Factor" for the $j^{th}$ eigenvector.

$$\gamma_j = \frac{1}{|\epsilon_j|}.$$

$\eta_k^{geom}$=The "Geometric" Multiplicity of an Eigenvalue.

$\eta_k^{alg}$=The "Algebraic" Multiplicity of an Eigenvalue.

$\eta_k$=The "Multiplicity" of an Eigenvalue when $\eta_k^{geom} = \eta_k^{alg}$.

*=Either conjugation or convolution, as appropriate from the context of the use.

FIG. 1 is a functional block diagram of a system 100 for performing blind source separation utilizing a spatial fourth order cumulant matrix pencil in accordance with an embodiment of the present invention. System 100 comprises a receiver 11 and a signal processor 12. The receiver 11 receives signal s(t), which is indicative of a plurality of signals provided by a respective plurality of sources and provides signal x(t) to the signal processor 12. The receiver 11 may be any appropriate receive configured to receive the signal s(t). For example, the signal s(t) may be an acoustic signal, an optical signal, a seismic signal, an electromagnetic signal, or a combination thereof, and the receiver 11 may be configured to receive the respective type of signal. In one embodiment, the receiver 11 is configured as an array having a plurality of elements. The signal s(t) is received and appropriately processed (e.g., time delayed and multiplexed) and provided to the signal processor 14 in the form of signal x(t).

The signal processor 12 may be any appropriate processor configured to process the signal x(t), such a general purpose computer, a laptop computer, a special purpose computer, a hardware implemented processor, or a combination thereof. The signal x(t) may be in any appropriate format, such as an optical signal, and electromagnetic signal, a digital signal, and analog signal, or a combination thereof. As will be explained in more detail below, the signal processor 12 comprises a matrix pencil estimation portion 13, a non-zero finite eigenvalue determination portion 14, a number of distinct eigenvalues determination portion 15, a multiplicity determination portion 16, a linearly independent eigenvector calculation portion 17, a normalization factor calculation 18, a separation vector generation portion 19, a separation matrix generation portion 20, and an optional separation power efficiency calculation portion 21. The matrix pencil estimation portion 13 is configured to estimate the spatial fourth order cumulant matrix pencil as a function of time differences of the arrival of the signal s(t) at the elements of the receiver 11. The non-zero finite eigenvalue determination portion 14 is configured to determine the non-zero finite eigenvalues for the spatial fourth order cumulant matrix pencil. The number of distinct eigenvalues determination portion 15 is configured to determine the number of eigenvalues that are distinct. The multiplicity determination portion 16 is configured to determine the multiplicity of each of the distinct finite eigenvalues. The linearly independent eigenvector calculation portion 17 is configured to calculate linearly independent eigenvectors for each of the distinct finite eigenvalues. The normalization factor portion 18 is configured to calculate, for each eigenvalue having a multiplicity equal to one, a normalization factor and to generate a respective separation vector as a function of the normalization factor and an eigenvector corresponding to the eigenvalue having a multiplicity equal to one. The separation vector generation portion 19 is configured to generate, for each repeated eigenvalue, a separation vector as a function of an eigenvector corresponding to the repeated eigenvalue. The separation matrix generation portion 20 is configured to generate the separation matrix as a function of the separation vectors. The optional separation power efficiency calculation portion 21 is configured to calculate the efficiency of the separation process in accordance with the following formula: $\zeta_j \equiv S_j/P_j$, wherein $\zeta_j$ is indicative of the separation power efficiency for the $j^{th}$ source of the plurality of sources, $S_j$ is indicative of a power of a separated signal from the $j^{th}$ source, and $P_j$ is indicative of a normalized power of a signal from the $j^{th}$ source.

Figure 2:
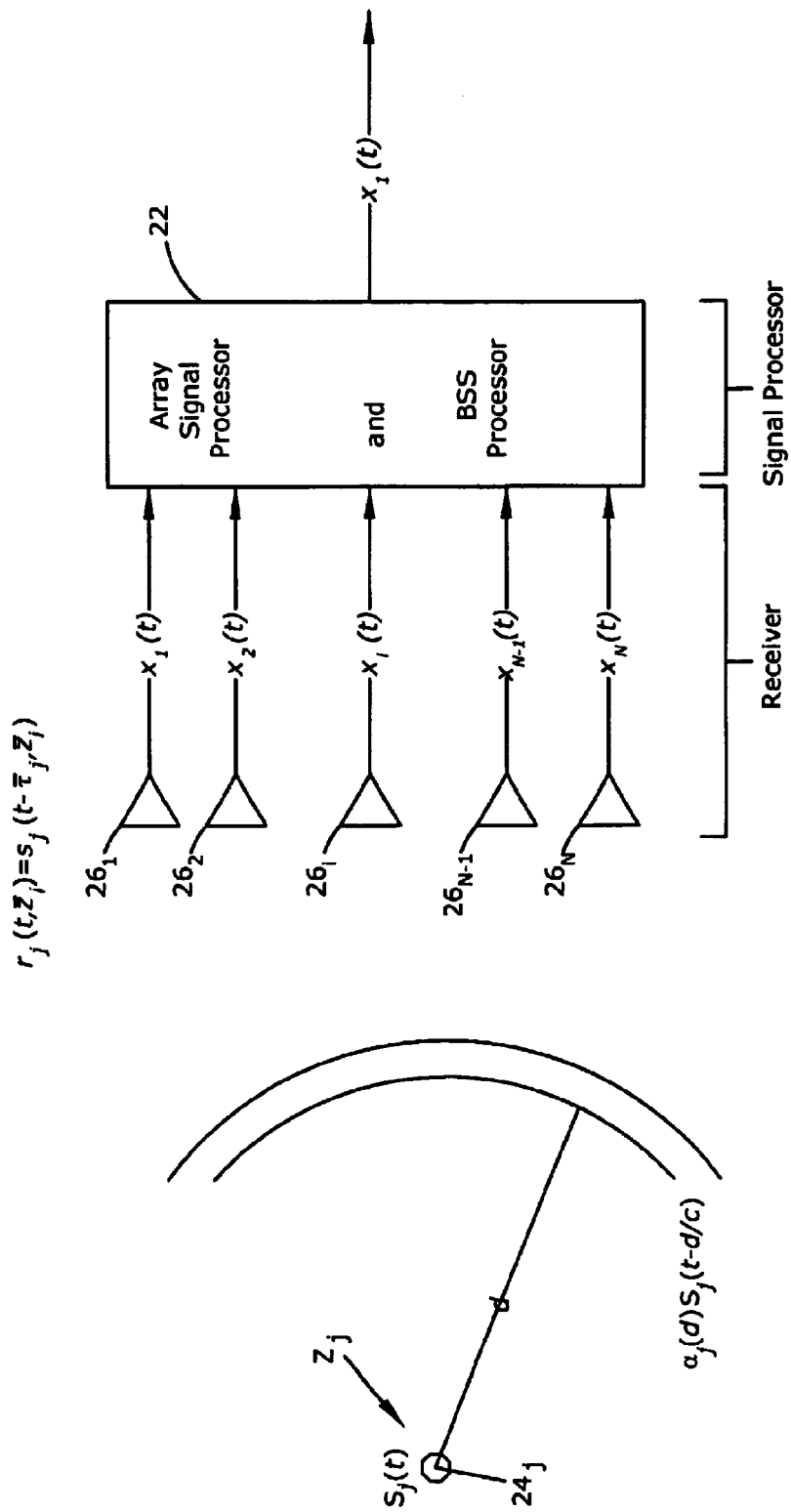
FIG. 2 is an illustration of signal source, array elements, and a processor for performing array signal processing and BSS processing in accordance with an embodiment of the present invention.

FIG. 2 is an illustration of signal source 24, array elements 26, and a processor 22 for performing array signal processing and BSS processing in accordance with an embodiment of the present invention. Array signal processing is a specialization within signal processing concerned with the processing of a set of signals generated by an array of sensors at distinct spatial locations sampling propagating wavefields, such as electromagnetic, seismic, acoustic, optical, mechanical, thermal, or a combination thereof, for example. As shown in FIG. 2, the array samples the $j^{th}$ wavefield, $r_j(t, \vec{z}_i)$, generated by the $j^{th}$ source $24_j$ at locations $\{\vec{z}_1, \vec{z}_2, \ldots, \vec{z}_N\}$ (only one location, $z_j$, shown in FIG. 2) with a set of sensors $26_i$ which generate signals $x_i(t)$ indicative of the wavefield at each location, $z_j$. The signals $x_i(t)$ may be any appropriate type of signal capable of being processed by the processor 22. Examples of appropriated types of signals $x_i(t)$ include electrical signals, acoustic signals, optical signals, mechanical signals, thermal signals, or a combination thereof. The signal $x_i(t)$ provided by the $i^{th}$ sensor, $26_i$, comprises the sum of the wavefields from all sources 24 at each sensor's location, each weighted with response of the sensor in the signal's $r_j(t, \vec{z}_i)$ direction of arrival, plus an additive noise term, $n_i(t)$. As described in more detail herein, the processor 22 processes the signals x(t) for enhancing sets of sources signals' individual signal-to-interference-plus-noise ratios by suppressing interfering source signals at different spatial locations without knowledge of the source signal characteristics, the channels between the sources and the array elements, the sources' locations, or array geometry via a blind source separation (BSS) technique in accordance with the present invention.

A blind source separation technique in accordance with the present invention is described herein by defining underlying assumptions made about the source signals and noise sources. Different multiple input multiple output (MIMO) array channel models are described resulting in a narrowband model, which is utilized in the BSS technique in accordance with present invention.

Blind source separation (BSS) is applicable to many areas of array signal processing that require the enhancement and characterization of an unknown set of source signals generated by a set of sensors that are each a linear mixture of the original signals. These include, for example, signal intelligence, spectral monitoring, jamming suppression, and interference rejection, location, and recognition. Typically, the mixing transformation, source signal characteristics, and sensor array manifold are unknown. Thus, blind source separation may be viewed as a multiple-input, multiple-output (MIMO) blind channel estimation problem.

Figure 3:
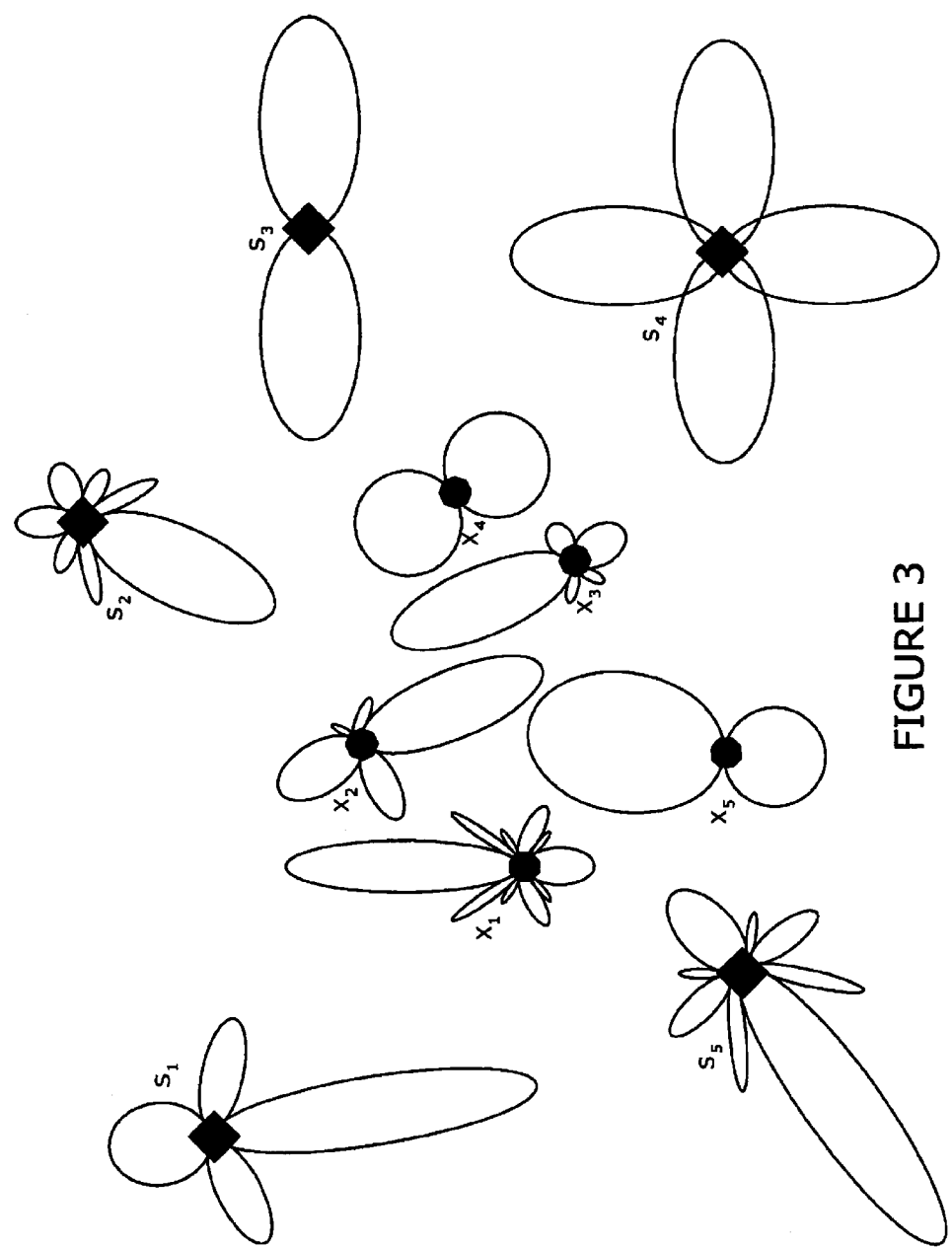
FIG. 3 is an illustration of a MIMO blind channel estimation scenario showing five unknown sources having distinct radiating patterns and five sensors having distinct receiving patterns.

FIG. 3 is an illustration of a MIMO blind channel estimation scenario showing five unknown sources, $s_1, s_2, s_3, s_4, s_5$, having distinct radiating patterns and five sensors, $x_1, x_2, x_3, x_4, x_5$, having distinct receiving patterns. The sources, $s_1, s_2, s_3, s_4, s_5$, may provide and the sensors, $x_1, x_2, x_3, x_4, x_5$, may correspondingly receive, acoustic energy, electromagnetic energy, optic energy, mechanical energy, thermal energy, or a combination thereof. As shown in FIG. 3, the five unknown sources, $s_1, s_2, s_3, s_4, s_5$, with distinct radiating patterns are generating a set of wavefields that are impinging on an array of five sensors, $x_1, x_2, x_3, x_4, x_5$, with an unknown array manifold. Each source, $s_1, s_2, s_3, s_4, s_5$, provides a respective source signal. A BSS separation technique in accordance with the present invention, jointly extracts the set of source signals from an array of sensors (e.g., $x_1, x_2, x_3, x_4, x_5$,) sampling the aggregate (composite) of the source signals' propagating wavefields at distinct spatial locations without knowledge of the signal characteristics or knowledge of the array's sensitivity as a function of direction of arrival or geometry.

In order to develop a blind source separation technique suitable for separating narrowband signals given a set of outputs from an array of sensors with a relatively small spatial expanse and assess its performance, it is advantageous to develop a multiple-input multiple-output (MIMO) narrowband channel model for the array, state assumptions made, state the problem mathematically, and develop a set of measures to evaluate the technique.

As such, a narrowband MIMO channel model is developed by starting with the most general convolutional MIMO channel model and then placing restrictions on the signal bandwidth and array size to simplify the problem, resulting in the narrowband model as utilized herein. Signal and noise assumptions are then presented and the blind source separation technique in accordance with the present invention is described mathematically and graphically. Two performance measures to be used in assessing the performance are then described including the novel concept of separation power efficiency (SPE).

Four multiple-input multiple-output (MIMO) channel models applicable to the blind source separation problem are described herein. These models are the general channel model, the non-dispersive direct path only channel model, the general finite impulse response (GFIR) channel model, and the narrowband channel model. The BSS technique in accordance with the present invention is then described utilizing the narrowband channel model.

The General Channel Model: In the most general case, the output of each element is modeled as a summation of the M source signals each convolved with the impulse response of the channel between the output of the source and output of the sensor plus the additive Gaussian noise referenced to the sensors input. That is, $$x_i(t) = \sum_{j=1}^{M} v_{ij}(t) * s_j(t) + n_i(t) \quad (1)$$

where * denotes convolution. The impulse response, $v_{ij}(t)$, of the channel between the output of the $j^{th}$ source and the $i^{th}$ sensor output may be time varying and account for such phenomena as multi-path propagation, dispersion, sensor time-varying response, source motion, sensor motion, etc. This can be written in matrix form as the general multiple input multiple output (MIMO) channel model $$x(t) = [x_1(t) \ x_2(t) \ \cdots \ x_N(t)]^T \quad (2)$$

$$= \begin{bmatrix} v_{11}(t) & \cdots & v_{1M}(t) \\ \vdots & \ddots & \vdots \\ v_{N1}(t) & \cdots & v_{NM}(t) \end{bmatrix} * \begin{bmatrix} s_1(t) \\ \vdots \\ s_M(t) \end{bmatrix} + \begin{bmatrix} n_1(t) \\ \vdots \\ n_N(t) \end{bmatrix}$$

$$= V(t) * s(t) + n(t)$$

where $[\ ]^T$ denotes transposition.

The Non-Dispersive, Direct Path Only Channel Model: When there is no multi-path, motion, or dispersion, the channel impulse response can be modeled by a delay and attenuation. That is, $$v_{ij}(t) = \alpha_{ij}\delta(t - \tau_{ij}) \quad (3)$$

where $\alpha_{ij}$ is the cascaded attenuation/gain from the output of $j^{th}$ source to the $i^{th}$ sensor output and $\tau_{ij}$ is the propagation time (delay) from the output of $j^{th}$ source to the output of the $i^{th}$ sensor. Under this model, when the sifting property of the delta function is employed, the output of the $i^{th}$ sensor (ignoring the noise) becomes $$x_i(t) = \sum_{j=1}^{M} v_{ij}(t) * s_j(t) \quad (4)$$

$$= \sum_{j=1}^{M} \alpha_{ij}\delta(t - \tau_{ij}) * s_j(t)$$

$$= \sum_{j=1}^{M} \alpha_{ij} s_j(t - \tau_{ij})$$

At this point a "differential" delay is defined as the difference in propagation time from the output of the $j^{th}$ source to the output of the $k^{th}$ sensor and to the output of the $l^{th}$ sensor.

$$\Delta\tau_{l,k,j} = \tau_{lj} - \tau_{kj} \quad (5)$$

This differential time delay defines the time difference of arrival between two sensors for a given signal and is a measure of the spatial expanse of the array of sensors. Additionally, to facilitate situations when the minimum propagation delay from the $j^{th}$ source to the sensors is much greater than the maximum differential propagation delay, that is $$\min_i (\tau_{ij})| \gg \max_{l,k} |\Delta\tau_{l,k,j}|,$$

the propagation time $\tau_{ij}$ is decomposed into two components, a "reference" delay, which is defined as the average propagation time from the output of the source to the output of the sensors and denoted as $\bar{\tau}_j$, and a "relative" delay, which is defined as the difference in propagation time between the reference time delay and the actual propagation time and denoted as $\Delta\tau_{ij}$. The propagation time from the $j^{th}$ source to the $i^{th}$ sensor can then be expressed as $$\tau_{ij} = \bar{\tau}_j + \Delta\tau_{ij}. \quad (6)$$

Figure 4:
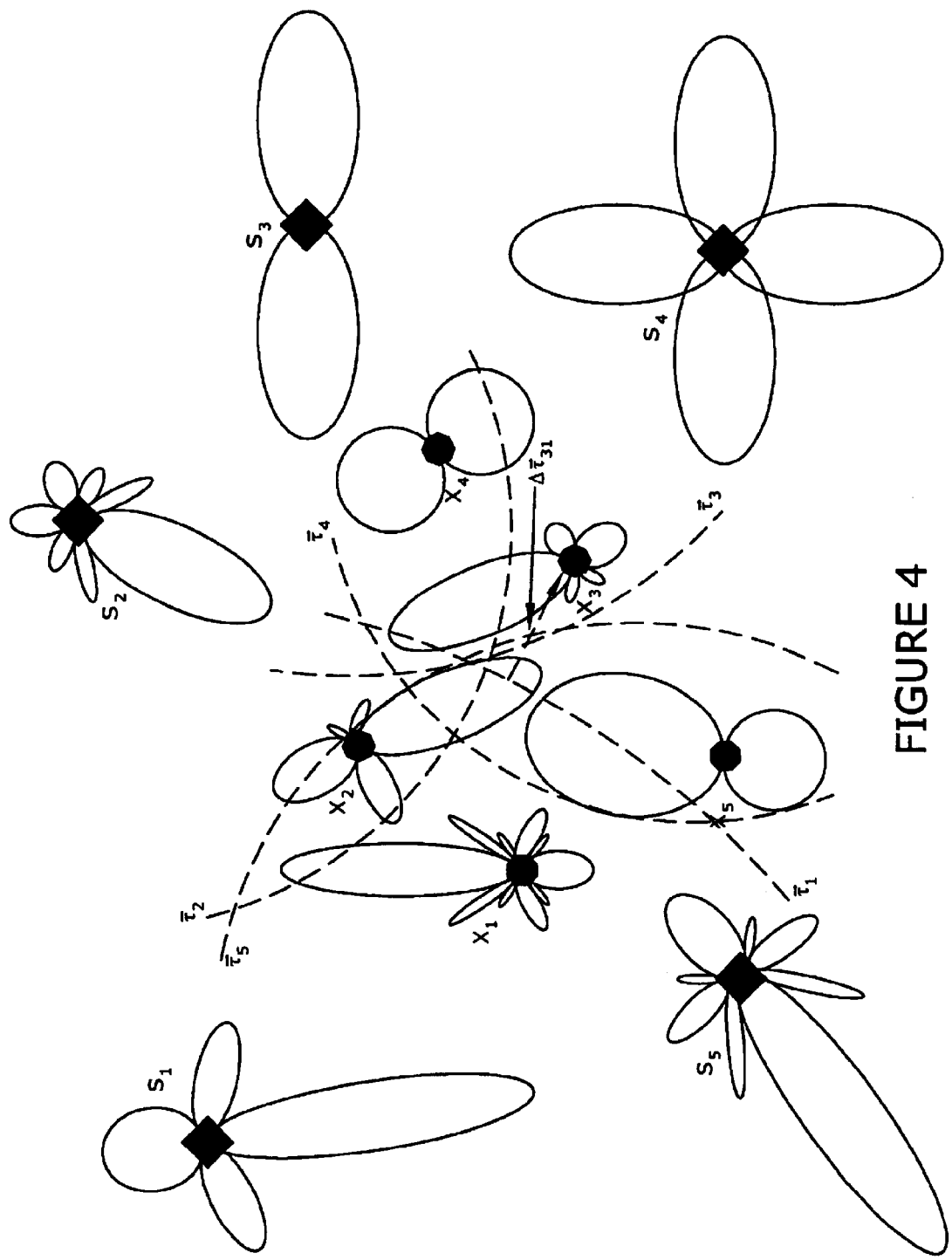
FIG. 4 is a graphical illustration of time delays between sensors and sources.

FIG. 4 is a graphical illustration of time delays between sensors and sources. The decomposition of the propagation time as depicted in FIG. 4 includes five sources, labeled $s_1$, $s_2, \ldots, s_5$, with associated reference delays $\bar{\tau}_1, \bar{\tau}_2, \ldots, \bar{\tau}_5$, which are generating a set of wavefields that illuminate a set of five sensors, labeled $x_1, x_2, \ldots, x_5$, and the relative time delay, $\Delta\tau_{31}$, is shown for the first source, $s_1$, and the third sensor, $x_3$. Using the above definitions, the differential time delay can be reformulated as follows:

$$\Delta\tau_{l,k,j} \equiv \tau_{lj} - \tau_{kj} \quad (7)$$

$$= (\bar{\tau}_j + \Delta\tau_{lj}) - (\bar{\tau}_j + \Delta\tau_{kj})$$

$$= \Delta\tau_{lj} - \Delta\tau_{kj}$$

Both the differential and relative time delays are utilized in the formulation of the narrowband and the general finite impulse response models.

The General Finite Impulse Response (GFIR) Channel Model: The general model is often simplified by modeling the channel between the output of the $j^{th}$ source and the $i^{th}$ sensor output, $v_{ij}(t)$, as a FIR filter or tapped delay line. As with the general model, the GFIR Model may be time varying and can account for such phenomena as multi-path propagation, dispersion, sensor time-varying response, system motion, etc. The FIR filter used to model $v_{ij}(t)$ must be long enough to account for the multi-path delay spread of the channel as well as the relative time delay, $\Delta\tau_{ij}$, with a "reference" delay, $\bar{\tau}_j$, accounted for by defining a delayed version of the source signal as it's input. That is the input to the set of FIR filters used to model the channels between the output of the $j^{th}$ source and array of sensors is $$r_j(t) = s_j(t - \bar{\tau}_j). \quad (8)$$

The FIR filter or tapped delay line model is valid for a fading channel when the coherence bandwidth of such a channel is much less than the noise equivalent bandwidth of the source signal, that is $BW_{NEq}[s_j(t)] < BW_{ij}^{COH}$, where the coherence bandwidth is defined as the reciprocal of the multi-path delay spread. In this situation the multi-path components in the channel separated by a delay of at least $2\pi/BW_{NEq}[s_j(t)]$ are resolvable and the fading phenomenon is referred to as being "frequency selective". Thus the channel impulse response can be represented as $$v_{ij}(t) = \sum_{l=0}^{L_{ij}-1} v_{ij}^{(l)}(t)\delta(t - 2\pi l / BW_{NEq}[s_j(t)]) \quad (9)$$

where the time varying complex-valued channel gain of the $l^{th}$ component can be represented as $$v_{ij}^{(l)}(t) = a_{ij}^{(l)}(t)e^{j\phi_{ij}^{(l)}(t)}. \quad (10)$$

The length of the model, $L_{ij}$, is the number of resolvable multi-path components which is $$L_{ij} = \lceil BW_{NEq}[s_j(t)]/BW_{ij}^{COH} \rceil \quad (11)$$

where $\lceil \ \rceil$ denotes the ceiling function. For the GFIR channel model, the length of the FIR filter has to not only accommodate the multi-path delay spread but also the relative time delay, $\Delta\tau_{ij}$. That is equation (11) becomes $$L_{ij} = \lceil BW_{NEq}[s_j(t)] \cdot [(|\Delta\tau_{ij}|/2\pi) + (1/BW_{ij}^{COH})] \rceil. \quad (12)$$

In practice, the length of all the FIR filters are set to a common value, L, which is defined as $$L = \max_{i,j}(L_{ij}). \quad (13)$$

When the coherence bandwidth is greater than the noise equivalent bandwidth of the source signal, that is $$BW_{NEq}[s_j(t)] < BW_{ij}^{COH},$$

the fading is referred to as "frequency non-selective" and the fading model reduces to a single time varying complex weight. That is $L_{ij}=1$, and thus $$v_{ij}(t) = v_{ij}^{(0)}(t) \quad (14)$$
$$= a_{ij}^{(0)}(t)e^{j\phi_{ij}^{(0)}(t)}$$
$$= a_{ij}(t)e^{j\phi_{ij}(t)}$$

which begins to look like a time-varying narrowband model. However, for the above simplification to a single complex weight to hold in array signal processing, the source signal must have a noise equivalent bandwidth much less then the center frequency and the array of sensors must have a relatively small spatial expanse, that is $$BW_{NEq}[s_j(t)] \ll \omega_j \quad (15)$$

$$\max_i |\Delta\tau_{ij}| \ll \pi/BW_{NEq}[s_j(t)]. \quad (16)$$

The Narrowband Channel Model: A measure of the spectral support of a signal is the noise equivalent bandwidth, denoted as $BW_{NEq}[\ ]$. By the duality principle of time and frequency, the inverse noise equivalent bandwidth can be used as a measure of the temporal support of the signal, in other words it is can be used as an indication of the decorrelation time of the signal. When the signal noise equivalent bandwidth is much less then the center frequency, that is $$BW_{NEq}[s_j(t)] \ll \omega_j \quad (17)$$

where $\omega_j$ is the center frequency of the $j^{th}$ source, then the propagation delay, or relative propagation delay, can be modeled as a phase shift. In this situation, when there is no dispersion or multi-path, the channel model is referred to as the narrowband model.

However, since the phase shift is modulo $2\pi$ with respect to the center frequency, the requirement that the bandwidth be much less than the center frequency is itself insufficient in order for the time delay to be modeled as a phase shift and preserve the waveform, i.e. negligible inter-symbol interference (ISI) is induced in a digital communications signal. Therefore, for the narrowband model to hold, the array of sensors must also have a relatively small spatial expanse. That is $$\max_{l,k} |\Delta\tau_{l,k,j}| \ll 2\pi/BW_{NEq}[s_j(t)] \quad (18)$$

Since $\Delta\tau_{l,k,j} = \Delta\tau_{l,j} - \Delta\tau_{k,j}$, requiring $$\max_i |\Delta\tau_{ij}| \ll \pi/BW_{NEq}[s_j(t)] \quad (19)$$

is a sufficient condition to guarantee (18) holds, via the triangle inequality. When the Narrowband conditions defined in (17) and (19) hold, the relative time delay is negligible in comparison to the decorrelation time of the signal and thus $$s_j(t-\bar{\tau}_j-\Delta\tau_{ij}) \approx s_j(t-\bar{\tau}_j) \quad (20)$$

which says the waveform is preserved (within a phase shift). Thus, the relative time delay can be modeled as a phase shift, $$v_{ij}(t) * s_j(t) = \alpha_{ij}\delta(t - \tau_{ij}) * s_j(t) \quad (21)$$
$$= \alpha_{ij}s_j(t - \tau_{ij})$$
$$= \alpha_{ij}s_j(t - \bar{\tau}_j - \Delta\tau_{ij})$$
$$= \alpha_{ij}e^{-j\omega_j\Delta\tau_{ij}}s_j(t - \bar{\tau}_j)$$
$$= \alpha_{ij}e^{-j\phi_{ij}}s_j(t - \bar{\tau}_j) \equiv v_{ij}r_j(t)$$

where $r_j(t) = s_j(t-\bar{\tau}_j)$, $\phi_{ij} = \omega_j\Delta\tau_{ij}$, and a complex weight, $v_{ij}$, is defined as $$v_{ij} = \alpha_{ij}e^{-j\phi_{ij}}. \quad (22)$$

This complex weight together with the other N-1 weights associated with the $j^{th}$ signal form the $j^{th}$ steering vector.

$$v_j = [v_{1j} \ v_{2j} \ \ldots \ v_{Nj}]^T \quad (23)$$

The output of the $i^{th}$ sensor is then $$x_i(t) = \sum_{j=1}^{M} v_{ij}r_j(t) + n_i(t) \quad (24)$$

As done for the general m $j^{th}$ model, this can be re-formulated in matrix form for the vector of sensor outputs as $$x(t) = [x_1(t) \ x_2(t) \ \cdots \ x_N(t)]^T \quad (25)$$

$$= \begin{bmatrix} v_{11} & \cdots & v_{1M} \\ \vdots & \ddots & \vdots \\ v_{N1} & \cdots & v_{NM} \end{bmatrix} \begin{bmatrix} r_1(t) \\ \vdots \\ r_M(t) \end{bmatrix} + \begin{bmatrix} n_1(t) \\ \vdots \\ n_N(t) \end{bmatrix}$$

$$= [v_1 \ \cdots \ v_M] \begin{bmatrix} r_1(t) \\ \vdots \\ r_M(t) \end{bmatrix} + \begin{bmatrix} n_1(t) \\ \vdots \\ n_N(t) \end{bmatrix}$$

$$= Vr(t) + n(t)$$

Due to conservation of energy, the total average signal power from the $j^{th}$ source illuminating the array can never exceed $P_j$. Since the signal-to-noise ratio is established at the input of the sensor, in the total array gain can be viewed as being normalized. Thus for the narrowband model, the inner product of the $j^{th}$ column of the mixing matrix V is, $$v_j^H v_j = \sum_{i=1}^{N} v_{ij}^* v_{ij} \qquad (26)$$

$$= \sum_{i=1}^{N} \alpha_{ij}^2 e^{+j\phi_{ij}} e^{-j\phi_{ij}}$$

$$= \sum_{i=1}^{N} \alpha_{ij}^2$$

$$= 1$$

where $[\ ]^H$ denotes the Hermitian transpose.

Signal and Noise Assumptions: The following assumptions are made about the source signals and noise vector. These assumptions are made to allow the use of the fourth-order cumulant and to ensure a sufficient number of degrees of freedom for the separation technique to exploit. Assumptions A1 and A2 ensure that the fourth-order cumulant of the source signals exist. The zero-mean assumption is not necessary for the use of cumulants but is assumed since practical propagating electro-magnetic signals have a zero-mean. Assumptions A3 and A4 are particularly useful to the use of cumulants for the BSS problem. Without them, the noise sources would need to be treated as a signal source thus requiring additional degrees of freedom in the array. Note that the noise sources are not assumed to be temporally or spatially white. This is contrast to assumptions made in other second order techniques. The final assumption on the number of source signals helps to ensure that the there are enough degrees of freedom to perform the separation using the matrix-pencil approach.

The first assumption (A1): The M source signals illuminating the array are statistically independent non-Gaussian stationary random processes. Assumption A1 is represented mathematically as follows.

$$f_{r_1, r_2, \ldots, r_M}(r_1, r_2, \ldots, r_M) = \prod_{j=1}^{M} f_{r_j}(r_j) \qquad (27)$$

The source signals are assumed stationary to order four over the estimation period of the spatial fourth-order cumulant matrix.

The second assumption (A2): The M source signals illuminating the array have zero mean with power $P_j$ and a non-zero fourth-order moment. Assumption A2 is represented mathematically as follows.

$$E[m_j(t)]=0 \qquad (28)$$

$$E[r_j(t)]=E[\sqrt{P_j}m_j(t)]=\sqrt{P_j}E[m_j(t)]=0 \qquad (29)$$

$$E[m_j(t)m_j^*(t)]=1 \qquad (30)$$

$$E[r_j(t)r_j^*(t)]=E[\sqrt{P_j}m_j(t)\sqrt{P_j}m_j^*(t)]=P_j E[m_j(t)m_j^*(t)]=P_j \qquad (31)$$

$$E[r_j(t)r_j^*(t)r_j(t)r_j^*(t)]=P_j^2 E[m_j(t)m_j^*(t)m_j(t)m_j^*(t)] \qquad (32)$$

$$E[m_j(t)m_j^*(t)m_j(t)m_j^*(t)] \neq 0. \qquad (33)$$

The third assumption (A3): The set of source signals (processes) and set of noise processes are statistically independent. Assumption A3 is represented mathematically as follows.

$$f_{r_1,r_2,\ldots,r_M,n_1,n_2,\ldots,n_N}(r_1, r_2, \ldots, r_M, n_1, n_2, \ldots, n_N) = \qquad (34)$$

$$f_{n_1,n_2,\ldots,n_N}(n_1, n_2, \ldots, n_N)\prod_{j=1}^{M} f_{r_j}(r_j)$$

The fourth assumption (A4): The noise processes are stationary zero-mean Gaussian random processes. They are not assumed to be spatially or temporally independent. Assumption A3 is mathematically represented as follows.

$$n_i(t) \sim N(0, \sigma_i^2) \qquad (35)$$

$$n(t)=[n_1(t), n_2(t), \ldots, n_N(t)]^T \sim N(0, K_n) \qquad (36)$$

$$f_{n_1,n_2,\ldots,n_N}(n_1, n_2, \ldots, n_N) = \frac{1}{(2\pi)^{1/2}|\det K_n|^{1/2}} e^{-n^T K_n^{-1} n} \qquad (37)$$

The fifth assumption (A5): The number of sources is less than or equal to the number of sensors, i.e. $M \leq N$.

Figure 5:
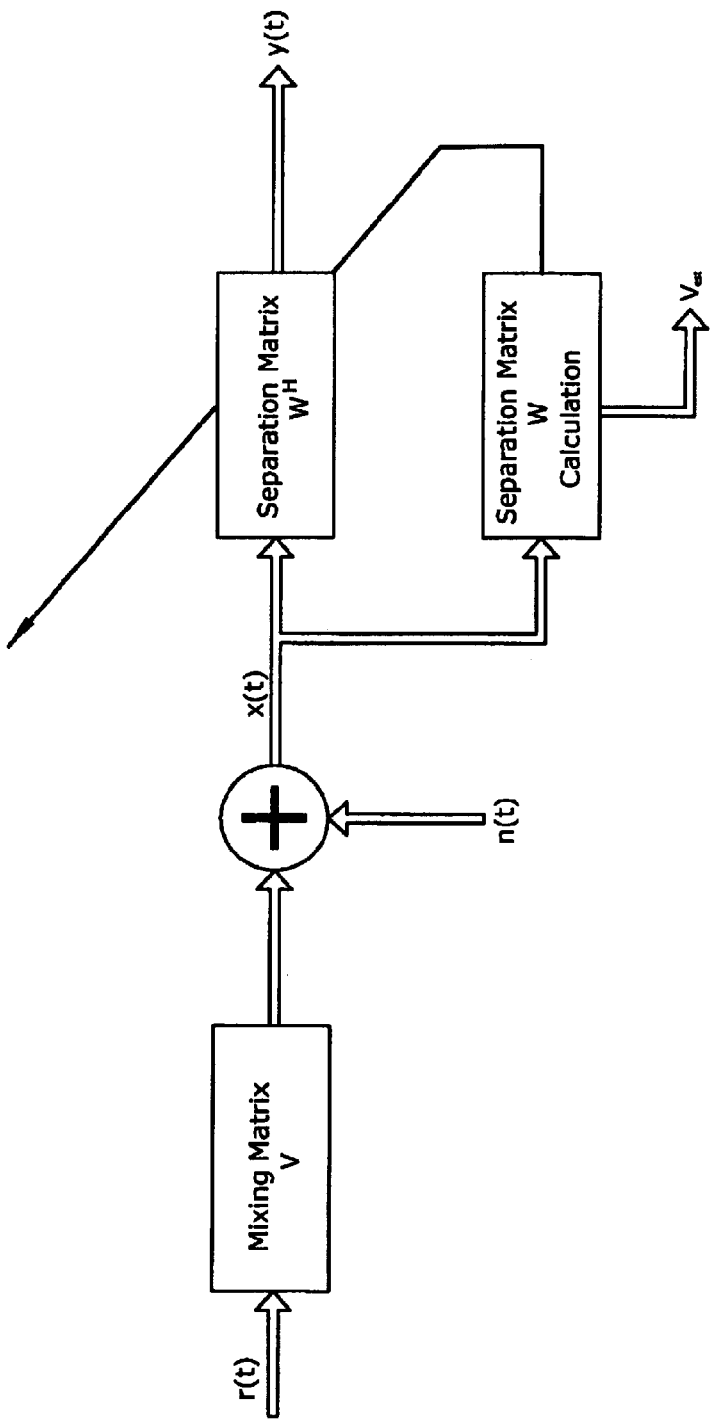
FIG. 5 is an illustration depicting blind source separation (BSS) showing an input signal mixed with noise provided to the separation process.

FIG. 5 is a functional block diagram of an apparatus for performing blind source separation (BSS) of M statistically independent narrowband source signals given a set of outputs from an array of sensors with a relatively small spatial expanse and with an arbitrary and unknown array geometry, in accordance with an embodiment of the present invention. The BSS technique as described herein determines a separation matrix W that will diagonalize the mixing matrix V. This involves finding a N×M separation matrix W, with complex elements $w_{ij}$, $$W = \begin{bmatrix} w_{11} & \cdots & w_{1M} \\ \vdots & \ddots & \vdots \\ w_{N1} & \cdots & w_{NM} \end{bmatrix} \qquad (38)$$

that will diagonalize the mixing matrix, V. That is, a separation matrix W is desired such that the product $W^H V$ results in a M×M diagonal "loss" matrix with elements $\rho_j$.

$$W^H V = \begin{bmatrix} \rho_1 & 0 & \cdots & 0 \\ 0 & \rho_2 & \ddots & \vdots \\ \vdots & \ddots & \ddots & 0 \\ 0 & \cdots & 0 & \rho_M \end{bmatrix} \qquad (39)$$

When the separation matrix, W, is applied to the vector of sensor outputs, the result is $$y(t) = W^H x(t) = W^H \{Vr(t) + n(t)\} \qquad (40)$$

$$= W^H V r(t) + W^H n(t)$$

$$= \begin{bmatrix} \rho_1 & 0 & \cdots & 0 \\ 0 & \rho_2 & \ddots & \vdots \\ \vdots & \ddots & \ddots & 0 \\ 0 & \cdots & 0 & \rho_M \end{bmatrix} \begin{bmatrix} r_1(t) \\ \vdots \\ r_M(t) \end{bmatrix} + W^H n(t)$$

$$= \begin{bmatrix} \rho_1 r_1(t) \\ \vdots \\ \rho_M r_M(t) \end{bmatrix} + W^H n(t)$$

and the source signals are separated. For mathematical completeness note that the vector $r(t) \in C^M$, the vectors $x(t)$, $n(t) \in C^N$, and the matrices V, $W \in C^{N \times M}$. If the loss matrix is the identity matrix, the separation process has captured all of the signal energy illuminating the array thus guaranteeing that the separated output signal has reached the maximum achievable signal to interference plus noise ratio.

As developed previously in the narrowband model, the output of each sensor is a weighted linear mixture of the independent source signals plus noise.

$$x_i(t) = \sum_{l=1}^{M} v_{il} r_l(t) + n_i(t) \tag{41}$$

Applying the separation matrix to the vector of sensor outputs separates the sources.

$$\begin{aligned} y(t) &= W^H x(t) \\ &= W^H \{V r(t) + n(t)\} \\ &= W^H V r(t) + W^H n(t) \end{aligned} \tag{42}$$

The $j^{th}$ element of the separation process output vector, $y_j(t)$, is an estimate of the $j^{th}$ source signal, $r_j(t)$ and is the inner product of the $j^{th}$ column of the separation matrix and the vector of sensor outputs.

$$\begin{aligned} y_j(t) &= w_j^H x(t) \\ &= \sum_{i=1}^{N} w_{ij}^* x_i(t) \end{aligned} \tag{43}$$

Substituting equation (41) into equation (43) yields $$\begin{aligned} y_j(t) &= \sum_{i=1}^{N} w_{ij}^* \left\{ \sum_{l=1}^{M} v_{il} r_l(t) + n_i(t) \right\} \\ &= \sum_{i=1}^{N} w_{ij}^* \sum_{l=1}^{M} v_{il} r_l(t) + \sum_{i=1}^{N} w_{ij}^* n_i(t) \\ &= \sum_{i=1}^{N} w_{ij}^* v_{ij} r_j(t) + \sum_{i=1}^{N} \sum_{\substack{l=1 \\ l \neq j}}^{M} w_{ij}^* v_{il} r_l(t) + \sum_{i=1}^{N} w_{ij}^* n_i(t) \end{aligned} \tag{44}$$

where it is clear there are three distinct terms corresponding to the desired signal, the residual interference, and the output noise. Of particular interest in evaluating the performance of communications and signal intelligence systems is the second-order moment of each of these terms. The second-order moment of the first term is the desired signal output power and is defined as $$\begin{aligned} S_j &\equiv E\left[\left|\sum_{i=1}^{N} w_{ij}^* v_{ij} r_j(t)\right|^2\right] \\ &= E\left[\left\{\sum_{i=1}^{N} w_{ij}^* v_{ij} r_j(t)\right\}\left\{\sum_{k=1}^{N} w_{kj}^* v_{kj} r_j(t)\right\}^*\right] \\ &= \sum_{i=1}^{N} \sum_{k=1}^{N} w_{ij}^* v_{ij} v_{kj}^* w_{kj} E[r_j(t) r_j^*(t)] \end{aligned} \tag{45}$$

Applying assumptions A1 and A2, $$E[r_j(t) r_j^*(t)] = P_j \tag{46}$$

and thus equation (45) becomes $$S_j = P_j \sum_{i=1}^{N} \sum_{k=1}^{N} w_{ij}^* v_{ij} v_{kj}^* w_{kj} \tag{47}$$

which can be represented using vector notation as $$S_j = P_j w_j^H v_j v_j^H w_j. \tag{48}$$

The second-order moment of the second term in (44) is the residual interference power and is given by $$\begin{aligned} I_j &\equiv E\left[\left|\sum_{i=1}^{N} \sum_{\substack{l=1 \\ l \neq j}}^{M} w_{ij}^* v_{il} r_l(t)\right|^2\right] \\ &= E\left[\left\{\sum_{i=1}^{N} \sum_{\substack{l=1 \\ l \neq j}}^{M} w_{ij}^* v_{il} r_l(t)\right\}\left\{\sum_{k=1}^{N} \sum_{\substack{m=1 \\ m \neq j}}^{M} w_{ik}^* v_{km} r_m(t)\right\}^*\right] \\ &= \sum_{\substack{l=1 \\ l \neq j}}^{M} \sum_{\substack{m=1 \\ m \neq j}}^{M} E[r_l(t) r_m^*(t)] \sum_{i=1}^{N} \sum_{k=1}^{N} w_{ij}^* v_{il} v_{km}^* w_{kj} \end{aligned} \tag{49}$$

However, by assumption A1 the signals are statistically independent and therefore $$E[r_l(t) r_m^*(t)] = 0, \text{ for } m \neq l. \tag{50}$$

Additionally, applying the stationarity of assumption A1 and assumption A2, $$E[r_l(t) r_l^*(t)] = P_l. \tag{51}$$

Using (50) and substituting equation (51) into equation (49), the residual interference power reduces to $$I_j = \sum_{\substack{l=1 \\ l \neq j}}^{M} P_l \sum_{i=1}^{N} \sum_{k=1}^{N} w_{ij}^* v_{il} v_{kl}^* w_{kj} \tag{52}$$

which can be represented using vector notation as $$I_j = \sum_{\substack{l=1 \\ l \neq j}}^{M} P_l w_j^H v_l v_l^H w_j. \tag{53}$$

The second-order moment of the third term in (44) is the output noise power and is given by $$\begin{aligned} N_j &\equiv E\left[\left|\sum_{i=1}^{N} w_{ij}^* n_i(t)\right|^2\right] \\ &= E\left[\left\{\sum_{i=1}^{N} w_{ij}^* n_i(t)\right\}\left\{\sum_{k=1}^{N} w_{kj}^* n_k(t)\right\}^*\right] \\ &= \sum_{i=1}^{N} \sum_{k=1}^{N} w_{ij}^* E[n_i(t) n_k^*(t)] w_{kj} \end{aligned} \tag{54}$$

which can be represented using vector notation as $$N_j = w_j^H E[n(t) n^H(t)] w_j. \tag{55}$$

By definition and assumption A4, the expectation of the outer product of the noise vector is the noise covariance matrix, $$E[n(t)n^H(t)] = K_n \quad (56)$$

and thus the output noise power is $$N_j = w_j^H K_n w_j. \quad (57)$$

To evaluate the effectiveness of a blind source separation technique, a measure of the quality of the separation is utilized. As previously described, the blind source separation technique as described herein determines a separation matrix W that will diagonalize the mixing matrix V. Two measures to assess the quality of a blind source separation algorithm are developed herein. Performance of the BSS technique may be measured in terms of residual interference and in terms of the efficiency of the algorithm in "capturing" all available signal power illuminating the array of sensors.

One measure of the quality of separation is the amount of residual interference found in a signal output after the separation matrix has been applied. Specifically, the power of the residual interference relative to the desired signal in the estimate of the desired source averaged over all sources as well as the peak or maximum residual interference-to-signal ratio to assess the separation technique in terms of suppressing co-channel interference are proposed for use. This measure is of significance because, if the separation matrix does not perfectly diagonalize the mixing matrix, the off diagonal terms of the resultant matrix will permit residual interference in the signal outputs.

In most communications applications, the common measure of the amount of interference is the signal-to-interference ratio, which is the ratio of the desired signal power to the combined power of all interfering signals. However, as the goal of the blind source separation is to completely eliminate all interference, this ratio could become extremely large. As a result, the Interference-to-Signal ratio (ISR), which quantifies the residual power of the interference that a blind source separation algorithm or technique fails to suppress relative to a particular desired signal power, is proposed. The better an algorithm is the smaller this ratio will become.

The ISR of a particular desired signal is defined as $$\zeta_j = \frac{I_j}{S_j}. \quad (58)$$

Substituting (53) and (48) into (58), the ISR for a particular signal is $$\zeta_j = \frac{\sum_{\substack{l=1 \\ l \neq j}}^{M} P_l w_j^H v_l v_l^H w_j}{P_j w_j^H v_j v_j^H w_j}. \quad (59)$$

This value is also known as the rejection rate.

The overall quality of separation of a blind source separation technique may be measured by looking at the mean value of the individual source signal ISR's, $\zeta_j$, over all j. Thus the primary measure to be used to evaluate the performance of a blind source separation algorithm in terms of residual interference will be the average ISR given by $$ISR_{avg} \equiv \frac{1}{M} \sum_{j=1}^{M} \zeta_j. \quad (60)$$

The secondary measure in terms of residual interference will be the peak or maximum ISR, which is defined as $$ISR_{max} \equiv \max_j [\zeta_j]. \quad (61)$$

This secondary measure ensures that all source signals are effectively separated with an ISR no worst than $ISR_{max}$.

A second measure of the quality of separation is utilized to determine the efficiency of the source separation matrix in terms of its ability to make use of the available signal power. A BSS technique is considered more efficient if the output signal-to-interference-plus-noise ratio is maximized, thus having greater sensitivity in terms of being able to capture smaller signals, than a BSS technique not maximizing the output signal-to-interference-plus-noise ratio.

The efficiency of a blind source separation algorithm in using all of a source's signal power illuminating the array of sensors is yet another important measure of its quality of separation. This measure determines how much of the available signal power from a particular source is wasted or lost in the separation process. This loss results in a lower signal-to-noise-plus-interference ratio then would otherwise be theoretically achievable and thus a loss in system sensitivity. The Separation Power Efficiency (SPE) for a particular separation process output relative to the desired source signal's available normalized power is defined as $$\xi_j \equiv \frac{S_j}{P_j}, \quad (62)$$

where $\xi_j$ is indicative of the separation power efficiency for the $j^{th}$ source of the plurality of sources, $S_j$ is indicative of a power of a separated signal from the $j^{th}$ source, and $P_j$ is indicative of a normalize power of a signal from the $j^{th}$ source.

Substituting equation (48) in for the separation process output power reveals that the particular SPE $$\xi_j = \frac{P_j w_j^H v_j v_j^H w_j}{P_j} \quad (63)$$
$$= w_j^H v_j v_j^H w_j$$

depends only on the steering vector for the $j^{th}$ source and the $j^{th}$ column of the separation matrix. As with ISR, both the average SPE and the minimum SPE, defined as $$\xi_{avg} \equiv \frac{1}{M} \sum_{j=1}^{M} \xi_j \quad (64)$$

and $$\xi_{min} \equiv \min_j [\xi_j] \quad (65)$$

respectively, will be used to evaluate the separation power efficiency.

Note that by the definition of the illuminating source signal power, $P_j$, that the maximum value the SPE can achieve is one. Thus the maximum achievable average SPE is also one. A separation algorithm that achieves an SPE of one is guaranteed to have maximized the source signal power in the corresponding separation process output. The minimum SPE provides a measure of ensuring that all sources are successfully separated with a minimum separation power efficiency.

A BSS technique in accordance with an embodiment of the present invention utilizes cumulants, specifically spatial fourth order cumulant matrices. To better understand the use of cumulants in performing blind source separation, a cumulant definition and associated properties are provided below.

The joint cumulant, also known as a semi-invariant, of order N of the set of random variables $\{s_1, s_2, \ldots, s_N\}$ is defined as the $N^{th}$-order coefficient of the Taylor series expansion about the origin of the second characteristic function. See, for example, C. L. Nikias and A. P. Petropulu, *Higher-Order Spectra Analysis: A Non-Linear Signal Processing Framework*. (PTR Prentice-Hall, Upper Saddle River, N.J.: 1993) and M. Rosenblatt, *Stationary Sequences and Random Fields* (Birkhauser, Boston, Mass.: 1985), which are hereby incorporated by reference in their entirety as if presented herein. The second characteristic function is defined as the natural logarithm of the characteristic function, $$\Psi_s(\omega_1, \omega_2, \ldots, \omega_N) = \ln[\Phi_s(\omega_1, \omega_2, \ldots, \omega_N)] \quad (66)$$

where the characteristic function is defined as $$\Phi_s(\omega_1, \omega_2, \ldots, \omega_N) = E[e^{j(\omega_1 s_1 + \omega_2 s_2 + \cdots + \omega_N s_N)}]. \quad (67)$$

The joint $N^{th}$-order cumulant is then $$Cum[s_1, s_2, \ldots, s_N] = \quad (68)$$

$$(-j)^N \left. \frac{\partial^N \Psi_s(\omega_1, \omega_2, \ldots, \omega_N)}{\partial \omega_1 \partial \omega_2 \cdots \partial \omega_N} \right|_{\omega_1 = \omega_2 = \cdots = \omega_N = 0}.$$

Cumulants, unlike moments, cannot be directly estimated from the data. See, for example, A. K. Nandi, *Blind Estimation Using Higher-Order Statistics* (Kluwer Academic, Dordecht, The Netherlands: 1999), which is hereby incorporated by reference in its entirety as if presented herein. However, cumulants can be found through their relationship to moments and can thus be estimated indirectly by first estimating the required moments. The relationship of cumulants to moments is described in M. Rosenblatt, *Stationary Sequences and Random Fields* (Birkhauser, Boston, Mass.: 1985) for the $N^{th}$-order joint cumulant of the set of random variables $\{s_1, s_2, \ldots, s_N\}$ as $$Cum[s_1, s_2, \ldots, s_N] = \sum_{p=1}^{N} (-1)^{p-1}(p-1)! \left\{ \sum_{n=1}^{N(p)} \prod_{l=1}^{p} E\left[\prod_{i \in g_{l,p,n}} s_i\right] \right\} \quad (69)$$

where there are N(p) ways of partitioning the set of integers $\{1, 2, \ldots, N\}$ into p groups, each denoted as $g_{l,p,n}$, such that $$\bigcap_{l=1}^{p} g_{l,p,n} = \{\emptyset\} \quad (70)$$

$$\bigcup_{l=1}^{p} g_{l,p,n} = \{1, 2, \ldots, N\}$$

As an example, for the case N=4, the partitioning is defined on the set of integers $\{1, 2, 3, 4\}$ and is given in Table 1.0 below.

TABLE 1.0

All Possible Partitions for N = 4

| p | N(p) | $g_{l=1:p,p,n=1:N(p)}$ |
|---|---|---|
| 1 | 1 | {1, 2, 3, 4} |
| 2 | 7 | {1} {2, 3, 4}; {2} {1, 3, 4}; {3} {1, 2, 4}; {4} {1, 2, 3}; {1, 2} {3, 4}; {1, 3} {2, 4}; {1, 4} {2, 3} |
| 3 | 6 | {1} {2} {3, 4}; {1} {3} {2, 4}; {1} {4} {2, 3}; {2} {3} {1, 4}; {2} {4} {1, 3}; {3} {4} {1, 2} |
| 4 | 1 | {1} {2} {3} {4} |

The $4^{th}$-order joint cumulant as a function of the moments is then $$Cum[s_1, s_2, s_3, s_4] = \quad (71)$$

$$E[s_1 s_2 s_3 s_4] - E[s_1] \cdot E[s_2 s_3 s_4] - E[s_2] \cdot E[s_1 s_3 s_4] -$$

$$E[s_3] \cdot E[s_1 s_2 s_4] - E[s_4] \cdot E[s_1 s_2 s_3] - E[s_1 s_2] \cdot E[s_3 s_4] -$$

$$E[s_1 s_3] \cdot E[s_2 s_4] - E[s_1 s_4] \cdot E[s_2 s_3] + 2E[s_1 s_2] \cdot E[s_3] \cdot E[s_4] +$$

$$2E[s_1 s_3] \cdot E[s_2] \cdot E[s_4] + 2E[s_1 s_4] \cdot E[s_2] \cdot E[s_3] +$$

$$2E[s_2 s_3] \cdot E[s_1] \cdot E[s_4] + 2E[s_2 s_4] \cdot E[s_1] \cdot E[s_3] +$$

$$2E[s_3 s_4] \cdot E[s_1] \cdot E[s_2] - 6E[s_1] \cdot E[s_2] \cdot E[s_3] \cdot E[s_4]$$

Note that equation (71) shows that computation of the $N^{th}$-order joint cumulant requires knowledge of all moments up to order N.

Cumulants possess several properties that make them attractive for use in the blind separation of a linear mixture of unknown statistically independent signals in spatially and/or temporally correlated Gaussian noise, especially at a low signal-to-noise ratio.

One property that makes cumulants attractive for use in blind source separation is that if the set of random variables $\{s_1, s_2, \ldots, s_N\}$ can be divided in to two or more groups that are statistically independent, then their $N^{th}$-order joint cumulant is zero. Thus, the cumulant operator in the blind separation of statistically independent sources will suppress all cross-source signal cumulant terms. In general, this is not the case for higher-order moments. Another property that makes cumulants attractive for use in BSS is that the $Cum[s_1+n_1, s_2+n_2, \ldots, s_N+n_N] = Cum[s_1, s_2, \ldots, s_N] + Cum[n_1, n_2, \ldots, n_N]$. Because in general the set of signal terms $\{s_1, s_2, \ldots, s_N\}$ and the set of noise terms $\{n_1, n_2, \ldots, n_N\}$ are statistically independent from each other, the $N^{th}$-order joint cumulant of the terms of their vector sum, $\{s_1+n_1, s_2+n_2, \ldots, s_N+n_N\}$, is the sum of their individual joint cumulants. Therefore, the cross cumulants between the noise terms and signal terms will be zero. This property is important in guaranteeing that the spatial fourth-order cumulant matrix can be decomposed into the sum of two matrices, one corresponding to the signals and the other corresponding to noise vector.

Yet another property that makes cumulants attractive for use in BSS is that the joint cumulant of order N>2 of a Gaussian random variable is zero. Because the noise vector is a multi-variate Gaussian random process, $n = \lceil n_1, n_2, \ldots, n_N \rceil^T \sim N(\mu_n, K_n)$, its joint cumulant of order three or higher will be zero. That is $Cum[n_1, n_2, \ldots, n_N] = 0$. This last property results in the spatial fourth-order cumulant matrix not having a noise subspace and the only non-zero elements of the matrix are associated with and only with the source signals. This is true even if the noise vector is spatially or temporally correlated.

Finally, cumulants of order higher than two preserve phase information that is lost by the use of second-order statistics, such as correlation. For example, auto-correlation destroys the information necessary to distinguish between minimum phase and non-minimum phase signals. Thus, two signals may have identical second-order statistics yet have different higher-order statistics. This property is of particular interest in handling signals with identical auto-correlation functions and adds additional degrees of freedom for finding a set of time lags where a group of source signals will have different higher-order cumulants. This property is particularly advantageous to a BSS technique in accordance with the present invention because a condition of identifiability of this BSS technique is that all signals have a unique normalized fourth-order auto-cumulant. Note that the fourth-order cumulant is used because odd order cumulants of a process with a symmetric distribution will be zero.

Four properties of cumulants utilized in the BSS technique in accordance with the present invention are described below. Proofs of these cumulant properties may be found in C. L. Nikias and A. P. Petropulu, *Higher-Order Spectra Analysis: A Non-Linear Signal Processing Framework*. (PTR Prentice-Hall, Upper Saddle River, N.J.: 1993) and M. Rosenblatt, *Stationary Sequences and Random Fields* (Birkhauser, Boston, Mass.: 1985).

Cumulant Property 1:

The $N^{th}$ order joint cumulant of the set of random variables $\{\alpha_1 s_1, \alpha_2 s_2, \ldots, \alpha_N s_N\}$ is $$Cum[a_1 s_1, a_2 s_2, \ldots, a_N s_N] = \left\{\prod_{i=1}^{N} a_i\right\} Cum[s_1, s_2, \ldots, s_N] \text{ where } \{a_1, a_2, \ldots, a_N\}$$

are constants.

Cumulant Property 2:

If the set of random variables $\{s_1, s_2, \ldots, s_N\}$ can be divided in to two or more groups that are statistically independent, then their $N^{th}$-order joint cumulant is zero.

Cumulant Property 3:

If the sets of random variables $\{s_1, s_2, \ldots, s^N\}$ and $\{n_1, n_2, \ldots, n_N\}$ are statistically independent, i.e. $f_{s,n}(s_1, s_2, \ldots, s_N, n_1, n_2, \ldots, n_N) = f_s(s_1, s_2, \ldots, s_N) \cdot f_n(n_1, n_2, \ldots, n_N)$, then the $N^{th}$-order joint cumulant of the pair-wise sum is $$Cum[s_1+n_1, s_2+n_2, \ldots, s_N+n_N] = Cum[s_1, s_2, \ldots, s_N] + Cum[n_1, n_2, \ldots, n_N].$$

Cumulant Property 4:

If the set of random variables $\{n_1, n_2, \ldots, n_N\}$ are jointly Gaussian, then the joint cumulants of order N>2 are identically zero. That is, if $n=[n_1, n_2, \ldots, n_N]^T \sim N(\mu_n, K_n)$, then $Cum[n_1, n_2, \ldots, n_N]=0$.

A BSS technique in accordance with the present invention utilizes a fourth order spatial cumulant matrix. Three definitions of the spatial fourth-order cumulant matrix and associated properties are provided below.

The spatial fourth-order cumulant matrix is used as a basis for estimating a separation matrix at low signal-to-noise ratios and in the presence of spatially and temporally correlated noise since it theoretically has no noise subspace, even if the noise is correlated. This eliminates the need to use either degrees of freedom and/or secondary sensor data to estimate the noise subspace, which must be removed in order for the matrix-pencil to be formed. As described below, the absence of the noise subspace is a direct result of using a higher-order cumulant, i.e. order >2, and is particularly advantageous to a blind source separation technique in accordance with the present invention.

The three spatial fourth-order cumulant matrix definitions and their properties are presented herein with consideration of the fact that the sensors are in reality never omni-directional, never have identical manifolds, and that different sets of time lags are needed to estimate a pair of spatial fourth-order cumulant matrices to form the matrix-pencil. These considerations are a clear distinction from previous treatments of the spatial fourth-order cumulant matrix. See, for example, H. H. Chiang and C. L. Nikias, "The ESPRIT Algorithm with Higher-Order Statistics," *Proc. Workshop on Higher-Order Spectral Analysis*, Vail, Colo., June 1989, pp. 163–168, C. L. Nikias, C. L. Nikias and A. P. Petropulu, *Higher-Order Spectra Analysis: A Non-Linear Signal Processing Framework* (PTR Prentice-Hall, Upper Saddle River, N.J.: 1993), M. C. Dogan and J. M. Mendel, "Applications of Cumulants to Array Processing—Part I: Aperture Extension and Array Calibration," *IEEE Trans. Signal Processing*, Vol. 43, No. 5, May 1995, pp. 1200–1216, and N. Yuen and B. Friedlander, "Asymptotic Performance Analysis of ESPRIT, Higher-order ESPRIT, and Virtual ESPRIT Algorithms," *IEEE Trans. Signal Processing*, Vol. 44, No. 10, October 1996, pp. 2537–2550. Understanding the properties of the spatial fourth-order cumulant matrix such as its rank, null spaces, etc., and its relationship to the mixing matrix are beneficial to developing a signal subspace blind separation technique using fourth-order cumulants and a matrix-pencil in accordance with the present invention.

A brief review of the spatial correlation matrix and its properties are provided below to aid in understand its use in a BSS technique in accordance with the present invention. The spatial correlation matrix of the sensor array output is defined in D. H. Johnson and D. E. Dudgeon, *Array Signal Processing: Concepts and Techniques.* (PTR Prentice-Hall, Englewood Cliffs, N.J.: 1993), which is hereby incorporated by reference in its entirety as if presented herein, as:

$$R_x(\tau) = E[x(t)x^H(t-\tau)] \tag{72}$$

Substituting (25) for x(t) in to equation (72) and applying assumptions A1 and A3, the spatial correlation matrix becomes $$R_x(\tau) = \tag{73}$$

$$E[\{Vr(t) + n(t)\}\{Vr(t-\tau) + n(t-\tau)\}^H] = E[Vr(t)r^H(t-\tau)V^H] +$$

$$E[Vr(t)n^H(t-\tau)] + E[n(t)r^H(t-\tau)V^H] + E[n(t)n^H(t-\tau)] =$$

$$VE[r(t)r^H(t-\tau)]V^H + E[n(t)n^H(t-\tau)] = VR_r(\tau)V^H + R_n(\tau)$$

which has elements $$[R_x(\tau)]_{rc} = \sum_{j=1}^{M} v_{rj} v_{cj}^* E[r_j(t) r_j^*(t-\tau)] + E[n_r(t) n_c^*(t-\tau)] \tag{74}$$

where the subscript rc indicates the element is in the $r^{th}$ row and $c^{th}$ column. Since the signal and noise processes are assumed to be zero mean, assumptions A2 and A4, the spatial correlation matrix defined in equation (72) is equivalent to the spatial covariance matrix, and thus the terms are used interchangeably.

In general, most second-order techniques make use of the spatial correlation or covariance matrix only at a delay lag of zero, $\{\tau=0\}$. In such a case the spatial correlation matrix is Hermitian and non-negative definite. See for example D. H. Johnson and D. E. Dudgeon, *Array Signal Processing: Concepts and Techniques*. (PTR Prentice-Hall, Englewood Cliffs, N.J.: 1993), C. L. Nikias and A. P. Petropulu, *Higher-Order Spectra Analysis: A Non-Linear Signal Processing Framework*. (PTR Prentice-Hall, Upper Saddle River, N.J.: 1993), and A. Papoulis, *Probability, Random Variables, and Stochastic Processes*. (WCB/McGraw-Hill, Boston, Mass.: 1991), for example. Further, if the sensor outputs are linearly independent, that is $E[\{a^T x(t)\}\{a^T x(t)\}^*] > 0$ for any $a=[\alpha_1, \alpha_2, \ldots, \alpha N]^T \neq 0$, then the spatial correlation matrix is positive definite. As a consequence of the spatial correlation matrix being non-negative definite for $\tau=0$, its determinant will be real and non-negative, and will be strictly positive if and only if the sensor outputs are linearly independent. However, if $\tau \neq 0$ then the spatial covariance matrix is indefinite and non-Hermitian.

Spatial Fourth-Order Cumulant Matrix Definition 1

The first definition of a spatial fourth-order cumulant matrix presented takes advantage of the steering vectors having a norm of one. This is stated mathematically in equation (26). As will be shown, this is utilized to factor the spatial fourth-order cumulant matrix into Hermitian form when the sensors are not omni-directional with identical manifolds. The first spatial fourth-order cumulant matrix is defined at the set of time lags $(\tau_1, \tau_2, \tau_3)$ as $$C_x^4(\tau_1, \tau_2, \tau_3) \equiv \sum_{i=1}^{N} Cum[x_i^*(t-\tau_1)x_i(t-\tau_2) \times (t) X^H(t-\tau_3)] \quad (75)$$

and is referred to as spatial fourth-order cumulant matrix 1.

The spatial fourth-order cumulant matrix 1 as defined in (75) is in general a complex N×N matrix with the element in the $r^{th}$ row and $c^{th}$ column given by $$[C_x^4(\tau_1, \tau_2, \tau_3)]_{rc} = \sum_{i=1}^{N} Cum[x_i^*(t-\tau_1)x_i(t-\tau_2)x_r(t)x_c^*(t-\tau_3)] \quad (76)$$

where $\{\ \}^*$ denotes complex conjugation. Substituting equation (24) into (76), element rc becomes $$[C_x^4(\tau_1, \tau_2, \tau_3)]_{rc} = \quad (77)$$

$$\sum_{i=1}^{N} Cum\left[\left(\sum_{j=1}^{M} v_{rj} r_j(t) + n_r(t)\right)\left(\sum_{m=1}^{M} v_{cm} r_m(t-\tau_3) + n_c(t-\tau_3)\right)^* \cdot \left(\sum_{k=1}^{M} v_{ik} r_k(t-\tau_1) + n_i(t-\tau_1)\right)^*\left(\sum_{l=1}^{M} v_{il} r_l(t-\tau_2) + n_i(t-\tau_2)\right)\right]$$

Then, by Cumulant Property 3 and assumption A3, (77) becomes $$[C_x^4(\tau_1, \tau_2, \tau_3)]_{rc} = \quad (78)$$

$$\sum_{i=1}^{N} Cum\left[\sum_{j=1}^{M} v_{rj} r_j(t) \sum_{k=1}^{M} v_{ik}^* r_k^*(t-\tau_1) \sum_{l=1}^{M} v_{il} r_l(t-\tau_2) \cdot \sum_{m=1}^{M} v_{cm}^* r_m^*(t-\tau_3)\right] +$$

$$\sum_{i=1}^{N} Cum[n_r(t) n_i^*(t-\tau_1) n_i(t-\tau_2) n_c^*(t-\tau_3)]$$

where the terms have been re-ordered. However, by assumption A4 and Cumulant Property 4, $$\sum_{i=1}^{N} Cum[n_r(t) n_i^*(t-\tau_1) n_i(t-\tau_2) n_c^*(t-\tau_3)] = 0 \quad (79)$$

and thus (78) becomes $$[C_x^4(\tau_1, \tau_2, \tau_3)]_{rc} = \sum_{i=1}^{N} Cum\left[\sum_{j=1}^{M} v_{rj} r_j(t) \sum_{k=1}^{M} v_{ik}^* r_k^*(t-\tau_1) \right. \quad (80)$$

$$\left. \sum_{l=1}^{M} v_{il} r_l(t-\tau_2) \cdot \sum_{m=1}^{M} v_{cm}^* r_m^*(t-\tau_3)\right]$$

Then, by the source signals statistical independence of assumption A1 and repeatedly applying Cumulant Property 3, equation (80) reduces to $$[C_x^4(\tau_1, \tau_2, \tau_3)]_{rc} = \sum_{i=1}^{N}\sum_{j=1}^{M} Cum[v_{rj} r_j(t) v_{ij}^* r_j^*(t-\tau_1) \quad (81)$$

$$v_{ij} r_j(t-\tau_2) v_{cj}^* r_j^*(t-\tau_3)^*].$$

Using Cumulant Property 1, the complex weights may then be pulled out in front of the cumulant operator in equation (81) to give $$[C_x^4(\tau_1, \tau_2, \tau_3)]_{rc} = \sum_{i=1}^{N}\sum_{j=1}^{M} v_{rj} v_{ij}^* v_{ij} v_{cj}^* Cum[r_j(t) r_j^*(t-\tau_1) \quad (82)$$

$$r_j(t-\tau_2) r_j^*(t-\tau_3)].$$

Reordering the summation yields $$[C_x^4(\tau_1, \tau_2, \tau_3)]_{rc} = \sum_{j=1}^{M} v_{rj} v_{cj}^* \sum_{i=1}^{N} v_{ij}^* v_{ij} Cum[r_j(t) r_j^*(t-\tau_1) \quad (83)$$

$$r_j(t-\tau_2) r_j^*(t-\tau_3)].$$

However, since the steering vectors have a norm of 1, that is $$\sum_{i=1}^{N} v_{ij}^* v_{ij} = \sum_{i=1}^{N} \alpha_{ij}^2 = 1,$$

equation (83) reduces $$[C_x^4(\tau_1, \tau_2, \tau_3)]_{rc} = \sum_{j=1}^{M} v_{rj} v_{cj}^* Cum[r_j(t) r_j^*(t-\tau_1) \quad (84)$$

$$r_j(t-\tau_2) r_j^*(t-\tau_3)].$$

From (84) it can be seen that spatial fourth-order cumulant matrix 1 can be factored into Hermitian form, as was the case for spatial correlation matrix, $$C_x^4(\tau_1, \tau_2, \tau_3) = VC_r^4(\tau_1, \tau_2, \tau_3)V^H \qquad (85)$$

where $C_r^4(\tau_1, \tau_2, \tau_3)$ is a M×M diagonal matrix with elements, $$[C_r^4(\tau_1, \tau_2, \tau_3)]_{jj} = Cum[r_j(t)r_j^*(t-\tau_1)r_j(t-\tau_2)r_j^*(t-\tau_3)] \qquad (86)$$

$$\equiv c_{r_j}^4(\tau_1, \tau_2, \tau_3).$$

Expanding equation (85) it is found that spatial fourth-order cumulant matrix 1 can be written as a sum of the steering vector outer products scaled by the individual source signal's fourth-order cumulant.

$$C_x^4(\tau_1, \tau_2, \tau_3) = \sum_{j=1}^{M} c_{r_j}^4(\tau_1, \tau_2, \tau_3) v_j v_j^H, \text{ where} \qquad (87)$$

$C_x^4(\tau_1, \tau_2, \tau_3)$ is the spatial fourth order cumulant matrix having a first time lag, $\tau_1$, a second time lag, $\tau_2$, and a third time lag, $\tau_3$, each time lag being indicative of a time delay from one of the plurality of sources to one of the plurality of elements; M is indicative of a number of sources in the plurality of sources; $c_{r_j}^4(\tau_1, \tau_2, \tau_3)$ is a fourth order cumulant of a $j^{th}$ source signal from one of the plurality of sources having delay lags $\tau_1, \tau_2$, and $\tau_3$; and $v_j v_j^H$ is indicative of an outer product of a $j^{th}$ steering vector.

From equation (87) it is clear that spatial fourth-order cumulant matrix 1 lies in the signal subspace spanned by the set of steering vectors. Note that the spatial fourth-order cumulant matrix does not have the noise subspace that is present in the spatial correlation matrix. What was the noise subspace in the spatial covariance matrix is now the nullspace of the spatial fourth-order cumulant matrix. This property will be shown to be true for the other spatial fourth-order cumulant matrix definitions presented.

Spatial Fourth-Order Cumulant Matrix 1 Properties

Spatial fourth-order cumulant matrix 1, $C_x^4(\tau_1, \tau_2, \tau_3)$, has several properties, an understanding of which will facilitate the development of a method for estimating a separation matrix W. Establishing the spatial fourth-order cumulant matrix 1's matrix properties is a first step to the use of the generalized eigen decomposition of the matrix-pencil formed by a pair of spatial fourth-order cumulant matrix 1's at two sets of time lags. Such things as its rank and its subspaces relationships to the mixing matrix's subspaces are advantageous in developing a signal subspace separation algorithm. Particular attention is paid to the fact the individual sensors are not assumed to be omni-directional with identical directivity for each impinging source signal wavefield.

Property 1: Spatial fourth-order cumulant matrix 1 is Hermitian if and only if $\tau_1 = \tau_2 = \tau$ and $\tau_3 = 0$, i.e. $C_x^4(\tau, \tau, 0)$.

Property 2: The trace of spatial fourth-order cumulant matrix 1 equals the sum of the signal fourth-order cumulants, which is the trace of the diagonal matrix $C_r^4(\tau_1, \tau_2, \tau_3)$.

$$tr(C_x^4(\tau_1, \tau_2, \tau_3)) = \sum_{j=1}^{M} c_{r_j}^4(\tau_1, \tau_2, \tau_3) \qquad (88)$$

$$= tr(C_r^4(\tau_1, \tau_2, \tau_3))$$

Property 3: The column space of spatial fourth-order cumulant matrix 1, denoted as $C(C_x^4(\tau_1, \tau_2, \tau_3))$, is spanned by the set of steering vectors.

$$sp(C(C_x^4(\tau_1, \tau_2, \tau_3))) = \{v_1, v_2, \ldots, v_M\} \qquad (89)$$

Further, if the mixing matrix has full column rank, then the set of steering vectors are linearly independent and they form a basis for the column space of spatial fourth-order cumulant matrix 1.

Property 4: If V has full column rank, then the rank of spatial fourth-order cumulant matrix 1 equals the rank of the mixing matrix. That is $$\rho(C_x^4(\tau_1, \tau_2, \tau_3)) = \rho(V) \qquad (90)$$

if $\rho(V) = M$, where $\rho( )$ denotes rank.

Property 5: The "right" nullspace of spatial fourth-order cumulant matrix 1 and the "left" nullspace of the mixing matrix are equal if the mixing matrix has full column rank.

$$N_r(C_x^4(\tau_1, \tau_2, \tau_3)) = N_l(V) \qquad (91)$$

Spatial Fourth-Order Cumulant Matrix Definition 2

The second definition for a spatial fourth fourth-order cumulant matrix is one modified from the definition described in H. H. Chiang and C. L. Nikias, "The ESPRIT Algorithm with Higher-Order Statistics," *Proc. Workshop on Higher-Order Spectral Analysis*, Vail, Colo., June 1989, pp. 163–168 and C. L. Nikias and A. P. Petropulu, *Higher-Order Spectra Analysis: A Non-Linear Signal Processing Framework*. (PTR Prentice-Hall, Upper Saddle River, N.J.: 1993). These definitions are used and the set of time lags $(\tau_1, \tau_2, \tau_3)$ are incorporated to obtain spatial fourth-order cumulant matrix 2.

$$C_x^{4'}(\tau_1, \tau_2, \tau_3) \equiv Cum[\{x(t)x^*(t-\tau_1)x(t-\tau_2)\}x^H(t-\tau_3)] \qquad (92)$$

Spatial fourth-order cumulant matrix 2 is a N×N matrix with the element in the $r^{th}$ row and $c^{th}$ column $$[C_x^{4'}(\tau_1, \tau_2, \tau_3)]_{rc} = Cum[x_r(t)x_r^*(t-\tau_1)x_r(t-\tau_2)x_c^*(t-\tau_3)]. \qquad (93)$$

Substituting equation (24) for $x_r(t)$ in equation (93), element rc becomes $$[C_x^{4'}(\tau_1, \tau_2, \tau_3)]_{rc} = Cum\left[\left(\sum_{j=1}^{M} v_{rj} r_j(t) + n_r(t)\right) \right. \qquad (94)$$

$$\left(\sum_{k=1}^{M} v_{rk} r_k(t-\tau_1) + n_r(t-\tau_1)\right)^* \cdot$$

$$\left(\sum_{l=1}^{M} v_{rl} r_l(t-\tau_2) + n_r(t-\tau_2)\right)$$

$$\left.\left(\sum_{m=1}^{M} v_{cm} r_m(t-\tau_3) + n_c(t-\tau_3)\right)^*\right]$$

Following the simplification of spatial fourth-order cumulant matrix 1, Cumulant Property 3 and assumption A3 are applied to reduce equation (94).

$$[C_x^{4'}(\tau_1, \tau_2, \tau_3)]_{rc} = Cum\left[\sum_{j=1}^{M} v_{rj} r_j(t) \sum_{k=1}^{M} v_{rk}^* r_k^*(t-\tau_1) \right. \qquad (95)$$

$$\left.\sum_{l=1}^{M} v_{rl} r_l(t-\tau_2) \cdot \sum_{m=1}^{M} v_{cm}^* r_m^*(t-\tau_3)\right] +$$

$$Cum[n_r(t) n_r^*(t-\tau_1) n_r(t-\tau_2) n_c^*(t-\tau_3)]$$

However, by assumption A4 and Cumulant Property 4, $$\text{Cum}[n_r(t)n_r^*(t-\tau_1)n_r(t-\tau_2)n_c^*(t-\tau_3)]=0 \quad (96)$$

and thus (95) reduces to $$\left[C_x^{4'}(\tau_1, \tau_2, \tau_3)\right]_{rc} = Cum\left[\sum_{j=1}^{M} v_{rj}r_j(t) \sum_{k=1}^{M} v_{rk}^* r_k^*(t-\tau_1) \right. \quad (97)$$

$$\left. \sum_{l=1}^{M} v_{rl}r_l(t-\tau_2) \cdot \sum_{m=1}^{M} v_{cm}^* r_m^*(t-\tau_3)\right].$$

Then, by the statistical independence of the source signals of assumption A1 and repeatedly applying Cumulant Property 3, equation (97) reduces to $$\left[C_x^{4'}(\tau_1, \tau_2, \tau_3)\right]_{rc} = \sum_{j=1}^{M} Cum[v_{rj}r_j(t)v_{rj}^* r_j^*(t-\tau_1) \quad (98)$$

$$v_{rj}r_j(t-\tau_2)v_{cj}^* r_j^*(t-\tau_3)^*].$$

Using Cumulant Property 1, the complex weights may then be pulled out in front of the cumulant operator in equation (98) to give $$\left[C_x^{4'}(\tau_1, \tau_2, \tau_3)\right]_{rc} = \sum_{j=1}^{M} v_{rj}v_{rj}^* v_{rj}v_{cj}^* Cum[r_j(t)r_j^*(t-\tau_1) \quad (99)$$

$$r_j(t-\tau_2)r_j^*(t-\tau_3)].$$

However, $v_{rj}v_{rj}^* = \alpha_{rj}^2$ and equation (99) reduces $$\left[C_x^{4'}(\tau_1, \tau_2, \tau_3)\right]_{rc} = \sum_{j=1}^{M} \alpha_{rj}^2 v_{rj}v_{cj}^* Cum[r_j(t)r_j^*(t-\tau_1) \quad (100)$$

$$r_j(t-\tau_2)r_j^*(t-\tau_3)].$$

From (100) it can be seen that spatial fourth-order cumulant matrix 2 in general can not be factored into Hermitian form, as was the case for spatial fourth-order cumulant matrix 1 and the spatial covariance matrix. However, if $$\tilde{v}_{rj} \equiv \alpha_{rj}^2 v_{rj} \quad (101)$$

is defined, it can be factored in to bilinear form.

$$C_x^{4'}(\tau_1, \tau_2, \tau_3) = \tilde{V}C_r^4(\tau_1, \tau_2, \tau_3)V^H \quad (102)$$

where the element in the $r^{th}$ row and $c^{th}$ column of the N×M "modified" mixing matrix $\tilde{V}$ is $$[\tilde{V}]_{rc} = \tilde{v}_{rc}. \quad (103)$$

Expanding equation (102), it is found that spatial fourth-order cumulant matrix 2 can be written as a sum of the outer products of the "modified" steering vector, $\tilde{v}_j$, and steering vector scaled by the individual source signal's fourth-order cumulant.

$$C_x^{4'}(\tau_1, \tau_2, \tau_3) = \sum_{j=1}^{M} c_{rj}^4(\tau_1, \tau_2, \tau_3)\tilde{v}_j v_j^H \quad (104)$$

Note that the "modified" steering vector $\tilde{v}_j$ is the $j^{th}$ column of the matrix $\tilde{V}$.

A question pertaining to spatial fourth-order cumulant matrix 2 is whether or not it is rank deficient. Following the derivation of the rank of spatial fourth-order cumulant matrix 1, the rank of spatial fourth-order cumulant matrix 2 will be equal to the rank of the mixing matrix if "modified" mixing matrix, $\tilde{V}$, and the mixing matrix both have full column rank. The mixing matrix V can be assumed to have full column rank since this can be guaranteed by design of the array. However, the rank of $\tilde{V}$ cannot be guaranteed by design and as of yet, it is unclear if guaranteeing that the mixing matrix has full column rank is sufficient to guarantee that the "modified" mixing matrix will have full column rank. Although the "modified" mixing matrix $\tilde{V}$ is the Hadamard product $$\tilde{V} \equiv V \odot V \odot V \quad (105)$$

the rank of the mixing matrix is not necessarily preserved. See for example, J. R. Schott, *Matrix Analysis for Statistics*. (John Wiley and Sons, New York, N.Y.: 1997). At this point it shall be assumed that the Hadamard product preserves the rank of the mixing matrix and therefore that the mixing matrix having full column rank is sufficient to guarantee that the "modified" mixing matrix has full column rank. The implications of the "modified" mixing matrix not having full column rank will be clear in the subsequent sections.

If the "modified" mixing matrix has full column rank, by inspection of equation (104) it is obvious that spatial fourth-order cumulant matrix 2 lies in the signal subspace spanned by the set of "modified" steering vectors. Again, the noise subspace in the spatial covariance matrix is now a nullspace of spatial fourth-order cumulant matrix 2. Note that in H. H. Chiang and C. L. Nikias, "The ESPRIT Algorithm with Higher-Order Statistics," *Proc. Workshop on Higher-Order Spectral Analysis*, Vail, Colo., June 1989, pp. 163–168 and C. L. Nikias and A. P. Petropulu, *Higher-Order Spectra Analysis: A Non-Linear Signal Processing Framework*. (PTR Prentice-Hall, Upper Saddle River, N.J.: 1993), the elements/sensors are omni-directional with unit gain so that $\alpha_{ij}^2 = 1$ and as such, spatial fourth-order cumulant matrix 2 and spatial fourth-order cumulant matrix 1 would be equal and the "modified" mixing matrix has full column rank. However, this is an unrealistic assumption since in practice sensors are never omni-directional.

Spatial Fourth-Order Cumulant Matrix 2 Properties

If the "modified" mixing matrix $\tilde{V}$ has full column rank, spatial fourth-order cumulant matrix 2 will possess many of the same properties that spatial fourth-order cumulant matrix 1 does. The subsequent sections derive the key properties associated with the development of a matrix-pencil signal subspace separation technique with the assumption that the "modified" mixing matrix has full column rank.

Property 1

Spatial fourth-order cumulant matrix 2 is in general non-Hermitian. It will be Hermitian if and only if $\tau_1 = \tau_2 = \tau$ and $\tau_3 = 0$, i.e. $C_x^{4'}(\tau, \tau, 0)$ and the sensors all have the identical gain for a given signal.

Property 2

The trace of spatial fourth-order cumulant matrix 2 equals the sum of the signal fourth-order cumulants scaled by the sum of the sensor magnitudes to the fourth power.

$$tr(C_x^{4'}(\tau_1, \tau_2, \tau_3)) = \sum_{j=1}^{M}\sum_{r=1}^{N} \alpha_{rj}^2 c_{rj}^4(\tau_1, \tau_2, \tau_3) \quad (106)$$

Property 3

The column space of spatial fourth-order cumulant matrix 2, denoted as $C(C_x^{4'}(\tau_1, \tau_2, \tau_3))$, is spanned by the set of "modified" steering vectors.

$$sp(C(C_x^{4'}(\tau_1, \tau_2, \tau_3))) = \{\tilde{v}_1, \tilde{v}_2, \ldots, \tilde{v}_M\} \quad (107)$$

Further, if the "modified" mixing matrix has full column rank, then the set of "modified" steering vectors are linearly independent and they form a basis for the column space of spatial fourth-order cumulant matrix 2.

Property 4

The rank of spatial fourth-order cumulant matrix 2 equals the rank of the mixing matrix, if $V$ and $\tilde{V}$ have full column rank. That is $$\rho(C_x^{4'}(\tau_1, \tau_2, \tau_3)) = \rho(V) \quad (108)$$

if $\rho(V) = \rho(\tilde{V}) = M$, where $\rho(\cdot)$ denotes rank.

Property 5

The "right" nullspace of spatial fourth-order cumulant matrix 2 and the "left" nullspace of the mixing matrix are equal if the mixing matrix and "modified" mixing matrix have full column rank.

$$N_r(C_x^{4'}(\tau_1, \tau_2, \tau_3)) = N_l(V) \quad (109)$$

Spatial Fourth-Order Cumulant Matrix Definition 3

The third and final definition for a spatial fourth-order cumulant matrix incorporates the time lags $(\tau_1, \tau_2, \tau_3)$ and results in the following equation.

$$C_x^{4''}(\tau_1, \tau_2, \tau_3) = \text{Cum}[\{x(t)x^*(t-\tau_1)x^*(t-\tau_2)\}x^T(t-\tau_3)] \quad (110)$$

Spatial fourth-order cumulant matrix 3 is again a N×N matrix with the element in the $r^{th}$ row and $c^{th}$ column $$[C_x^{4''}(\tau_1, \tau_2, \tau_3)]_{rc} = \text{Cum}[x_r(t)x_r^*(t-\tau_1)x_r^*(t-\tau_2)x_c(t-\tau_3)]. \quad (111)$$

Substituting equation (81) for $x_r(t)$ in equation (111), element rc becomes $$[C_x^{4''}(\tau_1, \tau_2, \tau_3)]_{rc} = \text{Cum}\left[\left(\sum_{j=1}^{M} v_{rj} r_j(t) + n_r(t)\right)\right. \quad (112)$$

$$\left(\sum_{k=1}^{M} v_{rk} r_k(t-\tau_1) + n_r(t-\tau_1)\right)^*$$

$$\left(\sum_{l=1}^{M} v_{rl} r_l(t-\tau_2) + n_r(t-\tau_2)\right)^*$$

$$\left.\left(\sum_{m=1}^{M} v_{cm} r_m(t-\tau_3) + n_c(t-\tau_3)\right)\right]$$

Following the simplification of spatial fourth-order cumulant matrix 2, Cumulant Property 3 and assumption A3 are applied to reduce equation (112).

$$[C_x^{4''}(\tau_1, \tau_2, \tau_3)]_{rc} = \text{Cum}\left[\sum_{j=1}^{M} v_{rj} r_j(t) \sum_{k=1}^{M} v_{rk}^* r_k^*(t-\tau_1)\right. \quad (113)$$

$$\left.\sum_{l=1}^{M} v_{rl}^* r_l^*(t-\tau_2) \cdot \sum_{m=1}^{M} v_{cm} r_m(t-\tau_3)\right] +$$

$$\text{Cum}[n_r(t) n_r^*(t-\tau_1) n_r^*(t-\tau_2) n_c(t-\tau_3)]$$

However, by assumption A4 and Cumulant Property 4, $$\text{Cum}[n_r(t) n_r^*(t-\tau_1) n_r^*(t-\tau_2) n_c(t-\tau_3)] = 0 \quad (1.1)$$

and thus (95) reduces to $$[C_x^{4''}(\tau_1, \tau_2, \tau_3)]_{rc} = \text{Cum}\left[\sum_{j=1}^{M} v_{rj} r_j(t) \sum_{k=1}^{M} v_{rk}^* r_k^*(t-\tau_1)\right. \quad (114)$$

$$\left.\sum_{l=1}^{M} v_{rl}^* r_l^*(t-\tau_2) \cdot \sum_{m=1}^{M} v_{cm} r_m(t-\tau_3)\right].$$

Then, by the statistical independence of the source signals of assumption A1 and repeatedly applying Cumulant Property 3, equation (114) reduces to $$[C_x^{4''}(\tau_1, \tau_2, \tau_3)]_{rc} = \sum_{j=1}^{M} \text{Cum}[v_{rj} r_j(t) v_{rj}^* r_j^*(t-\tau_1) \quad (115)$$

$$v_{rj}^* r_j(t-\tau_2) v_{cj} r_j(t-\tau_3)^*].$$

Using Cumulant Property 1, the complex weights may then be pulled out in front of the cumulant operator in equation (115) to give $$[C_x^{4''}(\tau_1, \tau_2, \tau_3)]_{rc} = \sum_{j=1}^{M} v_{rj} v_{rj}^* v_{rj}^* v_{cj} \text{Cum}[r_j(t) r_j^*(t-\tau_1) \quad (116)$$

$$r_j^*(t-\tau_2) r_j(t-\tau_3)].$$

However, $v_{rj} v_{rj}^* = \alpha_{rj}^2$ and equation (116) reduces $$[C_x^{4''}(\tau_1, \tau_2, \tau_3)]_{rc} = \sum_{j=1}^{M} \alpha_{rj}^2 v_{rj}^* v_{cj} \text{Cum}[r_j(t) r_j^*(t-\tau_1) \quad (117)$$

$$r_j^*(t-\tau_2) r_j(t-\tau_3)].$$

From (117) it can be seen that spatial fourth-order cumulant matrix 3 in general can not be factored into Hermitian form, as was the case for spatial fourth-order cumulant matrix 1 and the spatial covariance matrix. However, if the "modified" steering vector elements are again defined as $$\tilde{v}_{rj} = \alpha_{rj}^2 v_{rj} \quad (118)$$

it can be factored in to bilinear form.

$$C_x^{4''}(\tau_1, \tau_2, \tau_3) = \tilde{V}^* C_r^4(\tau_1, \tau_2, \tau_3) V^T \quad (119)$$

where the element in the $r^{th}$ row and $c^{th}$ column of the N×M "modified" mixing matrix $\tilde{V}$ is $$[\tilde{V}]_{rc} = \tilde{v}_{rc}. \quad (1.2)$$

Expanding equation (119), it is found that spatial fourth-order cumulant matrix 3 can be written as a sum of the outer products of the conjugate of the "modified" steering vector, $\tilde{v}_j$, and steering vector scaled by the individual source signal's fourth-order cumulant.

$$C_x^{4''}(\tau_1, \tau_2, \tau_3) = \sum_{j=1}^{M} c_{r_j}^{4}(\tau_1, \tau_2, \tau_3) \tilde{v}_j^* v_j^T \quad (120)$$

As before, it is yet to be proven if the mixing matrix V having full column rank is sufficient to guarantee that the "modified" mixing matrix $\tilde{V}$ will have full column rank. However, it shall be assumed that the Hadamard product preserves the rank of the mixing matrix and therefore that the mixing matrix having full column rank is sufficient to guarantee that the "modified" mixing matrix has full column rank.

If the "modified" mixing matrix has full column rank, by inspection of equation (120) it is clear that spatial fourth-order cumulant matrix 3 lies in the signal subspace spanned by the set of conjugated "modified" steering vectors. Again, like spatial fourth-order cumulant matrix 2, spatial fourth-order cumulant matrix 3 has no noise subspace. Note that in N. Yuen and B. Friedlander, "Asymptotic Performance Analysis of ESPRIT, Higher-order ESPRIT, and Virtual ESPRIT Algorithms," *IEEE Trans. Signal Processing*, Vol. 44, No. 10, October 1996, pp. 2537–2550, as in H. H. Chiang and C. L. Nikias, "The ESPRIT Algorithm with Higher-Order Statistics," *Proc. Workshop on Higher-Order Spectral Analysis*, Vail, Colo., June 1989, pp. 163–168 and C. L. Nikias and A. P. Petropulu, *Higher-Order Spectra Analysis: A Non-Linear Signal Processing Framework*. (PTR Prentice-Hall, Upper Saddle River, N.J.: 1993), the elements/sensors are assumed to be omni-directional with unit gain so that $\alpha_{ij}^2 = 1$.

Spatial Fourth-Order Cumulant Matrix 3 Properties

As with spatial fourth-order cumulant matrix 2, if the "modified" mixing matrix $\tilde{V}$ has full column rank, spatial fourth-order cumulant matrix 3 will have many properties in common with spatial fourth-order cumulant matrix 1. Properties associated with the development of a matrix-pencil and the associated separation technique with the assumption that the "modified" mixing matrix has full column rank are derived below.

Property 1: Spatial fourth-order cumulant matrix 3 is in general non-Hermitian. It will be Hermitian if and only if $\tau_1 = \tau_3 = \tau$ and $\tau_2 = 0$, i.e. $C_x^{4''}(\tau, 0, \tau)$ and the sensors all have the identical gain for a given signal.

Property 2: The trace of spatial fourth-order cumulant matrix 3 equals the sum of the signal fourth-order cumulants scaled by the sum of the sensor magnitudes to the fourth power.

$$tr(C_x^{4''}(\tau_1, \tau_2, \tau_3)) = \sum_{j=1}^{M} \sum_{i=1}^{N} \alpha_{ij}^2 c_{r_j}^{4}(\tau_1, \tau_2, \tau_3) \quad (121)$$

Property 3: The column space of spatial fourth-order cumulant matrix 3, denoted as $$C(C_x^{4''}(\tau_1, \tau_2, \tau_3)),$$

is spanned by the set of conjugated "modified" steering vectors.

$$sp(C(C_x^{4''}(\tau_1, \tau_2, \tau_3))) = \{\tilde{v}_1^*, \tilde{v}_2^*, \ldots, \tilde{v}_M^*\} \quad (122)$$

Further, if the "modified" mixing matrix has full column rank, then the set of conjugated "modified" steering vectors are linearly independent and they form a basis for the column space of spatial fourth-order cumulant matrix 3.

Property 4: The rank of spatial fourth-order cumulant matrix 3 equals the rank of the mixing matrix, if V and $\tilde{V}$ have full column rank. That is $$\rho(C_x^{4''}(\tau_1, \tau_2, \tau_3)) = \rho(V) \quad (123)$$

if $\rho(V) = \rho(\tilde{V}) = M$, where $\rho(\ )$ denotes rank.

Property 5: The "right" nullspace of spatial fourth-order cumulant matrix 3 and the conjugate of the "left" nullspace of the mixing matrix are equal if the mixing matrix and "modified" mixing matrix have full column rank.

$$N_r(C_x^{4'}(\tau_1, \tau_2, \tau_3)) = N_l^*(V) \quad (124)$$

The three definitions of the spatial fourth-order cumulant matrix presented all have the key attribute that they have no noise subspace. This feature allows us to avoid either having to use degrees of freedom in the array to estimate the noise subspace or having to make an assumption of temporal whiteness so the noise subspace will be gone at non-zero time lags. However, there are two main differences between definition 1 and definitions 2 and 3.

First, definitions 2 and 3 have a computational advantage over definition 1. This can be seen by comparing equation (76) with equations (93) and (111) where definitions 2 and 3 require $N^2$ cumulants to be estimated while definition 1 requires $N^3$ cumulants to be estimated. Second, while it remains to be rigorously proven that spatial fourth-order cumulant matrix 1 will have a rank equal to the number of signals if the mixing matrix has full column rank, it has not been proven that spatial fourth-order cumulant matrices 2 and 3 will have a rank equal to the number of signals if the mixing matrix has full column rank. This second difference arises from the fact that no proof that the Hadamard product preserves rank has been found. Therefore, it is assumed that for the special case of the "modified" mixing matrix it does and thus spatial fourth-order cumulant matrices 2 and 3 possess the derived set of properties needed to perform the blind source separation. However, if this assumption turns out not to be true, then unless the sensors in the array have identical manifolds, spatial fourth-order cumulant matrix 2 or 3 may not possess enough degrees of freedom to perform the separation.

When the sensors in the array all have identical manifolds, the magnitude of the sensors' response, $|v_{ij}| = \alpha_{ij}$, is a constant for each signal, that is $$|v_{ij}| = \alpha_{ij} = \alpha_j. \quad (125)$$

From equation (26)

$$\sum_{i=1}^{N} \alpha_{ij}^2 = 1 \quad (126)$$

which, when all the sensors have identical manifolds, says that (125) can be substituted in to equation (126) to get $$\sum_{i=1}^{N} a_j^2 = Na_j^2 = 1 \quad (127)$$

and thus $$a_j = \frac{1}{\sqrt{N}}. \quad (128)$$

Further, if the manifolds are identical then $$a_j = \frac{1}{\sqrt{N}} \quad (129)$$

for all j. Thus, for spatial fourth-order cumulant matrix 2 it was found that when the sensors have identical manifolds, substituting (129) in to equation (100) and factoring in to bilinear form leads to $$C_x^{4'}(\tau_1, \tau_2, \tau_3) = \frac{1}{N} V C_r^4(\tau_1, \tau_2, \tau_3) V^H \quad (130)$$

$$= \frac{1}{N} C_x^4(\tau_1, \tau_2, \tau_3)$$

and therefore spatial fourth-order cumulant matrix 2 and spatial fourth-order cumulant matrix 1 are equivalent within a real scale factor. Following the identical path for spatial fourth-order cumulant matrix 3, one can find that $$C_x^{4''}(\tau_1, \tau_2, \tau_3) = \frac{1}{N} V^* C_r^4(\tau_1, \tau_2, \tau_3) V^T \quad (131)$$

$$= \frac{1}{N} C_x^{4*}(\tau_1, \tau_2, \tau_3)$$

and therefore when the sensors have identical manifolds, spatial fourth-order cumulant matrix 3 is equivalent to the conjugate of spatial fourth-order cumulant matrix 1 within a real scale factor. Unfortunately, the assumption that all sensors have an identical spatial response is physically unrealizable and proves to be the undoing of the ESPRIT algorithm and its higher-order counterparts.

Finally, in N. Yuen and B. Friedlander, "Asymptotic Performance Analysis of ESPRIT, Higher-order ESPRIT, and Virtual ESPRIT Algorithms," *IEEE Trans. Signal Processing*, Vol. 44, No. 10, October 1996, pp. 2537–2550, it is claimed that the advantage of definition 3 over definition 2 is that when finite length data is used to estimate the spatial fourth-order cumulant matrix, spatial fourth-order cumulant matrix 3 will retain its Hermitian symmetry, subject to the conditions stated in property 1. This property is not known to be of value to the matrix-pencil approach presented in the subsequent chapters and thus has not been evaluated for its validity.

Provided below are a spatial fourth-order cumulant matrix pencil definition and associated properties. The indeterminacy of the standard eigen analysis of a spatial fourth-order cumulant matrix is described to motivate the use of a spatial fourth-order cumulant matrix-pencil by showing. The definition, properties, and spectral theory of matrix-pencils are presented including treatment of singular pencils and development of the novel concept of wide sense equivalence. The spatial fourth-order cumulant matrix-pencil is defined and its properties are derived for all three spatial fourth-order cumulant matrix definitions. Finally, it is shown that the spectral analysis of the spatial fourth-order cumulant matrix-pencil provides a set of generalized eigenvectors that can be used as a basis for blindly separating the individual source signals.

The formulation of a separation matrix to perform blind source includes finding a set of vectors that are each uniquely orthogonal to all steering vectors except one. The set of these vectors, possibly scaled by a normalization factor, form the columns of the separation matrix W that will diagonalize the mixing matrix V. The concept of blind source separation was previously described above, and the development of a technique to find a separation matrix using a spatial fourth-order cumulant matrix is provided below.

A spatial fourth-order cumulant matrix signal subspace based spectral estimation technique is sought to perform the blind separation. In the context of a matrix subspace, spectral estimation implies eigen analysis and as such the terms spectral and eigen will be used interchangeably. In mathematics, eigenvalues are also often referred to as proper values. See, for example, P. R. Halmos, *Finite-Dimensional Vector Spaces*. (Springer-Verlag, New York, N.Y.: 1987), which is hereby incorporated by reference in its entirety as if presented herein. Unfortunately, in general the standard spectral decomposition of the spatial fourth-order cumulant matrix will not directly provide a set of eigenvectors that will diagonalize the mixing matrix. A set of eigenvectors for the spatial fourth-order cumulant matrix does exist that will diagonalize the mixing matrix, however the entire signal subspace would have to be searched to find this unique set of eigenvectors. Thus, the standard eigen decomposition of the spatial fourth-order cumulant matrix possesses an indeterminacy that makes it undesirable. The indeterminacy of the standard eigen analysis is discussed in Section 5.2 in detail.

The indeterminacy of the standard eigen decomposition can be overcome by the use of the generalized eigen analysis of a spatial fourth-order cumulant matrix-pencil. Therefore, a spatial fourth cumulant matrix-pencil of two spatial fourth-order cumulant matrices is defined by using two different sets of time lags, (0, 0, 0) and ($\tau_1$, $\tau_2$, $\tau_3$).

Indeterminacy of the Standard Eigen Analysis: The formulation of a signal subspace based spectral estimation method to blindly separate the mixture of statistically independent source signals is begun by examining the indeterminacy that exists in trying to use the standard eigenvectors of spatial fourth-order cumulant matrix 1, $C_x^4(\tau_1, \tau_2, \tau_3)$, to perform the blind source separation. In general, the results presented for spatial fourth-order cumulant matrix 1 are directly applicable to spatial fourth-order cumulant matrices 2 and 3 and thus will be presented for spatial fourth-order cumulant matrix 1 only. However, any differences or exceptions that may exist for spatial fourth-order cumulant matrices 2 and 3 will be appropriately noted.

The standard eigenvalue problem for spatial fourth-order cumulant matrix 1 is defined as $$C_x^4(\tau_1, \tau_2, \tau_3)e = \lambda e. \quad (132)$$

A scalar λ is said to be an eigenvalue of spatial fourth-order cumulant matrix 1 if the equality in equation (132) holds a non-null eigenvector e, an associated eigenvector. Rewriting equation (132), it is found that an eigenvector of spatial fourth-order cumulant matrix 1 lies in the "right" null space of a matrix-pencil. That is $$(C_x^4(\tau_1, \tau_2, \tau_3) - \lambda I_N)e = 0 \quad (133)$$

therefore $$e \in N_r(C_x^4(\tau_1, \tau_2, \tau_3) - \lambda I_N). \quad (134)$$

The matrix-pencil $$\{C_x^4(\tau_1, \tau_2, \tau_3), I\} = C_x^4(\tau_1, \tau_2, \tau_3) - \lambda I_N \quad (135)$$

is non-singular with rank N even though $C_x^4(\tau_1, \tau_2, \tau_3)$ has rank M when $\lambda$ is not an eigenvalue. Thus, the eigenvalue $\lambda$ will reduce the rank of the matrix-pencil $\{C_x^4(\tau_1, \tau_2, \tau_3), I_N\}$ by a value $\eta^{geom}$, which is referred to as the "geometric multiplicity" of the eigenvalue $\lambda$ and is given by $$\eta^{geom} = N - \rho(C_x^4(\tau_1, \tau_2, \tau_3) - \lambda I_N). \quad (136)$$

Since $\lambda$ is an eigenvalue if and only if the rank of the matrix-pencil is reduced, the eigenvalues can be found by searching for roots of the characteristic equation. That is, the values that cause the determinant of the matrix-pencil to be zero, $$\det(C_x^4(\tau_1, \tau_2, \tau_3) - \lambda I_N) = 0 \quad (137)$$

are eigenvalues.

The determinant in equation (137) is defined as the sum of products $$\det(C_x^4(\tau_1, \tau_2, \tau_3) - \lambda I_N) = \sum_l (-1)^{\phi_l(c_1, c_2, \ldots, c_N)} \quad (138)$$

$$([C_x^4(\tau_1, \tau_2, \tau_3)]_{1c_1} - \delta_{1c_1}\lambda) \ldots$$

$$([C_x^4(\tau_1, \tau_2, \tau_3)]_{Nc_N} - \delta_{Nc_N}\lambda)$$

where the set $\{c_1, c_2, \ldots, c_N\}$ is the $l^{th}$ permutation of the first N positive integers, with the summation occurring over all L=N! such permutations, and the scalar $\delta_{rc}$ represents the element in the $r^{th}$ row and $c^{th}$ column of the identity matrix $I_N$. The exponent in (138) is a scalar defined as a function of the set $\{c_1, c_2, \ldots, c_N\}$ by $$\phi_l(c_1, c_2, \ldots, c_N) \equiv \sum_{n=1}^{N-1} \xi_n \quad (139)$$

where $\xi_n$ is the number of integers in the sequence $c_{n+1}, \ldots, c_N$ that are less than $c_n$. Substituting equation (84) in to (138)

$$\det(C_x^4(\tau_1, \tau_2, \tau_3) - \lambda I_N) = \sum_l (-1)^{\phi_l(c_1, c_2, \ldots, c_N)} \quad (140)$$

$$\left(\sum_{j=1}^M v_{1j} v_{c_1 j}^* c_{r_j}^4(\tau_1, \tau_2, \tau_3) - \delta_{1c_1}\lambda\right) \ldots$$

$$\left(\sum_{j=1}^M v_{Nj} v_{c_N j}^* c_{r_j}^4(\tau_1, \tau_2, \tau_3) - \delta_{Nc_N}\lambda\right)$$

it becomes clear that each non-zero value of $\lambda$ that will cause the determinant in (140) to be equal to zero will be a linear combination of the individual source signal fourth-order cumulants. Therefore, since each eigenvalue is a linear combination of the source signals fourth-order cumulants it is reasonable to expect that the eigenvectors will be linear combinations of the associated steering vectors. This in fact can be shown to be true. Substituting equation (87) for the spatial fourth-order cumulant matrix, equation (132) becomes $$\sum_{j=1}^M c_{r_j}^4(\tau_1, \tau_2, \tau_3) v_j v_j^H e = \lambda e. \quad (141)$$

The vector inner product $v_j^H e$ will equal a scalar that is defined here as $$\epsilon_j = v_j^H e \quad (142)$$

then equation (141) becomes $$e = \sum_{j=1}^M \frac{\epsilon_j}{\lambda} c_{r_j}^4(\tau_1, \tau_2, \tau_3) v_j. \quad (143)$$

Alternatively, it can be show that each eigenvalue is a linear combination of the source signal fourth-order cumulants by pre-multiplying (141) by the Hermitian transpose of the eigenvector and dividing by the inner product, $e^H e$, since there is only one eigenvalue such that the equality in equation (141) for a particular eigenvector (See, for example, D. A. Harville, *Matrix Algebra from a Statistician's Perspective.* (Springer-Verlag, New York, N.Y.: 1999), which is hereby incorporated by reference in its entirety as if presented herein), each eigenvalue can therefore be expressed as $$\lambda = \sum_{j=1}^M c_{r_j}^4(\tau_1, \tau_2, \tau_3) \frac{e^H v_j v_j^H e}{e^H e}, \quad (144)$$

which is clearly a linear combination of the individual source signals' fourth-order cumulants.

If it is assumed that the mixing matrix V has full column rank, spatial fourth-order cumulant matrix 1 will have rank M by property 4. Therefore, there will be M non-zero eigenvalues whose sum will equal the trace of the spatial fourth-order cumulant matrix. That is, employing property 2 of spatial fourth-order cumulant matrix 1

$$\sum_{k=1}^M \lambda_k = \text{tr}[C_x^4(\tau_1, \tau_2, \tau_3)] = \sum_{j=1}^M c_{r_j}^4(\tau_1, \tau_2, \tau_3). \quad (145)$$

Substituting (144) into equation (145) results in $$\sum_{j=1}^M c_{r_j}^4(\tau_1, \tau_2, \tau_3) \sum_{k=1}^M \frac{e_k^H v_j v_j^H e_k}{e_k^H e_k} = \sum_{j=1}^M c_{r_j}^4(\tau_1, \tau_2, \tau_3). \quad (146)$$

Clearly, there exists an indeterminacy in the standard eigen analysis of spatial fourth-order cumulant matrix 1. The same indeterminacy exists for definitions two and three and arises from the fact that in general, the identity matrix is not "similar" to spatial fourth-order cumulant matrix 1. Therefore, a new matrix must be found, which for now can be referred to as the new B matrix, that is "similar" to the spatial fourth-order cumulant matrix to replace the identity matrix in the matrix-pencil and thus move to a generalized eigen analysis of spatial fourth-order cumulant matrix 1 with respect to this new B matrix. Here "similar" means that the B matrix can be factored into a bilinear form, as was done for spatial fourth-order cumulant matrix 1, with the mixing matrix, and the modified mixing matrix for definitions 2 and 3, being two of the three factors and some diagonal matrix being the third. That is $$B = VDV^H \quad (147)$$

where D is a diagonal matrix.

Definition, Properties, and Spectral Theory of Matrix-Pencils

A matrix-pencil is a special case of what is known in mathematics as a polynomial operator pencil. Polynomial operator pencils and their associated spectral problems arise naturally in many diverse areas such as differential equations, boundary value problems, control theory, harmonic systems analysis, wave propagation, elasticity theory, circuit simulation and modeling, and hydromechanics. See, for example, A. S. Markus, *Introduction to the Spectral Theory of Polynomial Operator Pencils, Translation of Mathematical Monographs, Vol. 71*. (American Mathematical Society, Providence, R.I.: 1988), which is hereby incorporated by reference in its entirety as if presented herein. In general, an $n^{th}$ order polynomial operator pencil takes the form $$A(\lambda) = A_0 + \lambda A_1 + \ldots + \lambda^n A_n \quad (148)$$

where $\lambda$ is a spectral parameter and the $A_i$'s are linear operators acting in a Hilbert space. A matrix-pencil, $P(\lambda)$, is a first-order polynomial operator pencil that has the form $$P(\lambda) = A - \lambda B. \quad (149)$$

In general, matrix-pencils are classified as being either regular or singular. See, for example, A. S. Markus, *Introduction to the Spectral Theory of Polynomial Operator Pencils, Translation of Mathematical Monographs, Vol. 71*. (American Mathematical Society, Providence, R.I.: 1988), Z. Bai, J. Demmel, J. Dongarra, A. Ruhe, and H. van der Vorst, *Templates for the Solution of Algebraic Eigenvalue Problems: A Practical Guide*. (SIAM, Philadelphia, Pa.: 2000), K. Kanatani, *Statistical Optimization for Geometric Computation: Theory and Practice*. (Elsevier Science B. V., Amsterdam, The Netherlands: 1996), G. H. Golub and C. F. Van Loan, *Matrix Computations*. (The Johns Hopkins University Press, Baltimore, Md.: 1996), F. R. Gantmacher, *The Theory of Matrices, Volume I*. (AMS Chelsea Publishing, Providence, R.I., 1977), and F. R. Gantmacher, *The Theory of Matrices, Volume II*. (AMS Chelsea Publishing, Providence, R.I., 1989), each of which is hereby incorporated by reference in its entirety as if presented herein. If the two matrices, A, B, are square and the determinant of the matrix-pencil is not identically zero for all values of $\lambda$, that is $$\det(P(\lambda)) = \det(A - \lambda B) \neq 0 \ \forall \lambda \quad (150)$$

then the pencil is regular otherwise it is singular. Regular pencils have well defined eigenvalues which change continuously as functions of matrices A and B. Singular pencils, on the other hand, have eigenvalues that are discontinuous functions of A and B. Both types of pencils arise in practice and, are applicable to the BSS technique in accordance with the present invention. Note that the standard eigen problem is a regular matrix-pencil with $B = I_N$.

Properties and Spectral Theory of Regular Matrix-Pencils

Regular pencils can be further classified as being Hermitian or non-Hermitian. Non-Hermitian matrix-pencils and their associated generalized non-Hermitian eigen problems arise when either A or B is non-Hermitian or B is not positive definite. Due to property 1 of the spatial fourth-order cumulant matrix, the spatial fourth-order cumulant matrix-pencil will in general be non-Hermitian. This will be shown to hold for all three definitions. Therefore, the focus will be on non-Hermitian regular pencils only and hence forth when the term regular pencil is used a non-Hermitian pencil is implied. Please see, for example, Z. Bai, J. Demmel, J. Dongarra, A. Ruhe, and H. van der Vorst, *Templates for the Solution of Algebraic Eigenvalue Problems: A Practical Guide*. (SIAM, Philadelphia, Pa.: 2000), K. Kanatani, *Statistical Optimization for Geometric Computation: Theory and Practice*. (Elsevier Science B. V., Amsterdam, The Netherlands: 1996), G. H. Golub, and C. F. Van Loan, *Matrix Computations*. (The Johns Hopkins University Press, Baltimore, Md.: 1996), and F. R. Gantmacher, *The Theory of Matrices, Volume I*. (AMS Chelsea Publishing, Providence, R.I. 1977), each of which is hereby incorporated by reference in its entirety as if presented herein, for discussions on Hermitian pencils.

The characteristic polynomial of a regular N by N matrix-pencil, $$p(\lambda) \equiv \det(P(\lambda)) = \det(A - \lambda B) \quad (151)$$

is by definition not identically zero for all values of $\lambda$. The degree of $p(\lambda)$ is at most N. This means that there are N eigenvalues, which may be finite or infinite, with the roots of $p(\lambda) = 0$ being the finite eigenvalues of the matrix-pencil. The set of eigenvalues of the matrix-pencil, $P(\lambda)$, are more commonly known as the "generalized" eigenvalues of the matrix A with respect to the matrix B and are defined by $$\lambda(A, B) = \{z \in C : \det(A - zB) = 0\} \quad (152)$$

The eigenvalues of a regular pencil are continuous functions of A and B thus small changes in A and B cause small changes in the eigenvalues. If the degree of the characteristic polynomial is less than N, then the pencil is said to have N−M infinite eigenvalues, where M is the degree of the characteristic polynomial $p(\lambda)$. The set of all eigenvalues, $\lambda(A, B)$, of a matrix-pencil is referred to as its spectra. See for example, and F. R. Gantmacher, *The Theory of Matrices, Volume II*. (AMS Chelsea Publishing, Providence, R.I., 1989), which is hereby incorporated by reference in its entirety as if presented herein, and A. S. Markus, *Introduction to the Spectral Theory of Polynomial Operator Pencils, Translation of Mathematical Monographs, Vol. 71*. (American Mathematical Society, Providence, R.I.: 1988), Z. Bai, J. Demmel, J. Dongarra, A. Ruhe, and H. van der Vorst, *Templates for the Solution of Algebraic Eigenvalue Problems: A Practical Guide*. (SIAM, Philadelphia, Pa.: 2000), K. Kanatani, *Statistical Optimization for Geometric Computation: Theory and Practice*. (Elsevier Science B. V., Amsterdam, The Netherlands: 1996), G. H. Golub and C. F. Van Loan, *Matrix Computations*. (The Johns Hopkins University Press, Baltimore, Md.: 1996), and F. R. Gantmacher, *The Theory of Matrices, Volume I*. (AMS Chelsea Publishing, Providence, R.I., 1977)[45–50]. Note that as with the standard eigenvalues, an eigenvalue reduces the rank of the pencil by a value $\eta^{geom}$, which is referred to as the "geometric multiplicity" of the eigenvalue $\lambda$.

For each finite eigenvalue, any non-zero vector lying in the right null space of the matrix pencil evaluated at the eigenvalue is defined as a "right" eigenvector for that eigenvalue.

$$e \in N_r(A - \lambda B) \quad (153)$$

That is, for $\lambda \in \lambda(A, B)$, any vector e that satisfies $$(A - \lambda B)e = 0, \ e \neq 0 \quad (154)$$

is an eigenvector corresponding to that eigenvalue. As with the eigenvalues of a matrix-pencil, the eigenvectors are often referred to as "generalized" eigenvectors. For an infinite eigenvalue, any non-zero vector lying in the right null space of the matrix B is an eigenvector. That is any non-zero vector that satisfies $$Be=0 \qquad (155)$$

corresponds to an eigenvalue $\lambda=\infty$. An N by N regular matrix-pencil may not have N linearly independent eigenvectors. However, at least one independent eigenvector will exist for each distinct eigenvalue. As with standard eigenvectors, the set of generalized eigenvalues $\lambda(A, B)$ is unique while the set of eigenvectors is not.

Each regular matrix-pencil has two associated subspaces, denoted X and Y, that have the same dimension and satisfy $$Ax \in Y, Bx \in Y \; \forall x \in X. \qquad (156)$$

These subspaces are called right and left deflating subspaces, respectively. Further, $$\text{span}_{x \in X}\{Ax, Bx\}=Y \qquad (157)$$

and therefore $$AX+BX=Y. \qquad (158)$$

Deflating subspaces are important in the development of techniques for solving regular generalized eigen problems (See, for example, P. Van Dooren, "Reducing Subspaces: Definitions, Properties, and Algorithms," *Matrix Pencils*, Proc. Pite Havsbad, Lecture Notes in Mathematics 973, Springer-Verlag, New York, N.Y., 1982, pp. 58–73, which is hereby incorporated by reference in its entirety as if presented herein)[51], such as the QZ algorithm, which is currently considered the most powerful technique for solving dense non-Hermitian regular generalized eigen problems.

Finally, let X and Y be non-singular matrices where $$\hat{A}=Y^H AX \; \hat{B}=Y^H BX. \qquad (159)$$

Then the matrix-pencil $$\hat{P}(\lambda)=\hat{A}-\lambda\hat{B} \qquad (160)$$

is "equivalent" to the matrix-pencil $P(\lambda)$ and X and Y are referred to as "equivalence transformations". The matrix-pencil $\hat{P}(\lambda)$ has the same eigenvalues as $P(\lambda)$ and its right eigenvectors, denoted $\hat{e}$, are related to the right eigenvectors of the pencil $P(\lambda)$ by the transformation $$\hat{e}=X^{-1}e. \qquad (161)$$

Properties and Spectral Theory of Singular Matrix-Pencils

Matrix-pencils are singular if either they are rectangular or they are square and $$\det(P(\lambda))=\det(A-\lambda B)=0 \; \forall \lambda \qquad (162)$$

holds. For a square pencil to be singular, both matrices A and B must be singular and have a common nullspace. That is $$\det(A)=\det(B)=0$$

$$N_r(A)=N_r(B) \qquad (163)$$

are necessary and sufficient conditions for the pencil $P(\lambda)$ to be singular. Both cases arise in practice and are significantly more difficult than regular pencils to handle. Since by definition the spatial fourth-order cumulant matrix is square, only square singular pencils are considered.

The characteristic polynomial of a singular N by N matrix-pencil is equal to zero for all functions of $\lambda$. Therefore, the eigenvalues of a singular pencil are discontinuous functions of the matrices A and B and care must be taken in defining the eigenvalues of singular pencils. Obviously, the eigenvalues can no longer be found by finding the roots of the characteristic polynomial. Instead, the concept of reducing subspaces is used to define the eigenvalues and eigenvectors of a singular pencil.

A pair of right and left reducing subspaces of the pencil $P(\lambda)$, denoted X and Y respectively, satisfy $$Ax \in Y, Bx \in Y \; \forall x \in X \qquad (164)$$

and $$\text{span}_{x \in X}\{Ax, Bx\}=Y. \qquad (165)$$

where the dimension of the right reducing subspace, X, is greater than the dimension of the left reducing subspace Y by the dimension of the right null space of the pencil over the field of all rational functions of $\lambda$. That is $$\dim(X)=\dim(Y)+\dim(N_r(A-\lambda B)). \qquad (166)$$

The reducing subspaces play a role similar to that of deflating subspaces for regular pencils. The rank of a matrix-pencil is in general a constant M for most values of $\lambda$.

$$\rho(P(\lambda))=M \qquad (167)$$

However, for a certain set of values the rank of the pencil is "reduced", thus motivating the concept of a reducing subspace. The set of values, denoted $\lambda(A, B)$, that contain the values of $\lambda$ that cause the rank of the singular pencil to "reduce" are the eigenvalues or spectra of the singular pencil.

$$\lambda(A, B)=\{z \in C: \rho(A-zB)<M\} \qquad (168)$$

The amount the rank of the pencil is reduced is the geometric multiplicity, $\eta^{geom}$, of the particular eigenvalue.

$$\eta^{geom}=M-\rho(P(\lambda)), \lambda \in \lambda(A, B) \qquad (169)$$

Note that the eigenvalues of a singular matrix-pencil can be finite, infinite, or indeterminate.

For each finite eigenvalue, any non-zero vector lying in the right null space of the matrix pencil evaluated at the eigenvalue is defined as a "right" eigenvector corresponding to that eigenvalue.

$$e \in N_r(A-\lambda B) \qquad (170)$$

That is, for $\lambda \in \lambda(A, B)$, any vector e that satisfies $$(A-\lambda B)e=0, e \neq 0 \qquad (171)$$

is an eigenvector corresponding to that eigenvalue. For an indeterminate eigenvalue, any non-zero vector lying in the right null space of the matrix B, and thus in the right null space of matrix A, is an eigenvector corresponding to an indeterminate eigenvalue. Put in other words, any non-zero vector lying in the right nullspace of A (or B) is an eigenvector corresponding to an indefinite eigenvalue. Rewriting equation (171) and solving for $\lambda$ results in $$\lambda = \frac{e^H A e}{e^H B e}. \tag{172}$$

Clearly, if e lies in the common right null space of A and B, $\lambda$=0/0 and thus the eigenvalue is indeterminate.

As with regular pencils, the concept of "strict" equivalence is now defined. Let X and Y be non-singular matrices that do not depend on $\lambda$ where $$\hat{A}=Y^H AX \quad \hat{B}=Y^H BX. \tag{173}$$

Then the matrix-pencil $$\hat{P}(\lambda)=\hat{A}-\lambda\hat{B} \tag{174}$$

is "strictly equivalent" to the matrix-pencil $P(\lambda)$ and X and Y are referred to as "strict equivalence transformations". The matrix-pencil $\hat{P}(\lambda)$ has the same eigenvalues as $P(\lambda)$. Also, the right and left reducing of the matrix-pencil $\hat{P}(\lambda)$, $\hat{X}$ and $\hat{Y}$, are related to the right and left reducing subspaces of the pencil $P(\lambda)$ by $$\hat{X}=X^{-1}X \quad \hat{Y}=Y^H Y. \tag{175}$$

The consequence of the effect of the equivalence transformation on the reducing subspaces is that the right eigenvectors of $\hat{P}(\lambda)$, denoted $\hat{e}$, are related to the right eigenvectors of the pencil $P(\lambda)$ by the transformation $$\hat{e}=X^{-1}e. \tag{176}$$

Wide Sense Equivalence of Matrix-Pencils

The term "strict" equivalence was emphasized previously herein to distinguish it from what is defined here as "wide sense" equivalence. Given the M by N full row rank matrices X and Y that are independent of $\lambda$, where $$\hat{A}=Y^H AX \quad \hat{B}=Y^H BX \tag{177}$$

then the N by N singular pencil $\hat{P}(\lambda)$ is said to be wide sense equivalent to the M by M non-singular pencil $P(\lambda)$ where $$\hat{P}(\lambda)=\hat{A}-\lambda\hat{B}. \tag{178}$$

Note that having rectangular X or Y is a sufficient condition to guarantee that $\hat{P}(\lambda)$ is singular.

It will now be determined if the wide sense equivalence transformations preserve the spectra of $P(\lambda)$ and if the eigenvectors of $\hat{P}(\lambda)$ are related to the eigenvectors of the non-singular pencil $P(\lambda)$ by some equivalence transformation. To show this is true, let $\hat{\lambda}\in\hat{\lambda}(\hat{A}, \hat{B})$, $\hat{\lambda}(\hat{A}, \hat{B})\subset\hat{\lambda}(\hat{A}, \hat{B})$ and $\hat{e}$ be a finite or infinite generalized eigenvalue and associated eigenvector of the singular pencil $\hat{P}(\lambda)$. Since the M by N matrix X has full row rank it has a "right" inverse. That is a N by M matrix $X^{-1r}$ exists such that $$XX^{-1r}=I_M. \tag{179}$$

Also, since the matrix Y has full row rank, $Y^H$ has full column rank and therefore $Y^H$ has a "left" inverse. That is a M by N matrix $(Y^H)^{-1l}$ exists such that $$(Y^H)^{-1l}Y^H=I_M. \tag{180}$$

Clearly $$(Y^H)^{-1l}\hat{P}(\lambda)X^{-1r}=(Y^H)^{-1l}Y^H(A-\lambda B)XX^{-1r}=P(\lambda). \tag{181}$$

The generalized eigenvalue problem is formulated as $$\hat{A}\hat{e}=\hat{\lambda}\hat{B}\hat{e}. \tag{182}$$

Define the N by 1 vector y as $$y=[(Y^H)^{-1l}]^H e \tag{183}$$

where e is an eigenvector of the matrix-pencil $P(\lambda)$. The products $y^H\hat{A}\hat{e}$ and $y^H\hat{B}\hat{e}$ are scalars, therefore $$\hat{\lambda}=\frac{y^H\hat{A}\hat{e}}{y^H\hat{B}\hat{e}}. \tag{184}$$

Similarly, an eigenvalue of the non-singular pencil $P(\lambda)$ is $$\lambda=\frac{e^H A e}{e^H B e}. \tag{185}$$

Substituting (177) in to equation (184) results in $$\hat{\lambda}=\frac{y^H(Y^H AX)\hat{e}}{y^H(Y^H BX)\hat{e}}. \tag{186}$$

Then, using equation (183), (186) becomes $$\hat{\lambda}=\frac{e^H(Y^H)^{-1l}(Y^H AX)\hat{e}}{e^H(Y^H)^{-1l}(Y^H BX)\hat{e}}=\frac{e^H AX\hat{e}}{e^H BX\hat{e}}. \tag{187}$$

Clearly every finite or infinite $\hat{\lambda}\in\lambda(\hat{A},\hat{B})$ is an eigenvalue of the pencil $P(\lambda)$ with a corresponding eigenvector $$\hat{e}=X^{-1r}e. \tag{188}$$

It can therefore be concluded that the set of finite and infinite eigenvalues of $\hat{P}(\lambda)$, $\hat{\lambda}(\hat{A}, \hat{B})$ is equal to the set of eigenvalues of the non-singular pencil. That is $$\hat{\lambda}(\hat{A}, \hat{B})=\lambda(A, B) \tag{189}$$

and that the eigenvector $\hat{e}$ of $\hat{P}(\lambda)$ is related to the eigenvector of $P(\lambda)$ by the equivalence transformation $$\hat{e}=X^{-1r}e. \tag{190}$$

The Spatial Fourth-Order Cumulant Matrix-Pencil: Definition and Properties

The spatial fourth-order cumulant matrix-pencil is defined on a pair on a pair of two spatial fourth-order cumulant matrices at delay lags (0, 0, 0) and $(\tau_1, \tau_2, \tau_3)$, as $$P_x(\lambda, \bar{\tau})=C_x^4(0, 0, 0)-\lambda C_x^4(\tau_1, \tau_2, \tau_3) \tag{191}$$

where the set of non-zero delay lags is denoted in vector form as $\bar{\tau}=[\tau_1, \tau_2, \tau_3]$. As with the spatial fourth-order cumulant matrix, there are in three definitions for the spatial fourth-order cumulant matrix-pencil; each corresponding to the definition used for the pair spatial fourth-order cumulant matrices. Spatial fourth-order cumulant matrix-pencil 1 uses a pair of spatial fourth-order cumulant matrices 1 and is given in equation (191) above. Spatial fourth-order cumulant matrix-pencil 2 is defined on a pair of spatial fourth-order cumulant matrices using definition 2 as $$P_x'(\lambda, \bar{\tau})=C_x^{4'}(0, 0, 0)-\lambda C_x^{4'}(\tau_1, \tau_2, \tau_3) \tag{192}$$

Finally, spatial fourth-order cumulant matrix-pencil 3 is defined on a pair of spatial fourth-order cumulant matrices using definition 3 as $$P_x''(\lambda, \bar{\tau})=C_x^{4''}(0, 0, 0)-\lambda C_x^{4''}(\tau_1, \tau_2, \tau_3) \tag{193}$$

Since it was shown in Chapter 4 that all three definitions have similar matrix properties if the Hadamard product preserves rank, the properties for spatial fourth-order cumulant matrix-pencil 1 are derived and any differences for spatial fourth-order cumulant matrix-pencils 2 and 3 noted.

Spatial Fourth-Order Cumulant Matrix-Pencil Property 1

Spatial fourth-order cumulant matrix-pencil 1 can be factored into Hermitian form as $$P_x(\lambda, \bar{\tau}) = V P_r(\lambda, \bar{\tau}) V^H \qquad (194)$$

where V is the mixing matrix and $P_r(\lambda, \bar{\tau})$ is an M by M matrix-pencil on a pair of diagonal signal cumulant matrices.

$$P_r(\lambda, \bar{\tau}) \equiv C_r^4(0, 0, 0) - \lambda C_r^4(\tau_1, \tau_2, \tau_3). \qquad (195)$$

Spatial fourth-order cumulant matrix-pencils 2 and 3 can be factored in to the bilinear form $$P_x'(\lambda, \bar{\tau}) = \tilde{V} P_r(\lambda, \bar{\tau}) V^H \qquad (196)$$

and $$P_x''(\lambda, \bar{\tau}) = \tilde{V}^* P_r(\lambda, \bar{\tau}) V^T \qquad (197)$$

respectively.

Spatial Fourth-Order Cumulant Matrix-Pencil Property 2

The rank of spatial fourth-order cumulant matrix-pencil 1 equals the number of signals, M, for "most" values of $\lambda$ if V has full column rank. That is, for $\lambda \notin \lambda(C_r^4(0, 0, 0), C_r^4(\tau_1, \tau_2, \tau_3))$ and $\rho(V) = M$, $$\rho(P_x(\lambda, \bar{\tau})) = M. \qquad (198)$$

Spatial fourth-order cumulant matrix-pencils 2 and 3 possess the same property if the Hadamard product (196) preserves rank.

Spatial Fourth-Order Cumulant Matrix-Pencil Property 3

The spatial fourth-order cumulant matrix-pencil is in general non-Hermitian. It is a regular pencil if M=N and V has full column rank, otherwise, when M<N or if V does not have full column rank it is a singular pencil. Spatial fourth-order cumulant matrix-pencils 2 and 3 additionally require that the Hadamard product given in (4.65) preserve the rank of V for the pencil to be regular.

Spatial Fourth-Order Cumulant Matrix-Pencil Property 4

The spatial fourth-order cumulant matrix-pencil, $P_x(\lambda, \bar{\tau})$, is strictly equivalent to the regular pencil $P_r(\lambda, \bar{\tau})$ if $P_x(\lambda, \bar{\tau})$ is a regular pencil. Otherwise, the spatial fourth-order cumulant matrix-pencil, $P_x(\lambda, \bar{\tau})$, is wide sense equivalent to the regular pencil $P_r(\lambda, \bar{\tau})$ if the mixing matrix has full column rank. Spatial fourth-order cumulant matrix-pencils $P_x'(\lambda, \bar{\tau})$ and $P_x''(\lambda, \bar{\tau})$ additionally require that the Hadamard product given in equation (4.65) preserve rank.

Spectral Analysis of the Spatial Fourth-Order Cumulant Matrix-Pencil

The spectral theory of the spatial fourth-order cumulant matrix-pencil is explored in two manners. First exploiting the equivalence, strict or wide sense, it will be show that the finite spectra of the pencil $P_x(\lambda, \bar{\tau})$ has a one-to-one mapping to set of signal fourth-order cumulants and thus each generalized eigenvalue can be associated with a source and its associated eigenvector with the signal's steering vector. The same relation is then shown by using the outer product expansion of the eigenvalue problem and the linear independence of the steering vectors. In both cases V is assumed to have full column rank and it is the finite generalized eigenvalues and their associated eigenvectors that are the focus since it is only the signal subspace that is of interest. As before, spectral theory for spatial fourth-order cumulant matrix-pencil 1 will be presented and any differences that may arise for spatial fourth-order cumulant matrix-pencils 2 and 3 will be noted.

From property 4 of the spatial fourth-order cumulant matrix-pencil, $P_x(\lambda, \bar{\tau})$ is equivalent, in a strict or wide sense, to the M by M regular pencil $P_r(\lambda, \bar{\tau})$. By the definition of equivalence, the set of finite and infinite spectra eigenvalues of $P_x(\lambda, \bar{\tau})$, $\hat{\lambda}(C_x^4(0, 0, 0), C_x^4(\tau_1, \tau_2, \tau_3))$, is equal to the spectra of the pencil $P_r(\lambda, \bar{\tau})$, $\lambda(C_r^4(0, 0, 0), C_r^4(\tau_1, \tau_2, \tau_3))$.

$$\hat{\lambda}(C_x^4(0, 0, 0), C_x^4(\tau_1, \tau_2, \tau_3)) = \lambda(C_r^4(0, 0, 0), C_r^4(\tau_1, \tau_2, \tau_3)) \qquad (199)$$

Clearly if $P_x(\lambda, \bar{\tau})$ is regular then $$\hat{\lambda}(C_x^4(0, 0, 0), C_x^4(\tau_1, \tau_2, \tau_3)) = \lambda(C_x^4(0, 0, 0), C_x^4(\tau_1, \tau_2, \tau_3)). \qquad (200)$$

Since the pencil $P_r(\lambda, \bar{\tau})$ is regular, its spectra can be determined by finding the roots of its determinate set equal to zero. Since $P_r(\lambda, \bar{\tau})$ is diagonal by definition, the determinate will be the product of its diagonal components, i.e.

$$\det(P_r(\lambda, \vec{\tau})) = \prod_{j=1}^{M} \left( c_{r_j}^4(0, 0, 0) - \lambda c_{r_j}^4(\tau_1, \tau_2, \tau_3) \right) \qquad (201)$$

By inspection of (201), the spectra of $P_r(\lambda, \bar{\tau})$ is the set $$\lambda(C_r^4(0, 0, 0), C_r^4(\tau_1, \tau_2, \tau_3)) = \qquad (202)$$

$$\left\{ z \in C : z = \frac{c_{r_j}^4(0, 0, 0)}{c_{r_j}^4(\tau_1, \tau_2, \tau_3)}, j \in \{1, \ldots, M\} \right\}.$$

By Assumption A2 the signal cumulants are strictly non-zero and as such the spectra will contain M finite, non-zero eigenvalues, counting multiplicities, each corresponding to the ratio of a particular signal's cumulants at a zero and non-zero set of lags. Since the eigenvalues maybe complex, there is no fixed way to order them. For convenience, however, they will be ordered by their association with the $j^{th}$ signal as $\lambda_j$, i.e.

$$\lambda_j = \frac{c_{r_j}^4(0, 0, 0)}{c_{r_j}^4(\tau_1, \tau_2, \tau_3)} \qquad (203)$$

Of the M eigenvalues, there may only be K distinct values they assume, denoted as $\mu_k$, with each value having a multiplicity of $\eta_k$. Therefore, the eigenvalues can be grouped into K sets, denoted $\lambda_k(C_r^4(0, 0, 0), C_r^4(\tau_1, \tau_2, \tau_3))$, that contain the eigenvalues equal to $\mu_k$.

$$\lambda_k(C_r^4(0, 0, 0), C_r^4(\tau_1, \tau_2, \tau_3)) \underset{=}{\Delta} \{\lambda_j \in C : \lambda_j = \mu_k\} \qquad (204)$$

Note that for a diagonal regular pencil, $\eta_k^{geom} = \eta_k^{alg} = \eta_k$. Clearly, $$\lambda(C_r^4(0, 0, 0), C_r^4(\tau_1, \tau_2, \tau_3)) = \lambda_1(C_r^4(0, 0, 0), C_r^4(\tau_1, \tau_2, \tau_3)) \cup \ldots \cup \lambda_K(C_r^4(0, 0, 0), C_r^4(\tau_1, \tau_2, \tau_3)) \qquad (205)$$

For each $\mu_k$ there are $\eta_k$ signals with the identical ratio of their cumulant at zero lags to their cumulant at non-zero lags. This ratio is the inverse of what will be defined in the subsequent chapter as the normalized fourth-order auto-cumulant.

A "right" eigenvector corresponding to a particular eigenvalue for a regular pencil will be a non-zero vector that lies in the right null space of the pencil evaluated at the eigenvalue.

$$P_r(\lambda=\lambda_j, \vec{\tau})e_j=0 \qquad (206)$$

The eigenvector $e_j$ is a M by 1 vector with $M-\eta_k$ zeros in the positions with indices corresponding to the columns of the diagonal pencil containing non-zero elements when evaluated at $\lambda=\lambda_j=\mu_k$, a distinct eigenvalue. This is now illustrated with an example.

For example, the M by M diagonal pencil, M>3, has the form $$P_r(\lambda, \vec{\tau}) = \begin{bmatrix} c_{r_1}^4(0,0,0)-\lambda c_{r_1}^4(\tau_1,\tau_2,\tau_3) & 0 & \cdots & \cdots & 0 \\ 0 & \ddots & & & \vdots \\ \vdots & & c_{r_j}^4(0,0,0)-\lambda c_{r_j}^4(\tau_1,\tau_2,\tau_3) & & \vdots \\ \vdots & & & \ddots & 0 \\ 0 & \cdots & \cdots & 0 & c_{r_M}^4(0,0,0)-\lambda c_{r_M}^4(\tau_1,\tau_2,\tau_3) \end{bmatrix}$$

If $\dfrac{c_{r_1}^4(0,0,0)}{c_{r_1}^4(\tau_1,\tau_2,\tau_3)} = \dfrac{c_{r_3}^4(0,0,0)}{c_{r_3}^4(\tau_1,\tau_2,\tau_3)}$ then $\lambda_1 = \dfrac{c_{r_1}^4(0,0,0)}{c_{r_1}^4(\tau_1,\tau_2,\tau_3)} = \dfrac{c_{r_3}^4(0,0,0)}{c_{r_3}^4(\tau_1,\tau_2,\tau_3)} = \lambda_3 = \mu_1$ and the distinct eigenvalue $\mu_1$ has a multiplicity of two. The eigenvectors corresponding to the eigenvalues $\lambda_1$ and $\lambda_3$ have the form $$e_j=[e_{1j}\ 0\ e_{3j}\ 0\ \ldots\ 0]^T j\in\{1,3\}$$

where $e_{1j}$ and $e_{3j}$ are arbitrary scalars, both not equal to zero. Clearly the eigenvectors are not unique, however the locations of the non-zero elements are and the eigenvectors are uniquely associated with the signals.

A set of M eigenvectors is required. However, when there are only K distinct eigenvalues, care must be taken in selecting the eigenvectors corresponding to a repeated proper value so that subsequent separation stages may be used to separate the signals associated with a repeated eigenvalue. The constraints for finding eigenvectors corresponding to repeated eigenvalues will be discussed in the following chapter.

Consider now the spatial fourth-order cumulant matrix-pencil, $P_x(\lambda, \vec{\tau})$. If the mixing matrix V is assumed to have full column rank, then by spatial fourth-order cumulant matrix-pencil property 4, $P_x(\lambda, \vec{\tau})$ is equivalent, either strictly or in a wide sense, to the pencil $P_r(\lambda, \vec{\tau})$. Thus, the pencil $P_x(\lambda, \vec{\tau})$ has the same finite and infinite eigenvalues as $P_r(\lambda,\vec{\tau})$ and the eigenvectors of $P_x(\lambda,\vec{\tau})$, designated $\hat{e}_j$, corresponding to the finite eigenvalues are related to the eigenvectors of $P_r(\lambda,\vec{\tau})$ by $$\hat{e}_j=(V^H)^{-1r}e_j. \qquad (207)$$

Since the rows of $V^H$ are the conjugated signal steering vectors by definition, for $$V^H(V^H)^{-1r}=I_M \qquad (208)$$

the columns of $(V^H)^{-1r}$ must be orthogonal to all steering vectors except the one in the row with the index corresponding to its own column index. Therefore, the columns of $(V_H)^{-1r}$ are uniquely associated with a signal's steering vector. Thus it can be seen that $$\hat{e}_j^H V = \{V^H \hat{e}_j\}^H = \{V^H(V^H)^{-1r}e_j\}^H = e_j^H. \qquad (209)$$

Thus the eigenvectors, $\hat{e}_j$, can be used to blindly separate the signals. As mentioned earlier, the selection of the eigenvectors corresponding to a repeated eigenvalue must be done with care. Clearly the output of $\hat{e}_j^H V$ will be a linear combination of the rows of the mixing matrix and thus will result in a vector who is linear combination of the rows of the steering vectors of the signals associated with the eigenvector, that is the rows of V corresponding to the non-zero elements of $e_j$. For spatial fourth-order cumulant matrix-pencils 2 and 3, if the Hadamard product preserves the rank of V, then a similar result is found by exploiting a corresponding equivalence transformation between the "left" eigenvectors of the pencils $P_r(\lambda, \vec{\tau})$ and $P_x(\lambda, \vec{\tau})$. Note that similar results will be achieved with the left eigenvectors, i.e. those 1 by N vectors, $\hat{d}_j$, that lie in the left null space of the pencil evaluated at the eigenvalue.

The preceding spectral analysis of the spatial fourth-order cumulant matrix-pencil can be performed in an alternative way by expanding the pencil into a sum of outer products and exploiting the linear independence of the steering vectors. The generalized (right) eigenvalue problem for the matrix-pencil $P_x(\lambda, \vec{\tau})$ is defined as $$C_x^4(0,0,0)\hat{e}_k=\mu_k C_x^4(\tau_1,\tau_2,\tau_3)\hat{e}_k. \qquad (210)$$

Substituting equation (87) for the spatial fourth-order cumulant matrix in (210) and rearranging terms results in $$\sum_{j=1}^{M} v_j[c_{r_j}^4(0,0,0)-\mu_k c_{r_j}^4(\tau_1,\tau_2,\tau_3)]v_j^H \hat{e}_k = 0. \qquad (211)$$

If the mixing matrix is assumed to have full column rank its columns are linearly independent and thus $$[c_{r_j}^4(0,0,0)-\mu_k c_{r_j}^4(\tau_1,\tau_2,\tau_3)]v_j^H\hat{e}_k=0 \qquad (212)$$

for all j for the equality in equation 211 to hold. This leads to the $$\mu_k = \frac{c_{r_j}^4(0, 0, 0)}{c_{r_j}^4(\tau_1, \tau_2, \tau_3)} \quad (213)$$

for any j when $v_j^H \hat{e}_k \neq 0$. Since by property 5 $V^H$ and $C_x^4(\tau_1, \tau_2, \tau_3)$ have a common right null space, any eigenvector that lies in the right null space of $V^H$ has a corresponding indeterminate eigenvalue, since $\hat{e}_k$ can only lie in the null space of $V^H$ if the pencil is singular. Therefore, as with the equivalence approach presented previously, the eigenvalues and their associated eigenvectors are uniquely associated with the source signals with the ratio $$\frac{c_{r_j}^4(0, 0, 0)}{c_{r_j}^4(\tau_1, \tau_2, \tau_3)} \quad (214)$$

acting as a discriminant. Similar results hold for spatial fourth-order cumulant matrix-pencils two and three if the modified mixing matrix $\hat{V}$ has full column rank.

A blind source separation technique in accordance with the present invention is described utilizing all three spatial fourth-order cumulant matrix definitions and the conditions of identifiability are discussed. A normalization method is also developed to allow the separation algorithm to maximize the separation power efficiency (SPE). The concept of a normalized fourth-order auto-cumulant is presented and a method of selecting eigenvectors for repeated eigenvalues to facilitate cascaded processing is developed.

FIG. 5 is a functional block diagram of a blind source technique and processor in accordance with an embodiment of the present invention. Blindly separating M statistically independent source signals under the narrowband assumption requires finding a N by M separation matrix W that will diagonalize the mixing matrix V. That is, from equation (39), a separation matrix is sought such that $$W^H V = \begin{bmatrix} \rho_1 & 0 & \cdots & 0 \\ 0 & \rho_2 & \ddots & \vdots \\ \vdots & \ddots & \ddots & 0 \\ 0 & \cdots & 0 & \rho_M \end{bmatrix}. \quad (215)$$

Calculating this separation matrix is one function of the blind source separation technique.

It was previously explained that the generalized eigenvectors of the spatial fourth-order cumulant matrix-pencil would separate signals based on the ratio of their cumulants at two different sets of time lags. These results are exploited in the formalization of a technique to calculate a separation. This technique will theoretically minimize the residual interference-to-signal ratio (ISR) and, with the proper normalization, to maximize the separation power efficiency (SPE).

As also previously described, a factor in finding the eigenvectors of the spatial fourth-order cumulant matrix-pencil is what was referred to as the normalized fourth-order auto-cumulant. This arises from the finite eigenvalues of the spatial fourth-order cumulant matrix-pencil equaling the inverses of the individual source signals normalized fourth-order auto-cumulants; the aforementioned ratio of cumulants at two different sets of time lags with the set of time lags in the numerator cumulant equal to zero. Specifically, since it was shown that if a signal has a unique normalized fourth-order auto-cumulant, the associated eigenvector is orthogonal to all of the other signals' steering vectors, the normalized fourth-order auto-cumulant can be thought of as acting as a signal discriminator function. In this chapter the normalized fourth-order auto-cumulant will be defined and some comments on its use as a discriminator function will be made.

When multiple signals have the same normalized fourth-order auto-cumulant at the set of delay lags used, repeated eigenvalues occur. In order to facilitate repeating the separation technique at a new set of time lags where ideally the signals will no longer have equal normalized fourth-order auto-cumulants, care must be taken in selecting the eigenvectors of a repeated eigenvalue in order to guarantee the resultant steering vectors remain linearly independent. Criteria are presented below for selecting eigenvectors associated with a repeated eigenvalue. It will be shown that the resultant set of new steering vectors remains linearly independent.

One measure of performance used in assessing the blind source separation algorithm is separation power efficiency (SPE). To achieve an SPE of 1, the inner product of the separation vector and the associated steering vector must have a magnitude of 1. To achieve this, the eigenvector, which forms the basis of the separation vector, must be normalized since, although it is co-linear with the steering vector, it does not necessarily have the correct magnitude to guarantee that an SPE of 1 can be achieved. Therefore, a normalization algorithm is developed to guarantee that the SPE is maximized. Since there are three definitions for the spatial fourth-order cumulant matrix, different normalization techniques will be required for each.

Conditions of identifiability are presented below that will allow an instantaneous linear mixture of signals to be separated. These include the linear independence of the steering vectors, the statistical independence and non-Gaussian nature of the source signals, and existence of a set of time lags where every signal has a distinct normalized fourth-order auto-cumulant, just to name a few.

Finally, the spatial fourth-order cumulant matrix-pencil based algorithm is presented step by step in a flow diagram. Each step is discussed and critical issues, if any, are presented. Difference that may exist in using the different spatial fourth-order cumulant matrix definitions in the algorithm will be highlighted.

Normalized Fourth-Order Auto-Cumulant as a Signal Discriminator

It was previously shown that the generalized eigenvalues of the spatial fourth-order cumulant matrix-pencil are $$\lambda_j = \frac{c_{r_j}^4(0, 0, 0)}{c_{r_j}^4(\tau_1, \tau_2, \tau_3)}, \quad j \in 1, 2, \ldots, M. \quad (216)$$

For separation to occur, a distinct eigenvalue, $\lambda_j$, is required for each signal. Therefore, $\lambda_j$ acts as a "signal discriminant". To investigate this discriminant and its properties, the normalized fourth-order auto-cumulant of the $j^{th}$ signal is defined as $$\bar{c}_{r_j}^4(\tau_1, \tau_2, \tau_3) \equiv \frac{c_{r_j}^4(\tau_1, \tau_2, \tau_3)}{c_{r_j}^4(0, 0, 0)}. \quad (217)$$

Clearly the generalized eigenvalue associated with the signal is the inverse of its normalized fourth-order auto-cumulant.

$$\lambda_j = \frac{1}{\bar{c}^4_{r_j}(\tau_1, \tau_2, \tau_3)} \qquad (218)$$

By assumption A1, the signal $r_j(t)$ is a stationary, non-Gaussian random process. Further, by assumption A2, the signal is assumed to have a zero mean with power $P_j$, and a non-zero fourth-order moment. These assumptions ensure the signals fourth-order cumulant exists and is non-zero. A necessary extension to these assumptions is that the set of time lags, $(\tau_1, \tau_2, \tau_3)$ is chosen so that the fourth-order auto-cumulant also exists and is non-zero. Thus it may be assumed that the normalized fourth-order auto-cumulant exists and is finite.

Since the signal is assumed to be a stationary random process, its moments are dependent only on the time differences or lags $(\tau_1, \tau_2, \tau_3)$. Therefore, the normalized fourth-order cumulant is a three dimensional function. Thus, for separating signals there are three independent variables to work with to ensure the signals have unique normalized fourth-order auto-cumulants as compared to a second-order technique that has only one independent variable. This is yet another distinct advantage of the fourth-order cumulant approach over the second-order spatial correlation based approach.

The normalized fourth-order auto-cumulant will, in general, be complex valued. Although the signal's cumulant at the set of time lags (0, 0, 0) will have a real value, the cumulant at time lags $(\tau_1, \tau_2, \tau_3)$ will be complex valued. Thus, the normalized fourth-order auto-cumulant will contain phase information that is a function of $(\tau_1, \tau_2, \tau_3)$. Source signal emitter attributes such as phase noise, carrier frequency, transmit filter response, amplifier response, transmitter clock jitter, propagation channel transfer function, etc., will contribute to the source signal's normalized fourth-order auto-cumulant. From the definition of received source signal, $$r_j(t) = \sqrt{P_j} m_j(t) \qquad (219)$$

it is clear, employing cumulant property 1, that the normalized fourth-order auto-cumulant is not a function of the signal's power.

$$\begin{aligned}\bar{c}^4_{r_j}(\tau_1, \tau_2, \tau_3) &= \frac{c^4_{r_j}(\tau_1, \tau_2, \tau_3)}{c^4_{r_j}(0, 0, 0)} \qquad (220)\\ &= \frac{Cum[r_j(t)r_j^*(t-\tau_1)r_j(t-\tau_2)r_j^*(t-\tau_3)]}{Cum[r_j(t)r_j^*(t)r_j(t)r_j^*(t)]}\\ &= \frac{P_j^2 Cum[m_j(t)m_j^*(t-\tau_1)m_j(t-\tau_2)m_j^*(t-\tau_3)]}{P_j^2 Cum[m_j(t)m_j^*(t)m_j(t)m_j^*(t)]}\\ &= \frac{Cum[m_j(t)m_j^*(t-\tau_1)m_j(t-\tau_2)m_j^*(t-\tau_3)]}{Cum[m_j(t)m_j^*(t)m_j(t)m_j^*(t)]}\end{aligned}$$

Thus the signals are discriminated by having an underlying waveform that has a unique normalized fourth-order auto-cumulant, not by having different signal powers.

As stated above, the unit power modulated signal from the $j^{th}$ emitter is affected by transmitter unique properties. Since in practice two transmitters hardly ever produce identical signals, a source signal will most likely have a unique fourth-order auto-cumulant function and therefore have a unique normalized fourth-order auto-cumulant function. Therefore, it is expected that a set of time lags will exist where a group of signals will have unique normalized fourth-order auto-cumulants and can therefore be separated.

Selecting Eigenvectors for Repeated Eigenvalues

When multiple signals' normalized fourth-order auto-cumulant functions happen to have the same value at the set of time lags chosen, the problem of repeated eigenvalues arises. In this situation care must be taken in selecting the associated eigenvectors to ensure that the set of separation vectors formed from these eigenvectors will transform the mixing matrix into a new reduced dimension mixing matrix with full column rank. This guarantees that the separation algorithm can be repeated to separate the signals associated with the repeated eigenvalue that are mixed by this new reduced dimension mixing matrix.

Figure 6:
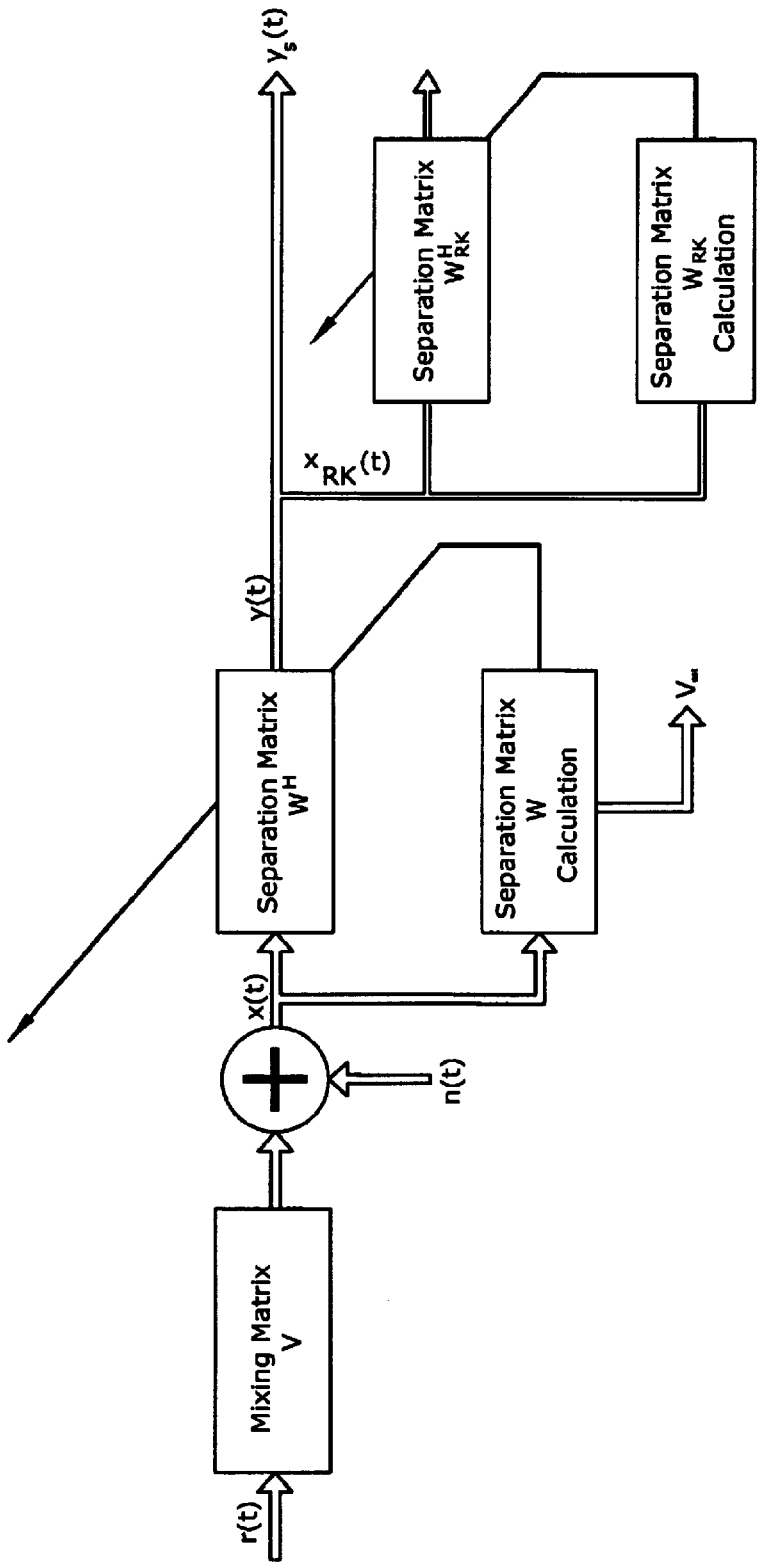
FIG. 6 is an illustration depicting repeating the separation process for a single repeated eigenvalue.

FIG. 6 depicts repeating the separation algorithm for a single repeated eigenvalue. In FIG. 6, the M by 1 vector output of the first separation stage, y(t), is partitioned into two vectors, one with the $M-\eta_K$ elements of y(t) that correspond to unique eigenvalues, denoted as $y_S(t)$, and the other, denoted $x_{RK}(t)$, with the $\eta_K$ elements of y(t) that correspond to the repeated eigenvalue, $\mu_K$, which has multiplicity $\eta_K$. As in the first separation stage, a new $\eta_K$ by $\eta_K$ separation $W_{RK}$ is sought that will separate the signals associated with the repeated eigenvalue. The new separation matrix is found by repeating the spatial fourth-order matrix-pencil algorithm at a different set of time lags. However, to use the algorithm a second time, the conditions for identifiability discussed in a following section must hold. One of these is that the mixing matrix has full column rank and therefore the new reduced dimension, $\eta_K$ by $\eta_K$ mixing matrix $V_{RK}$ must have full column rank. Each repeated eigenvalue would have a similar new mixing matrix and would have the separation algorithm repeated.

The requirements for selecting the eigenvectors associated with a repeated eigenvalue so as to guarantee the new mixing matrix, $V_{Rk}$, will have full column rank are derived below. The set of integers that represent the signals associated with a particular eigenvalue is defined as $$g_k = \{j \in \{1, 2, \ldots, M\}: \lambda_j = \mu_k\}. \qquad (221)$$

Recalling that the eigenvalue $\lambda_j$ is equal to the inverse of the $j^{th}$ signals normalized auto-cumulant.

$$\lambda_j = \frac{c_{r_j}(0, 0, 0)}{c_{r_j}(\tau_1, \tau_2, \tau_3)} \qquad (222)$$

Since there are M signals there will be M eigenvalues, including repetitions, of which only K are distinct. The distinct eigenvalues are denoted as $\mu_k$, k ∈ 1,2, ..., K. The scaled or normalized M associated N by 1 eigenvectors are the columns of the separation matrix W.

$$w_j = \gamma_j \hat{e}_j \qquad (223)$$

From equation (215) it can be seen that if the separation matrix separates all the signals, the resultant matrix product $W^H V$ is diagonal. This occurs only if there are M distinct eigenvalues. As previously described, for a repeated eigenvalue, the eigenvectors separated the signals associated with a particular eigenvalue from those not associated with it; however, the resultant scalar was a linear combination of the associated signals. Therefore, the matrix product $W^H V$ will have $\eta_k$ rows, indexed by the set $g_k$, each with $\eta_k$ non-zero elements in the columns indexed by the set $g_k$ for k=1,2, ..., K. This holds for the M distinct eigenvalues case as well in which case K=M and $\eta_k = 1$, $\forall k$, k=j, and each $g_k$ has only one element in it, k=j, and thus $W^H V$ is diagonal.

The new mixing matrix $V_{Rk}$ consists of the $\eta_k$ columns of $W^H V$ indexed by the set $g_k$ with the rows indexed by the integers not in the set $g_k$ removed, i.e. the rows with all zeros. Thus $V_{Rk}$ is a $\eta_k$ by $\eta_k$ matrix that linearly mixes the $\eta_k$ signals associated with the repeated eigenvalue to form the $\eta_k$ elements of the vector $x_{Rk}(t)$. Since $V_{Rk}$ is to the second stage separation process as V is to the initial separation process, it must have the same properties as V, primarily it must have full column rank.

$$\rho(V_{Rk}) = \eta_k \quad (224)$$

The condition for selecting $w_j$, $j \in g_k$ that ensures $V_{Rk}$ has full column rank must now be determined.

Since $w_j$ is a scaled version of the eigenvector $\hat{e}_j$, a constraint on $w_j$ is in fact a constraint on the selection of $\hat{e}_j$. It will now be shown that requiring the eigenvectors $\hat{e}_j$, for $j \in g_k$ to be linearly independent is sufficient to guarantee that $V_{Rk}$ will have full column rank if V has full column rank.

Separation Vector Formation: Normalizing the Eigenvectors

Although the eigenvectors are orthogonal to all signals except those with normalized auto-cumulants equal to the associated eigenvalue, the inner product $$\hat{e}_j^H v_j = \epsilon_j \quad (225)$$

does not guarantee that the maximum SPE of 1 will be achieved. Therefore, the separation vectors are formed by scaling each eigenvector with a real normalization factor $\gamma_j$ that guarantees a maximum SPE of 1.

$$w_j = \gamma_j \hat{e}_j \quad (226)$$

For repeated eigenvalues, the normalization factor will have a different effect and there is no clear advantage to normalizing the eigenvectors associated with repeated eigenvalues in the first separation stage. Further study of the effect of repeating the separation algorithm on the achievable SPE is needed.

From equation (39) it can be seen that the inner product $$w_j^H v_j = \rho_j \quad (227)$$

results in a "loss" term $\rho_j$ that in general is complex. From equation (63) it can be seen that the SPE is $$\xi_j = w_j^H v_j v_j^H w_j. \quad (228)$$

Inserting equation (227) in to (228) results in $$\xi_j = \rho_j \rho_j^* = |\rho_j|^2. \quad (229)$$

For the SPE to be 1 requires $$|\rho_j| = 1 \quad (230)$$

and thus a normalization factor $\gamma_j$ is needed such that $$|w_j^H v_j| = |\gamma_j \hat{e}_j^H v_j| = \gamma_j |\epsilon_j| = 1 \quad (231)$$

and therefore $$\gamma_j = \frac{1}{|\epsilon_j|}. \quad (232)$$

Calculation of this scale factor for the eigenvectors associated with unique eigenvalues is dependent on the particular spatial fourth-order cumulant matrix definition used since the available variables are different. For spatial fourth-order cumulant matrix 1 a normalization factor that will guarantee the SPE will achieve a maximum of 1 can be found and will be derived in the following sub-section. However, it will be shown for spatial fourth-order cumulant matrices 2 and 3 that the existence of the modified mixing matrix $\tilde{V}$ in their bilinear forms causes the set of equations available for solving for the normalization factor to be under specified and thus using definitions 2 and 3 cause a power loss preventing the separation from achieving an SPE of 1.

Normalization for Spatial Fourth-Order Cumulant Matrix 1

The only data available to work with in normalizing the eigenvectors are the spatial fourth-order cumulant matrices, the eigenvalues, and associated eigenvectors. From equation (225), $$\epsilon_j = \hat{e}_j^H v_j \quad (233)$$

and as previously described, it is known, assuming $\hat{e}_j$ is associated with a distinct eigenvalue, that $$V^H \hat{e}_j = [0 \ldots 0 \; \epsilon_j^* 0 \ldots 0]^T \quad (234)$$

with the non-zero element in the $j^{th}$ position. Therefore, since spatial fourth-order cumulant matrix 1 can be factored into Hermitian form as $$C_x^4(0,0,0) = V C_r^4(0,0,0) V^H \quad (235)$$

where $C_r^4(0, 0, 0)$ is an M by M diagonal matrix, the product $$\begin{aligned} C_x^4(0,0,0)\hat{e}_j &= V C_r^4(0,0,0) V^H \hat{e}_j \\ &= V C_r^4(0,0,0)\{[\,0\;\ldots\;0\;\;\epsilon_j^*\;\;0\;\ldots\;0\,]^T\} \\ &= V\{[\,0\;\ldots\;0\;\;\epsilon_j^* c_{r_j}^4(0,0,0)\;\;0\;\ldots\;0\,]^T\} \\ &= \epsilon_j^* c_{r_j}^4(0,0,0) v_j. \end{aligned} \quad (236)$$

The Euclidian or $l_2$ norm of (236) is then $$\begin{aligned} \|C_x^4(0,0,0)\hat{e}_j\|_2 &= \|\epsilon_j^* c_{r_j}^4(0,0,0) v_j\|_2 \\ &= |\epsilon_j| |c_{r_j}^4(0,0,0)| \|v_j\|_2. \end{aligned} \quad (237)$$

However, since $$\begin{aligned} \|v_j\|_2 &= \sqrt{v_j^H v_j} \\ &= \sqrt{1} \\ &= 1 \end{aligned} \quad (238)$$

then $$\|C_x^4(0,0,0)\hat{e}_j\|_2 = |\epsilon_j| |c_{r_j}^4(0,0,0)|. \quad (239)$$

Further, pre-multiplying the product in equation (236) by the Hermitian transpose of the $j^{th}$ eigenvector results in the scalar $$\begin{aligned} \hat{e}_j^H C_x^4(0,0,0)\hat{e}_j &= \epsilon_j^* c_{r_j}^4(0,0,0) \hat{e}_j^H v_j \\ &= \epsilon_j^* \epsilon_j c_{r_j}^4(0,0,0) \\ &= |\epsilon_j|^2 c_{r_j}^4(0,0,0). \end{aligned} \quad (240)$$

Taking the ratio of the absolute value of (240) to (239) produces the scalar $$\frac{|\hat{e}_j^H C_x^4(0,0,0)\hat{e}_j|}{\|C_x^4(0,0,0)\hat{e}_j\|_2} = \frac{|\varepsilon_j|^2 |c_{r_j}^4(0,0,0)|}{|\varepsilon_j||c_{r_j}^4(0,0,0)|} = |\varepsilon_j|. \quad (241)$$

Thus the unknown denominator in (232) has been solved for and therefore the normalization factor, when using spatial fourth-order cumulant matrix 1, is $$\gamma_j = \frac{1}{|\varepsilon_j|} = \frac{\|C_x^4(0,0,0)\hat{e}_j\|_2}{|\hat{e}_j^H C_x^4(0,0,0)\hat{e}_j|}. \quad (242)$$

Normalization for Spatial Fourth-Order Cumulant Matrices 2 and 3

Spatial fourth-order cumulant matrix 2 and 3 are not factorable into Hermitian form but instead factor into a bi-linear form as shown previously as $$C_x^{4\prime}(\tau_1,\tau_2,\tau_3) = \tilde{V} C_r^4(\tau_1,\tau_2,\tau_3) V^H \quad (243)$$

and $$C_x^{4\prime\prime}(\tau_1,\tau_2,\tau_3) = \tilde{V}^* C_r^4(\tau_1,\tau_2,\tau_3) V^T \quad (244)$$

respectively. From the results in chapter 5 it is clear that pencils formed using spatial fourth-order cumulant matrices 2 and 3 will have the same eigenvalues with the associated eigenvectors of spatial fourth-order cumulant matrix-pencil 3 equal to the conjugate of the eigenvectors of spatial fourth-order cumulant matrix-pencil 2. Thus, since the normalization factor is real, if it exists it would be the same for both definitions.

Since spatial fourth-order cumulant matrices 2 and 3 are not factorable into Hermitian form, the modified mixing matrix has to be dealt with in attempting to estimate the normalization factor given in equation (232). Unfortunately, in general $$\hat{e}_j^H \tilde{v}_j \neq \varepsilon_j. \quad (245)$$

Further, even for distinct eigenvalues, the eigenvector, specifically the right eigenvector $\hat{e}_j$, is in general no longer orthogonal to all modified steering vectors except $\tilde{v}_j$ and it is not guaranteed that the modified steering vectors have a Euclidian norm of 1, that is in general $$\tilde{v}_j^H \tilde{v}_j \neq 1. \quad (246)$$

Thus the properties that spatial fourth-order cumulant matrix 1 possessed that allowed for the estimation of $|\varepsilon_j|$ are not shared by spatial fourth-order cumulant matrices 2 and 3.

Solving for $|\varepsilon_j|$ given only spatial fourth-order cumulant matrix 2 or 3, the generalized eigenvalues of the associated pencil, and their associated left, $\hat{d}_j$, and right, $\hat{e}_j$, eigenvectors is under specified. Since spatial fourth-order cumulant matrix 1 can be factored into Hermitian form, the left and right eigenvectors of spatial fourth-order cumulant matrix-pencil 1 are related by a Hermitian transformation, that is if $\hat{e}_j$ is a right eigenvector of spatial fourth-order cumulant matrix-pencil 1 then $\hat{e}_j^H$ is a left eigenvector. Thus the product $\hat{e}_j^H C_x^4(0,0,0)\hat{e}_j$ has only two unknowns, one being $|\varepsilon_j|$. Similarly, $\|C_x^4(0,0,0)\hat{e}_j\|_2$ has the same two unknowns since $\|v_j\|_2=1$ and therefore $|\varepsilon_j|$ can be solved for. However, for spatial fourth-order cumulant matrix 2, and similarly for 3, $$\|C_x^{4\prime}(0,0,0)\hat{e}_j\|_2 = \|\varepsilon_j^* c_{r_j}^4(0,0,0)\tilde{v}_j\|_2 \quad (247)$$
$$= |\varepsilon_j||c_{r_j}^4(0,0,0)|\|\tilde{v}_j\|_2$$

and $$\hat{d}_j C_x^{4\prime}(0,0,0)\hat{e}_j = \varepsilon_j^* c_{r_j}^4(0,0,0)\hat{d}_j \tilde{v}_j \quad (248)$$
$$= \varepsilon_j^* \delta_j c_{r_j}^4(0,0,0)$$

where $\hat{d}_j$ is the 1 by N left eigenvector associated with the $j^{th}$ signal and $$\delta_j = \hat{d}_j \tilde{v}_j. \quad (249)$$

Thus there are two equations and four unknowns. Attempting to establish four equations by using the spatial fourth-order cumulant matrix 2 at delay lags ($\tau_1$, $\tau_2$, $\tau_3$) results in now having four equations and five unknowns. Thus, for spatial fourth-order cumulant matrix 2, and similarly for 3, solving for the normalization factor results in an under specified problem that cannot be solve. This is yet another advantage of definition 1, since a normalization factor that guarantees a maximum SPE of 1 can be solved for.

Conditions for Identifiability

Identifiability deals with the ability of the blind source separation algorithm to uniquely associate a separation vector with an arriving source signal and thus separate it out of the linear mixture by suppressing the other signals. In order for the proposed blind source separation algorithm to perform the separation certain conditions must be met. Some have already been presented as signal and noise assumptions and are restated here as conditions that are imposed for the spatial fourth-order cumulant matrix-pencil based blind source separation algorithm to achieve the separation of the source signals. The fewer conditions for identifiability required the more powerful the algorithm will be in the sense of handling a wider variety of source separation problems. Five conditions for identifiability, CI1 through CI5, are given below, CI1: The mixing matrix, V, has full column rank. This requires the number of sources be less than or equal to the number of sensors, i.e. $M \leq N$, and that the signal steering vectors be linearly independent.

CI2: The normalized fourth-order auto-cumulant, $\bar{c}_{r_j}^4(\tau_1, \tau_2, \tau_3)$ is different for each signal. The algorithm may be repeated at different sets of time lags ($\tau_1$, $\tau_2$, $\tau_3$) in a second separation stage operating only on the signals in the first stage that had identical normalized fourth-order auto-cumulants.

CI3: The M source signals illuminating the array are statistically independent non-Gaussian stationary random processes and are stationary to order four over the spatial fourth-order cumulant matrix estimation period.

CI4: The noise processes are stationary Gaussian random processes. They need not be spatially or temporally white. Stationarity is required only over the estimation period of the spatial fourth-order cumulant matrix.

CI5: For spatial fourth-order cumulant matrix definitions 2 and 3, the Hadamard product $$\tilde{V} = V \odot V \odot V \quad (250)$$

preserves the rank of the mixing matrix V, i.e. the modified mixing matrix has full column rank. This condition is not required when using spatial fourth-order cumulant matrix definition 1.

Separation Matrix Formation Algorithm

Figure 7:
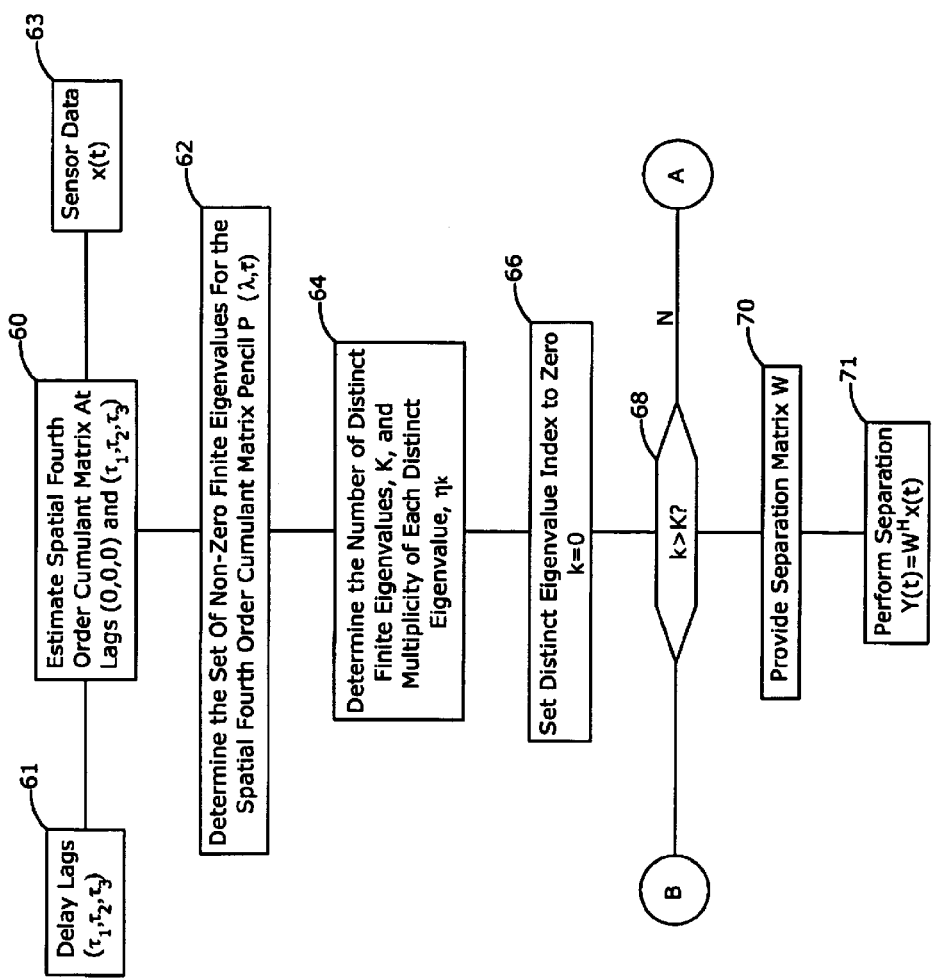
FIG. 7 is a flow diagram of a process for performing blind source separation using the spatial fourth-order cumulant matrix-pencil in accordance with an embodiment of the present invention.
Figure 8:
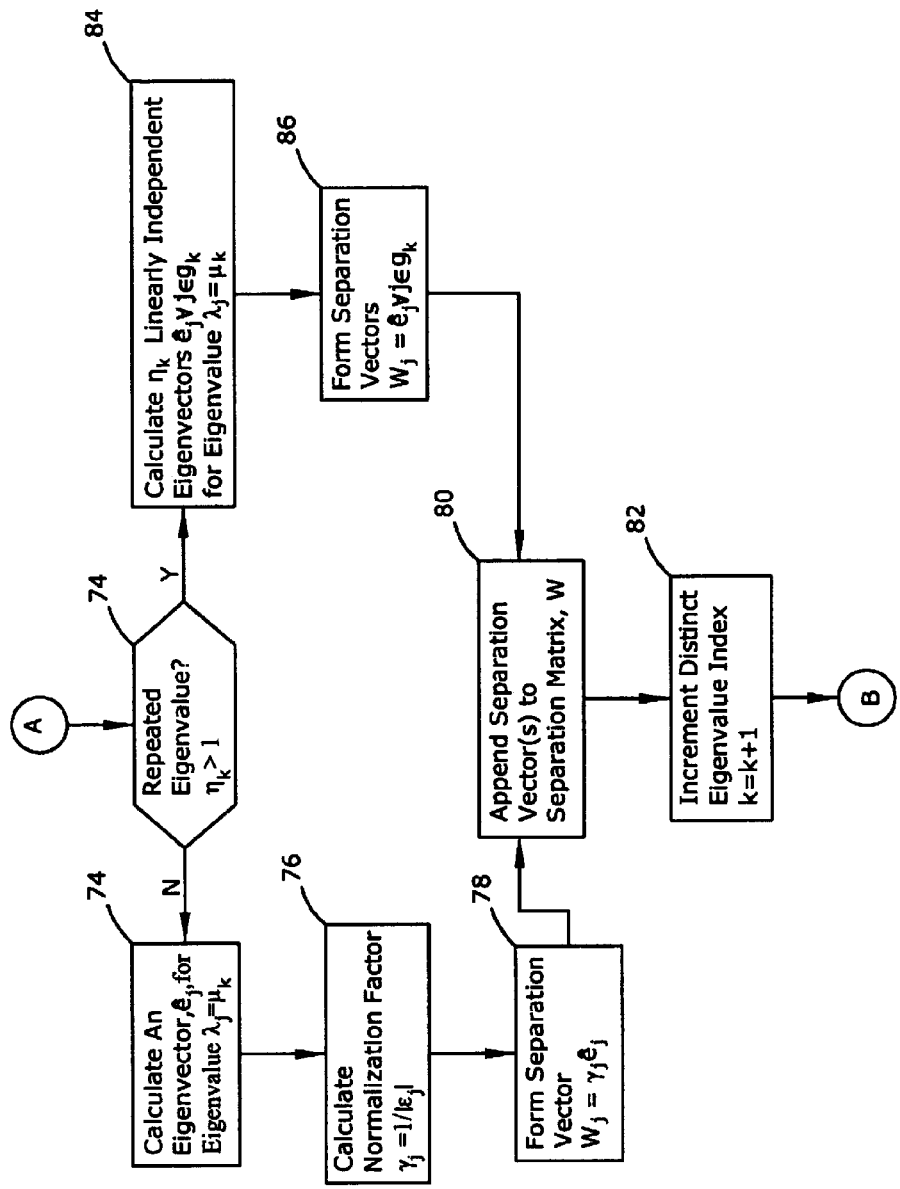
FIG. 8 is a continuation of the flow diagram of FIG. 7.

FIG. 7 and FIG. 8 are flow diagrams of a process for performing the blind source separation using the spatial fourth-order cumulant matrix-pencil in accordance with an embodiment of the present invention. The algorithm requires as inputs the set of time lags ($\tau_1$, $\tau_2$, $\tau_3$) where ($\tau_1$, $\tau_2$, $\tau_3$)≠(0, 0, 0). Delay lag values, $\tau_1$, $\tau_2$, $\tau_3$, are provided at step 61 and senor data values, x(t), are provided at step 63. It is recommended, that either $\tau_1 \neq \tau_2$ or $\tau_3 \neq 0$ in order to preserve phase information. This will reduce the occurrence of repeated eigenvalues and thus reduce the number of times the separation has to be repeated.

At step 60, the estimation of the spatial fourth-order cumulant matrix at lags (0, 0, 0) and ($\tau_1$, $\tau_2$, $\tau_3$) is performed matrix element by matrix element. Since a cumulant cannot be estimated directly from the data, all moments up to order four must be estimated. The estimation can be done either in a real time manner as the array samples the propagating wavefields and generates the sensor output data x(t) or after the entire data set required to estimate the cumulants has been captured.

After the spatial fourth-order cumulant matrices $C_x^4(0, 0, 0)$ and $C_x^4(\tau_1, \tau_2, \tau_3)$ have been estimated, the generalized eigen analysis of the matrix-pencil $P_x(\lambda, \bar{\tau})$ is performed at step 62 to determine its finite spectra, $\lambda(C_x^4(0, 0, 0), C_x^4(\tau_1, \tau_2, \tau_3))$. At step 64, the number, K, of distinct finite eigenvalues and multiplicity of each distinct eigenvalue are determined. The spectra will have M finite values, counting multiplicities, each corresponding to the normalized fourth-order auto-cumulant of a signal. Of the M eigenvalues there will be K distinct eigenvalues, $\mu_k$, k∈1,2, . . . , K, each with a multiplicity $\eta_k$. For each distinct eigenvalue $\eta_k$ linearly independent eigenvectors are calculated. An index, k, is set to zero at step 66. The index, k, is used to ensure that each distinct eigenvalue is addressed. At step 68, the distinct eigenvalue index, k, is compared to the number of distinct finite eigenvalues, K. Given that at least one distinct eigenvalue exists, K will not be equal to zero. Thus, on the first iteration, k will be less than K, and the process will proceed to step 72, as indicated by the circled letter "A" in FIG. 7 and FIG. 8. At step 72, it is determined if the multiplicity, $\eta_k$, is greater than 1. If the multiplicity, $\eta_k$, is not greater than 1, the process proceeds to step 74. At step 74, an eigenvector $\hat{e}_j$, is calculated for the eigenvalue for the k$^{th}$ distinct eigenvalue ($\lambda_j = \mu_k$). For each $\lambda_j = \mu_k$ with a multiplicity of one, a normalization factor $\gamma_j$ is calculated at step 76. The separation vector is formed as $w_j = \gamma_j \hat{e}_j$ at step 78. The separation vector, $W_j$, is utilized (appended) to form the separation Matrix, W, at step 80, wherein the separation vectors are (by definition) the columns of the separation matrix, W. After the separation vector, $W_j$, is appended to the separation matrix, W, the index, k, is incremented at step 82. The process then proceeds to step 68, as indicated by the circled letter "B" in FIG. 7 and FIG. 8. At step 68, k is compared with K. If k is greater than K, then the separation matrix W is provided and available for subsequent processing at step 70. If k is not greater than K (step 68) then the process proceeds to step 72, as indicated by the circled letter "A" in FIG. 7 and FIG. 8. At step 72, it is determined if the multiplicity, $\eta_k$, is greater than 1. If the multiplicity, $\eta_k$, is greater than 1, the process proceeds to step 84. At step 84, $\eta_k$ linearly independent eigenvectors eigenvector $\hat{e}_j$, are calculated for the distinct eigenvalues ($\lambda_j = \mu_k$). For each repeated eigenvalue the $\eta_k$ separation vectors are set equal to its associated eigenvectors as $w_j = \hat{e}_j$, at step 86. The separation matrix, W, is formed at step 80 by appending the separation vectors $W_j$. The index, k, is incremented again at step 82, and the process is repeated until all distinct eigenvalues are addressed (k is greater than K at step 68). At step 68, if k is greater than K, the separation matrix, W, is provided and available for subsequent processing at step 70. At step 71, the separation matrix, W, is multiplied by the input signal x(t) to perform the separation. More specifically, a matrix representation of the input signal x(t) is multiplied by the Hermitian transpose of the separation matrix, $W^H$, in accordance with the following equation.

$$y(t) = W^H x(t) \quad (251)$$

Hybrid Separation Matrix Weights

The BSS system described above uses adaptive separation weights (adaptive weights). The method and system for performing BSS can also be implemented with hybrid adaptive separation weights (hybrid weights) the minimize the mean-squared error (MSE) due to interference-plus-noise. The minimum MSE (MMSE) hybrid weights are computed from the zero-lag spatial correlation matrix and from the generalized eigenvectors of the SFOCMP. Each eigenvector is used to estimate a corresponding source steering vector and source power. The zero-lag spatial correlation matrix, source steering vector, and source power estimates are used to form the estimated MMSE weight vector based on the interference-plus-noise spatial correlation matrix.

Figure 9:
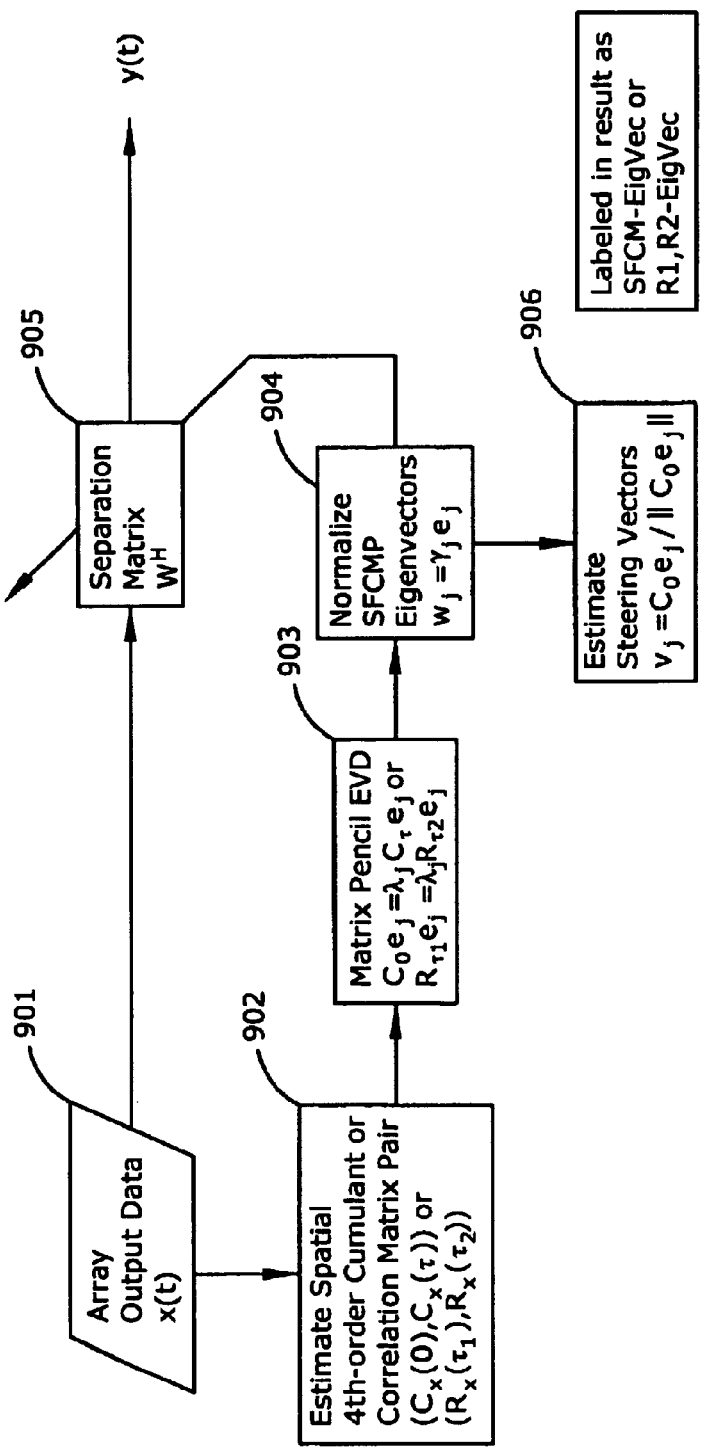
FIG. 9 is an embodiment of a Blind Source Separation system with normalized eigenvectors (adaptive weights).

FIG. 9 is a representative diagram of the BSS system described previously and is presented to illuminate the differences between adaptive weights and hybrid weights. In FIG. 9, each source separation vector (i.e. adapted weight vector) corresponds to a normalized eigenvector of either the spatial fourth order cumulant matrix-pencil, or spatial correlation matrix pencil. Since each eigenvector is orthogonal to all the other source steering vectors, these adaptive weights are designed to maximize the signal-to-interference ratio, or equivalently minimize the interference-to-signal ratio.

Block 901 outputs the array data x(t) an estimate of the spatial 4$^{th}$-order Cumulant or Correlation matrix pair is made in block 902 the result of which undergoes generalized eigenvalue decomposition in 903. The SFOCMP eigenvectors are normalized in block 904 forming the separation matrix which is applied to the array output data as shown in block 905. While the BSS embodiment described above and in FIG. 9 estimates steering vectors as shown in block 906, the estimates are not used in the formation of the separation matrix W.

While normalized eigenvectors can be used effectively to suppress interferers, these adaptive weights are not constrained to limit errors in the output waveforms due to the additive Gaussian noise. A SFOCM based matrix-pencil approach with Hybrid adaptive weights uses both 2$^{nd}$ order and 4$^{th}$ order statistic to form the adapted weights where the weight vectors are designed to minimized the mean-squared error due to both the interference and noise. This hybrid method uses the estimated zero-lag spatial correlation matrix, $\hat{R}_x$, the estimated steering vector of the j$^{th}$ source, $\hat{v}_j$, and the estimated source power $P_j$ to form the interference-plus-noise correlation matrix $K_j$ and thereby the j$^{th}$ adapted weight vector $\hat{w}_{j,hyb}$.

Since the j$^{th}$ eigenvector, $e_j$ satisfies equation (252)

$$V^H e_j = [0 \ldots 0, \epsilon_j * 0 \ldots 0]^T \text{ where } \epsilon_j = e_j^H v_j, \quad (252)$$

$\hat{v}_j$ is proportional to the product $C_x(0)e_j = VC_r(0)V^H e_j = v_j(c_{r_j}(0)\epsilon_j*)$ and the steering vector can be estimated by normalization.

An estimate of the $j^{th}$ source power can be derived from the unconstrained MMSE weight vector $w_j=K_j^{-1}v_j$. In terms of $R_x$, this can be rewritten as $R_x w_j - v_j = v_j \hat{P}_j \hat{v}_j^H w_j$. Using the of estimates of $w_j$ and $\hat{v}_j$ the source power estimate becomes:

$$\hat{P}_j = \|\hat{R}_x \hat{w}_j - \hat{v}_j\| / |\hat{v}_j^H \hat{w}_j|$$

With the steering vector estimate and source power estimate, the interference-plus-noise correlation matrix estimate for the $j^{th}$ source is simply $\hat{K}_j = \hat{R}_x - \hat{v}_j \hat{P}_j \hat{v}_h^H$ Thus the hybrid MMSE weight vector estimate for the $j^{th}$ source is given by;

$$\hat{w}_{j,hyb} = |\hat{v}_j^H \hat{K}_j^{-1} \hat{v}_j|^{-1} \hat{K}_j^{-1} \hat{v}_j. \quad (253)$$

This hybrid MMSE weight compared to the adaptive weight vector requires several additional steps including the inversion of the N interference-plus-noise correlation matrices. The hybrid MMSE weight vector trades off interference suppression for improved robustness to additive Gaussian noise, which become evermore important as signals' SNR become lower. In terms of adapted beam patterns, the normalized eigenvector weights place nulls in the different interference directions and maintains a unity gain in the desired source direction. The hybrid weights on the other hand, form lesser nulls in the interferes' directions and maintains a unity gain in the desired source direction, while additionally limiting the average side lobe levels in non-source directions.

Figure 10:
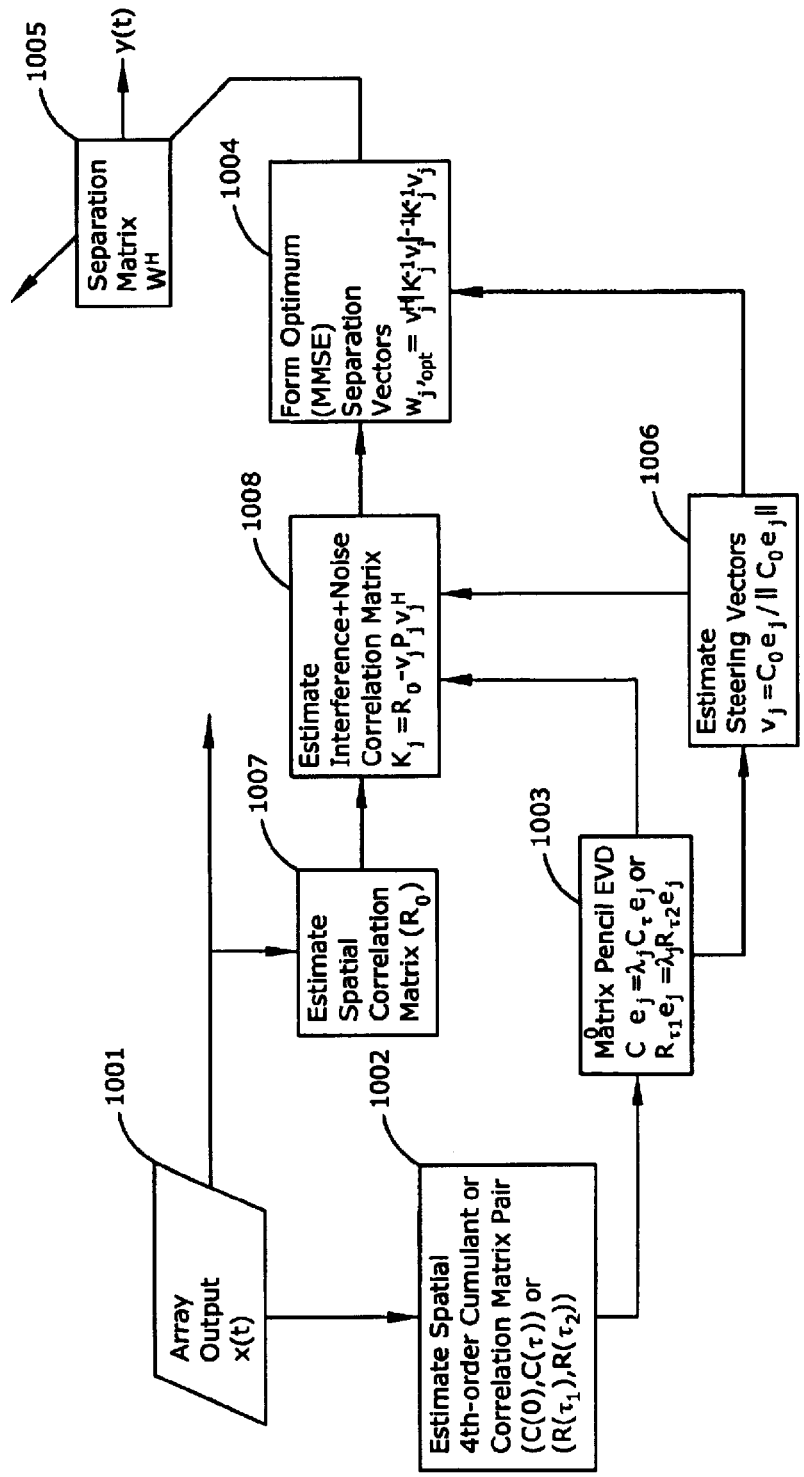
FIG. 10 is an embodiment of a Blind Source Separation system with Optimum MMSE Separation vectors (hybrid weights).

Therefore, to optimize the signal-to-interference-plus-noise ratio, minimum mean-squared error adaptive separation weight vectors (hybrid weights) can be found from the matrix-pencil based steering vector estimates, spatial autocorrelation Matrix and estimated interference-plus-noise correlation matrices. FIG. 10 shows an illustration of the system described above for generating hybrid separation weights. The differences from FIG. 9 are shaded to highlight the differences.

An array output 1001 is used to estimate a spatial $4^{th}$ order Cumulant 1002 on which GEVD is performed in block 1003. The output of 1003 is used as described above to estimate steering vectors in block and estimate the interference-plus-noise correlation Matrix, along with a estimate of the spatial correlation Matrix in block 1004. The spatial correlation Matrix also uses the Array Output for estimation. The hybrid separation weight vectors are generated in 0000 which forms the separation matrix W which is applied to the Array output to produce the signal y(t) in the same manner as adaptive weights are used.

Figure 11B:
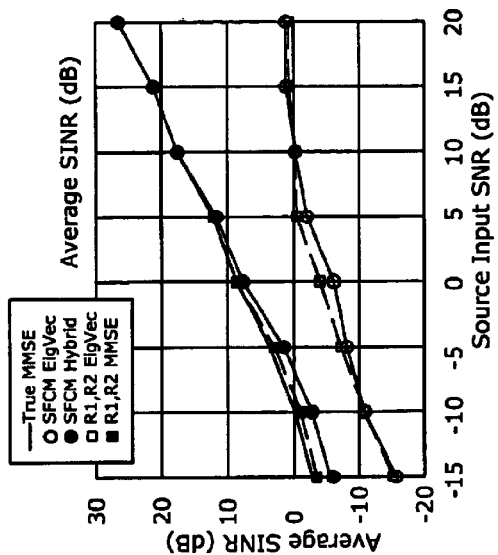
FIG. 11b is an output ISR vs received SNR performance graph comparing adaptive weights and with hybrid weights with isotropic white noise.
Figure 11A:
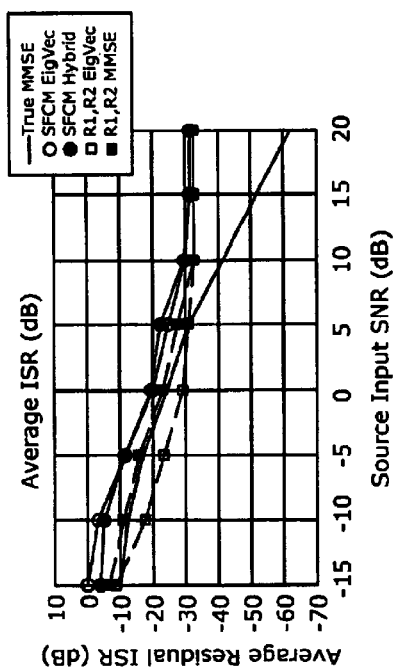
FIG. 11a is an output ISR vs received SNR performance graph comparing adaptive weights and with hybrid weights with isotropic white noise.

To illustrate the separation performance using the hybrid weights, average ISR and SINR performance over 25 Monte Carlo trials versus SNR for two GMSK sources and a six sensor array (random mixing matrix and isotropic white noise) using adaptive weights (SFCM EigVEC and hybrid MMSE weights (SFCM Hybrid and R1,R2-MMSE) are shown as FIG. 11a and 11b.

As seen in FIG. 11a the normalized eigenvector weights provide marginally better suppression of the interference signals than do the Hybrid weights. However as shown in FIG. 11b, the normalized eigenvector weighs provide no suppression of additive noise whereas the hybrid MMSE weights show significant suppression of both interference and noise. The hybrid MMSE weights also provide improved ISR at lower source input SNR.

Figure 12B:
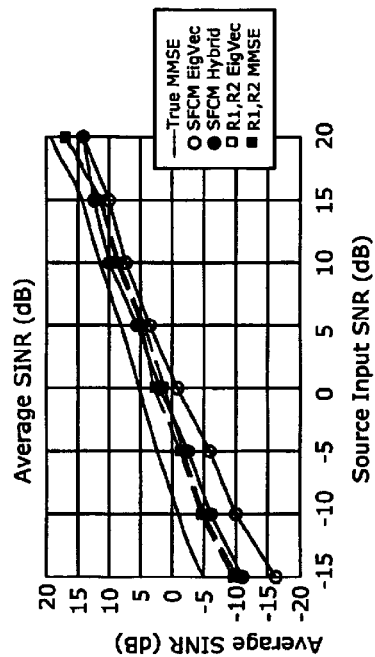
FIG. 12b is an output ISR vs received SNR performance graph comparing adaptive weights and with hybrid weights with non-isotropic spatially and temporally correlated Gaussian noise.
Figure 12A:
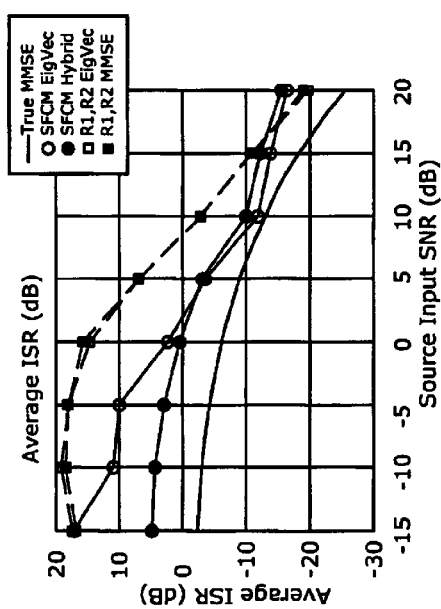
FIG. 12a is an output ISR vs received SNR performance graph comparing adaptive weights and with hybrid weights with non-isotropic spatially and temporally correlated Gaussian noise.

These results are repeated in FIGS. 12a and 12b, where average ISR and SINR performance respectively over 25 Monte Carlo trials versus SNR for six GMSK sources and a six sensor array (random mixing matrix and non-isotropic spatially and temporally correlated Gaussian noise) is shown for both the prior art weights and the hybrid MMSE weights.

Therefore, Matrix-pencil based hybrid MMSE adaptive array weights are uniquely applicable to many scenarios where both co-channel interference and Gaussian noise must be suppressed such as SIGINT Mapping Processors, space-based radar adaptive suppression of clutter and one or more jammers and suppression of direct-path source signals.

A BSS technique as described herein may be embodied in the form of computer-implemented processes and system for practicing those processes. A BSS technique as described herein may also be embodied in the form of computer program code embodied in tangible media, such as floppy diskettes, read only memories (ROMs), CD-ROMs, hard drives, high density disk, or any other computer-readable storage medium, wherein, when the computer program code is loaded into and executed by a computer, the computer becomes a system for practicing the invention. The BSS technique as described herein may also be embodied in the form of computer program code, for example, whether stored in a storage medium, loaded into and/or executed by a computer, or transmitted over some transmission medium, such as over the electrical wiring or cabling, through fiber optics, or via electromagnetic radiation, wherein, when the computer program code is loaded into and executed by a computer, the computer becomes a system for practicing the invention. When implemented on a general-purpose processor, the computer program code segments configure the processor to create specific logic circuits.

A blind source separation (BSS) technique in accordance with the present invention provides a robust higher-order cumulant based principle component blind source separation technique that performs well at low signal-to-noise ratios with the potential of performing well in the presence of temporally and spatially correlated noise. Furthermore, a new definition of a spatial fourth-order cumulant matrix suited to blind source separation with non-equal gain, directional sensors is provided, the definition of a spatial fourth-order cumulant matrix-pencil using temporal information is provided, the concept of the separation power efficiency as a measure of the algorithm's performance is provided, and the concept of wide sense equivalence between matrix-pencils are also provided.

Applications of the BSS technique in accordance with the present invention include spectral monitoring, be it for signal intelligence or other applications such as radio astronomy, where Gaussian random noise processes dominate the received signals out of an array. This fourth-order array signal processing BSS technique in accordance with the present invention provides the ability to exploit spatial information to separate co-channel emitters for detection, classification, and identification. This is particularly applicable to detecting signals designed for a low probability of detection (LPD) or low probability of intercept (LPI) which may use ambient background electromagnetic radiation and known co-channel emitters as a means of concealment. The spatial fourth-order cumulant matrix-pencil based blind source separation technique in accordance with the present invention provides the capability to blindly separate unknown co-channel emitters that may be near or below the noise floor of the individual sensors.

Although illustrated and described herein with reference to certain specific embodiments, the BSS technique as described herein is nevertheless not intended to be limited to the details shown. Rather, various modifications may be made in the details within the scope and range of equivalents of the claims and without departing from the spirit of the invention.

What is claimed is:

1. A method for separating M signals provided by M sources and received by an array comprising N elements, said method comprising:

generating a hybrid separation matrix as a function of:
time differences between receipt of said M signals by said N elements;
a spatial fourth order cumulant matrix pencil;
a spatial correlation matrix; and,
steering vectors of said M signals, and,
multiplying said hybrid separation matrix by a time series matrix representation of said M signals.

2. A method in accordance with claim 1 wherein the hybrid separation matrix is in accordance with the following equation:

$$\hat{w}_{j,hyb} = |\hat{v}_j^H \hat{K}_j^{-1} \hat{v}_j|^{-1} \hat{K}_j^{-1} \hat{v}_j;$$

wherein, $v_j$ is the steering vector of the $j^{th}$ signal; and, $K_j$ is the noise spatial covariance matrix of the $j^{th}$ signal.

3. A method in accordance with claim 1 wherein said spatial fourth order cumulant matrix pencil is a function of a spatial fourth order cumulant matrix.

4. A method in accordance claim 3, wherein said spatial fourth order cumulant matrix is in accordance with the following equation:

$$C_x^4(\tau_1, \tau_2, \tau_3) \equiv \sum_{i=1}^{N} Cum[x_i^*(t-\tau_1)x_i(t-\tau_2)x(t)x^H(t-\tau_3)],$$

wherein $C_x^4(\tau_1, \tau_2, \tau_3)$ is said spatial fourth order cumulant matrix having a first time lag, $\tau_1$, a second time lag, $\tau_2$, and a third time lag, $\tau_3$, each time lag being indicative of a time delay from one of said M sources to one of said N elements;

N is indicative of a number of elements in said array;

Cum $[x_i^*(t-\tau_1)\ x_i(t-\tau_2)\ x(t)\ x^H(t-\tau_3)]$ is a cumulant operator on arguments $[x_i^*(t-\tau_1)\ x_i(t-\tau_2)\ x(t)\ x^H(t-\tau_3)]$;

t is a variable representing time;

$x_i^*(t-\tau_1)$ represents a complex conjugate of one of said M signals from an $i^{th}$ source at time $t-\tau_1$;

$x_i(t-\tau_2)$ represents one of said M signals from an $i^{th}$ source at time $t-\tau_1$;

x(t) is a vector representation of said M signals; and $x^H(t-\tau_3)$ represents the Hermitian transpose of $x(t-\tau_3)$.

5. A method in accordance with claim 1 wherein said step of generating said hybrid separation matrix comprises performing a generalized eigenvalue analysis of said spatial fourth order cumulant matrix pencil.

6. A method in accordance with claim 1 wherein M=N.

7. A method in accordance with claim 1 wherein M<N.

8. A computer readable medium encoded with a computer program code for directing a processor to separate M signals provided by a Msources and received by an array comprising N elements, said program code comprising:

a first code segment for causing said processor to generate a hybrid separation matrix as a function of:
time differences between receipt of said M signals by said N elements;
a spatial fourth order cumulant matrix pencil;
a spatial correlation matrix; and,
steering vectors of said plurality of signals, and, a second code segment for causing said processor to multiply said separation matrix by a time series matrix representation of said M signals.

9. A computer readable in accordance with claim 8 wherein the hybrid separation matrix is in accordance with the following equation:

$$\hat{w}_{j,hyb} = |\hat{v}_j^H \hat{K}_j^{-1} \hat{v}_j|^{-1} \hat{K}_j^{-1} \hat{v}_j;$$

wherein, $v_j$ is the steering vector of the $j^{th}$ signal;

$K_j$ is the noise spatial covariance matrix of the $j^{th}$ signal.

10. A computer readable in accordance with claim 8 wherein said spatial fourth order cumulant matrix pencil is a function of a spatial fourth order cumulant matrix being a summation of steering vector outer products scaled by an individual source signal's fourth order cumulant; and, said steering vector is indicative of respective phase delays between ones of said N elements.

11. A computer readable medium in accordance claim 10 wherein said spatial fourth order cumulant matrix is in accordance with the following equation:

$$C_x^4(\tau_1, \tau_2, \tau_3) \equiv \sum_{i=1}^{N} Cum[x_i^*(t-\tau_1)x_i(t-\tau_2)x(t)x^H(t-\tau_3)],$$

wherein:

$C_x^4(\tau_1, \tau_2, \tau_3)$ is said spatial fourth order cumulant matrix having a first time lag, $\tau_1$, a second time lag, $\tau_2$, and a third time lag, $\tau_3$, each time lag being indicative of a time delay from one of said M sources to one of said N elements;

N is indicative of a number of elements in said array;

Cum $[x_i^*(t-\tau_1)\ x_i(t-\tau_2)\ x(t)\ x^H(t-\tau_3)]$ is a cumulant operator on arguments $x_i^*(t-\tau_1)\ x_i(t-\tau_2)\ x(t)\ x^H(t-\tau_3)$;

t is a variable representing time;

$x_i^*(t-\tau_1)$ represents a complex conjugate of one of said M signals from an $i^{th}$ source at time $t-\tau_1$;

$x_i(t-\tau_2)$ represents one of said M signals from an $i^{th}$ source at time $t-\tau_1$;

x(t) is a vector representation of said M signals; and $x^H(t-\tau_3)$ represents the Hermitian transpose of $x(t-\tau_3)$.

12. A computer readable medium in accordance with claim 8, said program code further comprising:

a third code segment for causing said processor to perform a generalized eigenvalue analysis of said spatial fourth order cumulant matrix pencil.

13. A computer readable medium in accordance with claim 8 wherein M=N.

14. A computer readable medium in accordance with claim 8 wherein M<N.

15. A system for separating M signals provided by M sources, said system comprising:

a receiver for receiving said M signals and for providing received signals therefrom; and a signal processor for receiving said received signals, generating a hybrid separation matrix, and multiplying said separation matrix by a time series matrix representation of said received signals, wherein:

said hybrid separation matrix is a function of time differences between receipt of
said M signals by said receiver, a spatial correlation matrix; steering vectors of
said M signals and a spatial fourth order cumulant matrix pencil.

16. A system in accordance with claim 15, wherein the hybrid separation matrix is in accordance with the following equation:

$$\hat{w}_{j,hyb} = |\hat{v}_j^H \hat{K}_j^{-1} \hat{v}_j|^{-1} \hat{K}_j^{-1} \hat{v}_j;$$

wherein, $v_j$ is the steering vector of the $j^{th}$ signal;

$K_j$ is the noise spatial covariance matrix of the $j^{th}$ signal.

17. A system in accordance with claim 15 wherein said receiver comprises N elements configured to form an array.

18. A system in accordance with claim 15 wherein
said spatial fourth order cumulant matrix pencil is a function of a spatial fourth order cumulant matrix being a summation of steering vector outer products scaled by an individual source signal's fourth order cumulant; and,
said steering vector is indicative of respective phase delays between ones of said N elements.

19. A system in accordance claim 18 wherein said spatial fourth order cumulant matrix is in accordance with the following equation:

$$C_x^4(\tau_1, \tau_2, \tau_3) \equiv \sum_{i=1}^{N} Cum[x_i^*(t-\tau_1)x_i(t-\tau_2)x(t)x^H(t-\tau_3)],$$

wherein:

$C_x^4(\tau_1, \tau_2, \tau_3)$ is said spatial fourth order cumulant matrix having a first time lag, $\tau_1$, a second time lag, $\tau_2$, and a third time lag, $\tau_3$, each time lag being indicative of a time delay from one of said M sources to one of said N elements;

N is indicative of a number of a number of elements in said array;

Cum $[x_i^*(t-\tau_1)\ x_i(t-\tau_2)\ x(t)\ x^H(t-\tau_3)]$ is a cumulant operator on arguments $x_i^*(t-\tau_1)\ x_i(t-\tau_2)\ x(t)\ x^H(t-\tau_3)$;

t is a variable representing time;

$x_i^*(t-\tau_1)$ represents a complex conjugate of one of said M signals from an $i^{th}$ source at time $t-\tau_1$;

$x_i(t-\tau_2)$ represents one of said M signals from an $i^{th}$ source at time $t-\tau_1$;

x(t) is a vector representation of said M signals; and $x^H(t-\tau_3)$ represents the Hermitian transpose of $x(t-\tau_3)$.

20. A system in accordance with claim 17 wherein M=N.

21. A system in accordance with claim 17 wherein M<N.

22. In a method for recovering low SNR signals in an multi-signal and noise environment with a multi-sensor array wherein a separation matrix is applied to the multi-sensor array data, the improvement of forming the separation matrix with hybrid minimum mean squared error weights, wherein said weights are generated as a function of a spatial correlation matrix; steering vectors of said multiple signals and a spatial fourth order cumulant matrix pencil.

23. A method in accordance with claim 22 wherein the number of said multiple signals is equal to the number of said multiple sensors in said array.

24. A method in accordance with claim 22 wherein the number of said multiple signals is less than the number of said multiple sensors in said array.

25. A method for recovering an unknown signal from a composite signal containing the unknown signal and at least one interferer signal and noise, said method comprising the step of generating a separation matrix to suppress the at least one interferer signal and the noise, wherein the separation matrix is a function of the spatial correlation matrix of the unknown signal, a steering vector, and a spatial fourth order cumulant matrix pencil of the unknown signal and the at least one interferer signal.

26. A method in accordance with claim 25 wherein said composite signal comprises M signals and is received on an N element array.

27. A method in accordance with claim 26 wherein M=N.

28. A method in accordance with claim 26 wherein M<N.

* * * * *